United States Patent [19]

Brown et al.

[11] Patent Number: 5,257,208
[45] Date of Patent: Oct. 26, 1993

[54] COMPUTERIZED PORTABLE TESTING DEVICE FOR BACKFLOW VALVES

[75] Inventors: Arthur E. Brown, Santa Ana; Cecil L. Pearson, Irvine; Howard G. Corlett, Gardena, all of Calif.

[73] Assignee: Fire & Safety Electronics Inc., Santa Ana, Calif.

[21] Appl. No.: 941,862

[22] Filed: Sep. 8, 1992

Related U.S. Application Data

[63] Continuation of Ser. No. 513,424, Apr. 23, 1990, abandoned.

[51] Int. Cl.[5] .................................................. G01L 15/00
[52] U.S. Cl. .................................... 364/510; 364/558; 73/4 R; 340/626
[58] Field of Search .................. 73/1 R, 4 R, 168; 340/626; 364/509, 510, 550, 551.01, 558; 137/55, 557

[56] References Cited

U.S. PATENT DOCUMENTS

| | | | |
|---|---|---|---|
| 3,961,325 | 6/1976 | Kendall et al. | 341/120 |
| 4,586,142 | 4/1986 | Cota et al. | 364/510 X |
| 4,694,693 | 9/1987 | Gerlowski | 73/168 |
| 4,800,512 | 1/1989 | Busch | 364/551.01 |
| 4,903,529 | 2/1990 | Hodge | 73/168 |
| 4,916,641 | 4/1990 | Bybee | 364/550 |
| 4,920,802 | 5/1990 | McMullin et al. | 73/168 X |
| 4,976,144 | 12/1990 | Fitzgerald | 364/558 X |
| 4,977,778 | 12/1990 | Nafziger et al. | 73/168 X |
| 5,008,841 | 4/1991 | McElroy | 364/551.01 |

Primary Examiner—Parshotam S. Lall
Assistant Examiner—Thomas S. Auchterlonie
Attorney, Agent, or Firm—Ashen & Lippman

[57] ABSTRACT

This is a specialized hand-held and battery-powered unit for field testing of backflow valves. It displays and prints a permanent record of simultaneous source- and discharge-port pressure values and their difference. To reduce operator distraction and confusion during backflow tests the source and discharge values are automatically equalized, bringing the difference to zero, whenever the actually sensed pressures are within a threshold differential such as 0.2 pounds per square inch. Preferably two pressure sensors are provided for connection to source and discharge ports respectively, yielding independent analog electrical signals representing the pressures; and two independent analog-to-digital converters respond to the two sensor signals respectively. Digital input signals from the converters pass to a microprocessor—which controls a digital display to show the three values continuously. The processor also controls an onboard printer to record the same values, together with elapsed time, at regular intervals such as two seconds. In the record are automatically recorded test parameters, which for integrity of the record include some data settable only at the factory: testing-device serial number, operator name and regulatory-agency license number, and serial number and date of the test itself.

24 Claims, 46 Drawing Sheets

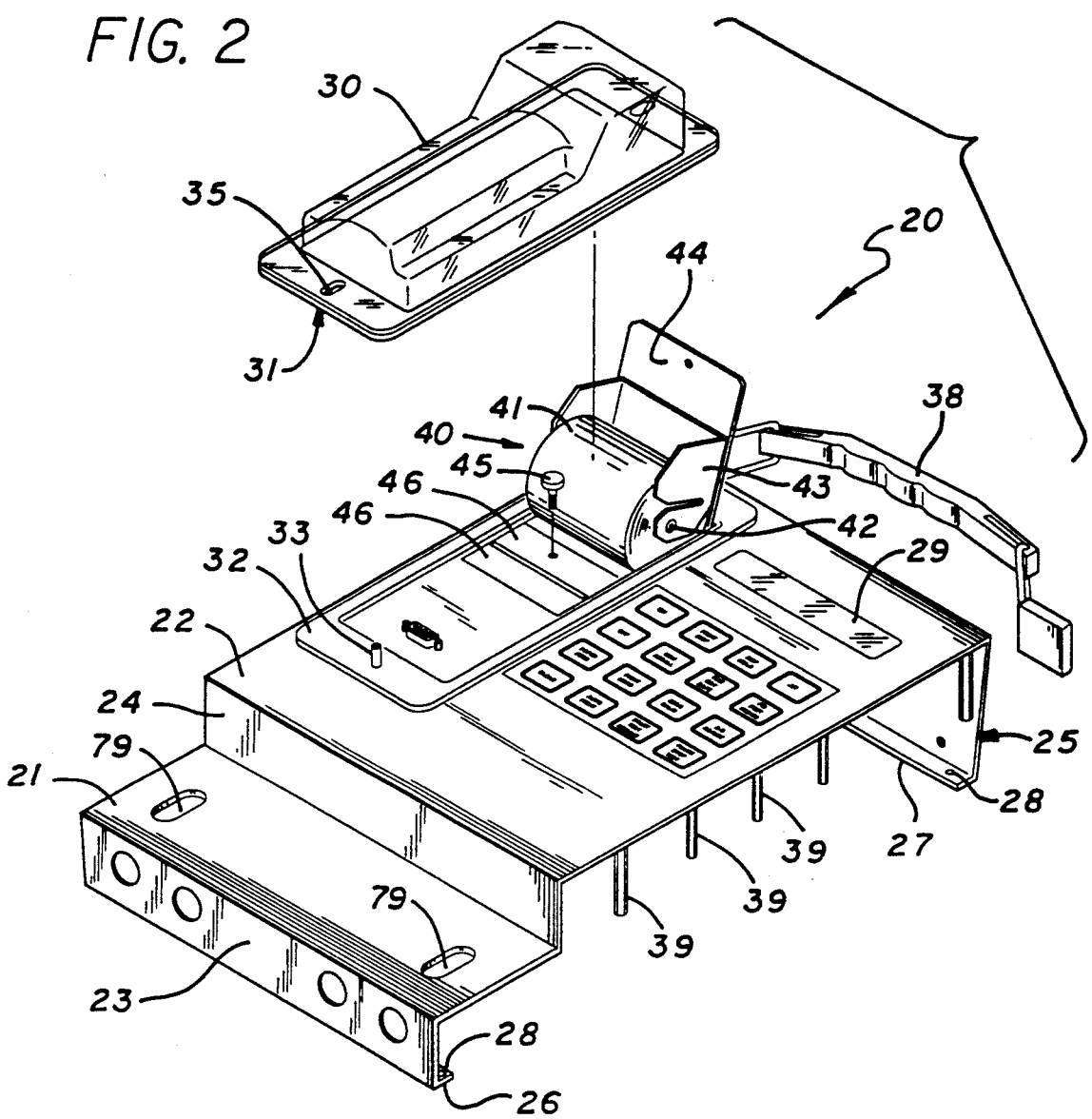
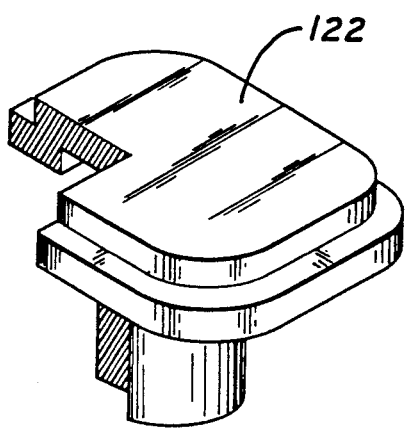

FIG. 16 (1)

TESTERS' NAMES
TESTER'S
CERTIFICATION #
TELEPHONE NUMBER
MODEL BT2
BACKFLOW TESTER
SERIAL #0000

CALIBRATED ON 00-00-00
NEXT CALIB. DUE 00-00-00
SYSTEM CHECK: OK
BATTERY LEVEL 09.8V GOOD
11:51 AM TUE AUG 29 1989

TEST # 33

| TIME  | A   | B   | A-B  |                              |
|-------|-----|-----|------|------------------------------|
| M:S   | PSI | PSI | PSI  |                              |
| 00:00 | 89  | 88  | 1.6  |                              |
| 00:02 | 89  | 88  | 1.7  |                              |
| 00:04 | 89  | 87  | 1.7  |                              |
| 00:06 | 89  | 87  | 1.4  |                              |
| 00:08 | 86  | 85  | 0.7  |                              |
| 00:10 | 83  | 83  | 0.0  |                              |
| 00:12 | 81  | 82  | -0.8 |                              |
| 00:14 | 78  | 80  | -1.5 |                              |
| 00:16 | 77  | 79  | -2.0 | HIGHSIDE LOWERED ABOUT 2 PSI |
| 00:18 | 76  | 78  | -2.2 |                              |
| 00:20 | 76  | 78  | -2.2 |                              |
| 00:22 | 76  | 78  | -2.2 |                              |
| 00:24 | 76  | 78  | -2.2 |                              |
| 00:26 | 76  | 78  | -2.2 |                              |
| 00:28 | 76  | 78  | -2.2 |                              |
| 01:52 | 89  | 87  | 1.8  | REPRESSURIZED ASSEMBLY       |
| 01:54 | 89  | 87  | 1.5  |                              |
| 01:56 | 88  | 87  | 1.7  |                              |
| 01:58 | 88  | 86  | 1.8  |                              |
| 02:00 | 88  | 86  | 1.7  |                              |
| 02:02 | 88  | 86  | 1.8  |                              |
| 02:04 | 88  | 86  | 1.6  |                              |
| 02:06 | 86  | 85  | 1.6  |                              |
| 02:08 | 86  | 84  | 1.7  |                              |
| 02:10 | 73  | 77  | 1.7  |                              |
| 02:12 | 79  | 79  | 0.8  |                              |
| 02:14 | 79  | 79  | 0.7  |                              |
| 02:16 | 80  | 80  | 0.5  | ASSEMBLY LOWERED ABOUT 10 PSI |
| 02:18 | 80  | 79  | 0.4  |                              |
| 02:20 | 73  | 75  | -1.5 |                              |

FIG. 16(2)

| | | | | |
|---|---|---|---|---|
| 02:22 | 67 | 70 | -3.9 | |
| 02:24 | 67 | 71 | -4.0 | HIGHSIDE LOWERED ABOUT 5 PSI |
| 02:26 | 67 | 71 | -3.9 | |
| 02:28 | 67 | 71 | -3.9 | |
| 02:30 | 67 | 71 | -3.9 | |
| 02:32 | 67 | 71 | -4.0 | |
| 02:34 | 67 | 71 | -4.0 | |
| 02:36 | 67 | 71 | -4.0 | |
| 02:38 | 67 | 71 | -4.0 | |
| 02:40 | 67 | 71 | -4.0 | |
| | | | | |
| 04:58 | 88 | 88 | 0.7 | |
| 05:00 | 88 | 87 | 0.7 | |
| 05:02 | 88 | 87 | 0.7 | |
| 05:04 | 86 | 86 | 0.4 | |
| 05:06 | 84 | 84 | 0.0 | |
| 05:08 | 83 | 83 | -0.3 | |
| 05:10 | 80 | 81 | -0.8 | |
| 05:12 | 78 | 79 | -1.2 | |
| 05:14 | 76 | 78 | -1.7 | |
| 05:16 | 74 | 76 | -2.1 | HIGHSIDE LOWERED ABOUT 2 PSI |
| 05:18 | 74 | 76 | -2.0 | |
| 05:20 | 74 | 76 | -1.9 | |
| 05:22 | 74 | 76 | -1.8 | |
| 05:24 | 74 | 76 | -1.8 | |
| 05:26 | 74 | 76 | -1.8 | |
| 05:28 | 74 | 76 | -1.8 | |
| 05:30 | 74 | 76 | -1.7 | |
| 05:32 | 74 | 76 | -1.7 | |
| 05:34 | 74 | 76 | -1.7 | |
| 05:36 | 74 | 76 | -1.7 | |
| | | | | |
| 06:42 | 89 | 88 | 1.3 | REPRESSURIZED THE ASSEMBLY |
| 06:44 | 89 | 88 | 1.1 | |
| 06:46 | 89 | 88 | 1.5 | |
| 06:48 | 89 | 88 | 0.9 | |
| 06:50 | 89 | 87 | 1.3 | |
| 06:52 | 88 | 87 | 1.0 | |
| 06:54 | 88 | 87 | 1.0 | |
| 06:56 | 87 | 86 | 1.0 | |
| 06:58 | 87 | 86 | 0.8 | |
| 07:00 | 87 | 86 | 0.9 | |
| 07:02 | 87 | 86 | 1.0 | |
| 07:04 | 86 | 84 | 1.2 | |
| 07:06 | 79 | 78 | 0.9 | |
| 07:08 | 80 | 79 | 0.6 | |
| 07:10 | 80 | 80 | 0.4 | ASSEMBLY LOWERED ABOUT 10 PSI |
| 07:12 | 81 | 80 | 0.4 | |
| 07:14 | 81 | 80 | 0.6 | |

| | | | | |
|---|---|---|---|---|
| 07:16 | 81 | 80 | 0.6 | |
| 07:18 | 80 | 80 | 0.6 | |
| 07:20 | 80 | 80 | 0.3 | |
| 07:22 | 80 | 80 | 0.0 | |
| 07:24 | 72 | 74 | -2.0 | |
| 07:26 | 66 | 70 | -4.3 | HIGHSIDE LOWERED ABOUT 5 PSI |
| 07:28 | 66 | 71 | -4.3 | |
| 07:30 | 67 | 71 | -4.3 | |
| 07:32 | 67 | 71 | -4.3 | |
| 07:34 | 67 | 71 | -4.3 | |
| 07:36 | 67 | 71 | -4.3 | |
| 07:38 | 67 | 71 | -4.2 | |
| 07:40 | 67 | 71 | -4.2 | |

TEST # 33 COMPLETED
12:01 PM AUG 29 1989

_____
VALVE MFR

_____
VALVE TYPE

_____
SERIAL NUMBER

COMMENTS _____
_____
_____
_____

_____
TESTER'S NAME

_____
SIGNATURE    DATE

TESTERS' NAMES
TESTER'S CERTIFICATION #
TELEPHONE NUMBER

MODEL BT2
BACKFLOW TESTER
SERIAL #0000

CALIBRATED ON  00-00-00
NEXT CALIB. DUE 00-00-00
SYSTEM CHECK: OK
BATTERY LEVEL 09.8V GOOD
10:24 AM TUE AUG 29 1989

TEST # 22

| TIME | A | B | A-B | |
|---|---|---|---|---|
| M:S | PSI | PSI | PSI | |
| 00:00 | 90 | 82 | 8.2 | |
| 00:02 | 90 | 82 | 7.9 | APPARENT PSI DROP |
| 00:04 | 90 | 82 | 8.0 | |
| 00:06 | 90 | 82 | 7.6 | |
| 00:08 | 90 | 83 | 6.3 | |
| 00:10 | 90 | 86 | 3.9 | |
| 00:12 | 91 | 87 | 4.2 | |
| HOLD | 90 | 87 | 3.2 | RELIEF DRIP POINT |
| 00:16 | 90 | 86 | 3.8 | |
| 00:18 | 91 | 86 | 4.3 | |
| 00:20 | 89 | 85 | 3.9 | |
| | | | | |
| 01:12 | 89 | 84 | 4.9 | |
| 01:14 | 98 | 84 | 5.2 | |
| 01:16 | 89 | 84 | 5.3 | |
| 01:18 | 90 | 85 | 5.7 | |
| 01:20 | 83 | 65 | 18.3 | |
| 01:22 | 85 | 67 | 17.2 | SHOWS RE-ESTABLISHED PSI |
| 01:24 | 89 | 81 | 8.5 | |
| 01:26 | 89 | 81 | 8.4 | |
| 01:28 | 90 | 81 | 8.7 | |
| 01:30 | 88 | 82 | 6.4 | # 2 CHECK CLOSED TIGHT |
| 01:32 | 89 | 83 | 6.8 | |
| 01:34 | 90 | 83 | 7.0 | |
| | | | | |
| 01:38 | 87 | 70 | 17.0 | SHOWS RE-ESTABLISHED PSI |
| 01:40 | 92 | 83 | 8.5 | |
| 01:42 | 90 | 82 | 8.3 | |
| 01:44 | 91 | 82 | 8.4 | |
| 01:46 | 91 | 82 | 8.2 | |
| 01:48 | 91 | 82 | 8.3 | |

01:50   92   83   8.7
01:52   91   82   8.4    # 1 CHECK PSI DROP
01:54   90   82   8.3

TEST # 22 COMPLETED
10:27 AM TUE AUG 29 1989

_____

VALVE MFR

_____

VALVE TYPE

_____

SERIAL NUMBER

COMMENTS_____
_____
_____
_____
_____

_____

TESTER'S NAME

FIG. 17(2)

TESTERS' NAMES
TESTER'S
CERTIFICATION #
TELEPHONE NUMBER

MODEL BT2
BACKFLOW TESTER
SERIAL #0000

CALIBRATED ON  00-00-00
NEXT CALIB. DUE 00-00-00
SYSTEM CHECK: OK
BATTERY LEVEL 09.8V GOOD
01:53 PM TUE AUG 29 1989

TEST # 34

| TIME | A | B | A-B |
|------|---|---|-----|
| M:S | PSI | PSI | PSI |
| 00:00 | 69 | 0 | 68.8 |
| 00:02 | 65 | 0 | 64.7 |
| 00:04 | 59 | 0 | 59.5 |
| 00:06 | 46 | 0 | 45.7 |
| 00:08 | 30 | 0 | 30.1 |
| 00:10 | 19 | 0 | 19.3 |
| 00:12 | 14 | 0 | 13.5 |
| 00:14 | 9 | 0 | 9.0 |
| 00:16 | 6 | 0 | 6.0 |
| 00:18 | 5 | 0 | 4.6 |
| 00:20 | 3 | 0 | 3.5 |
| 00:22 | 3 | 0 | 2.8 |
| 00:24 | 2 | 0 | 2.5 |
| 00:26 | 2 | 0 | 2.4 |
| 00:28 | 2 | 0 | 2.3 |
| 00:30 | 2 | 0 | 2.2 |
| 00:32 | 2 | 0 | 2.1 |
| 00:34 | 2 | 0 | 2.0 |
| 00:36 | 2 | 0 | 1.9 |
| 00:38 | 2 | 0 | 1.7 |
| HOLD | 2 | 0 | 1.7 | FLOAT DROPS |
| 00:42 | 0 | 0 | 0.0 |
| 00:44 | 0 | 0 | 0.0 |
| 00:46 | 0 | 0 | 0.0 |
| 02:14 | 82 | 0 | 82.1 |
| 02:16 | 82 | 0 | 81.6 |
| 02:18 | 79 | 0 | 79.6 |
| 02:20 | 74 | 0 | 73.8 |
| 02:22 | 23 | 0 | 23.2 |

FIG. 18(1)

```
02:24    2    0    1.9
02:26    2    0    1.9
02:28    2    0    1.9
02:30    2    0    1.8            PRESSURE DROP
02:32    2    0    1.8
02:34    2    0    1.8
02:36    2    0    1.8
02:38    2    0    1.8
02:40    2    0    1.8
02:42    2    0    1.8
02:44    2    0    1.8
02:46    2    0    1.8
02:48    2    0    1.8
02:50    2    0    1.8
```

TEST # 34 COMPLETED
01:57 PM TUE AUG 29 1989

_____
VALVE MFR

_____
VALVE TYPE

_____
SERIAL NUMBER

COMMENTS_____
_____
_____
_____
_____

_____
TESTER'S NAME

_____
SIGNATURE      DATE

*FIG. 18(2)*

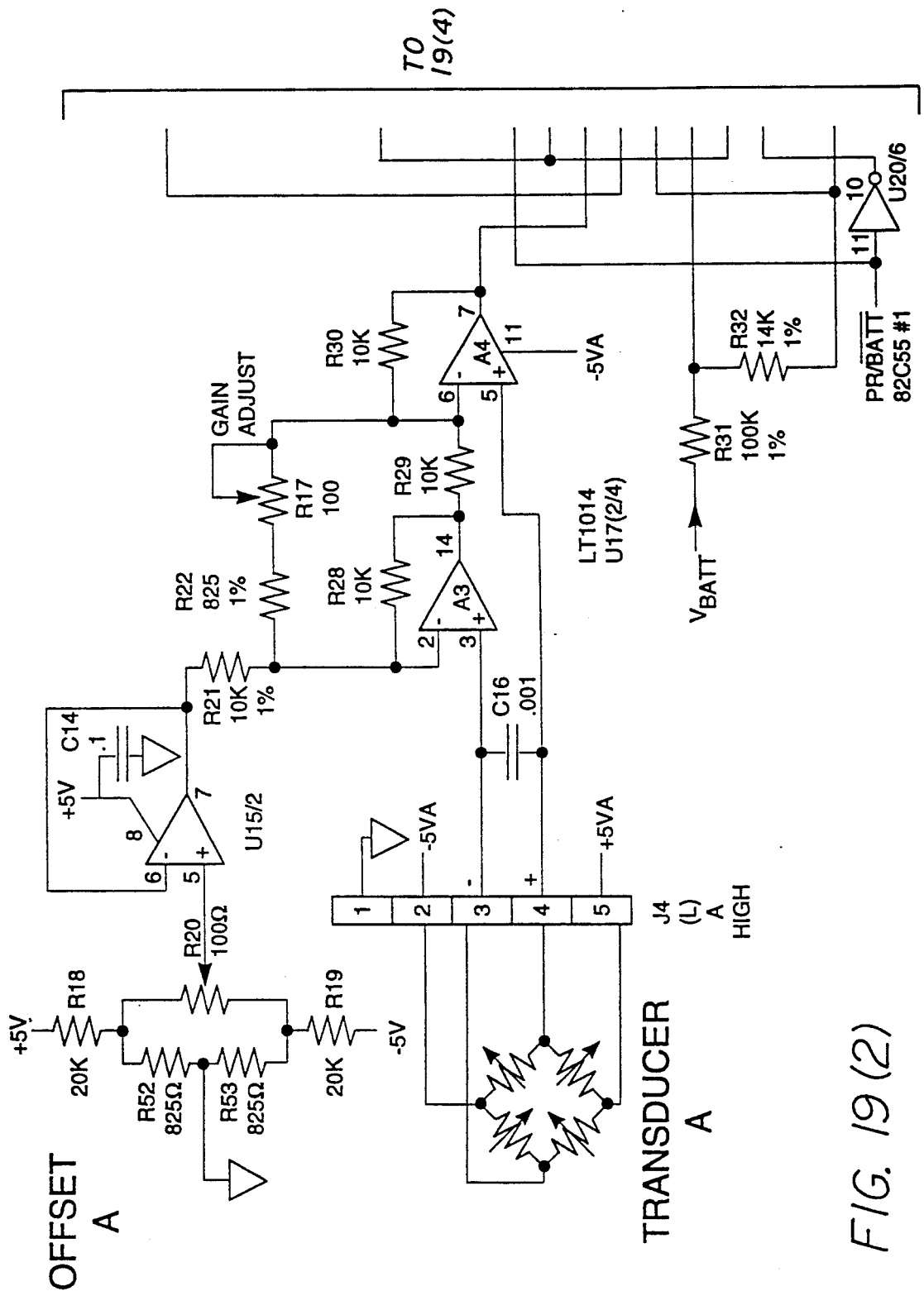
FIG. 19 (2)

FIG. 19(4)

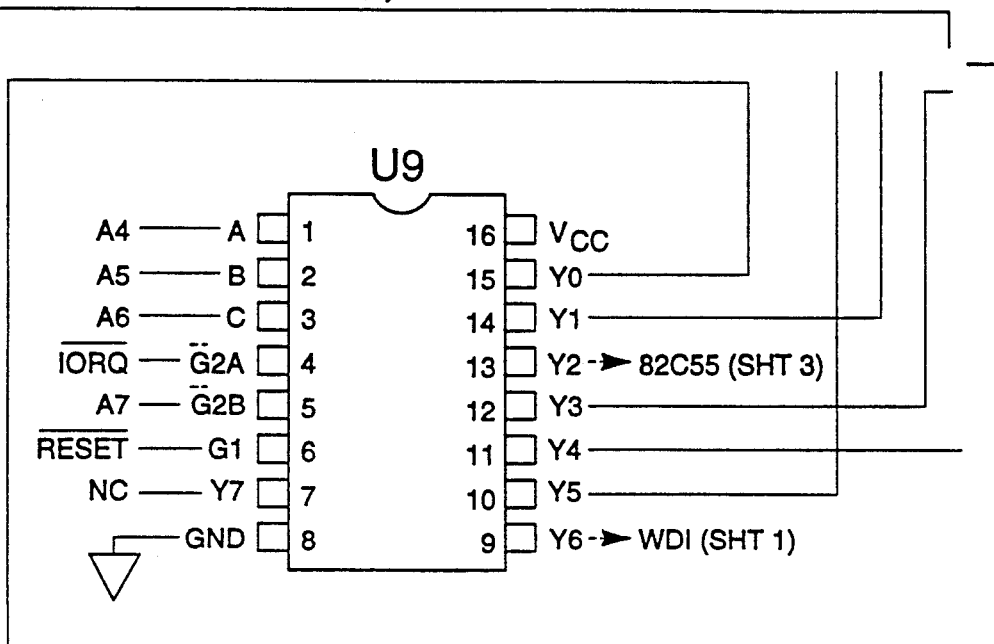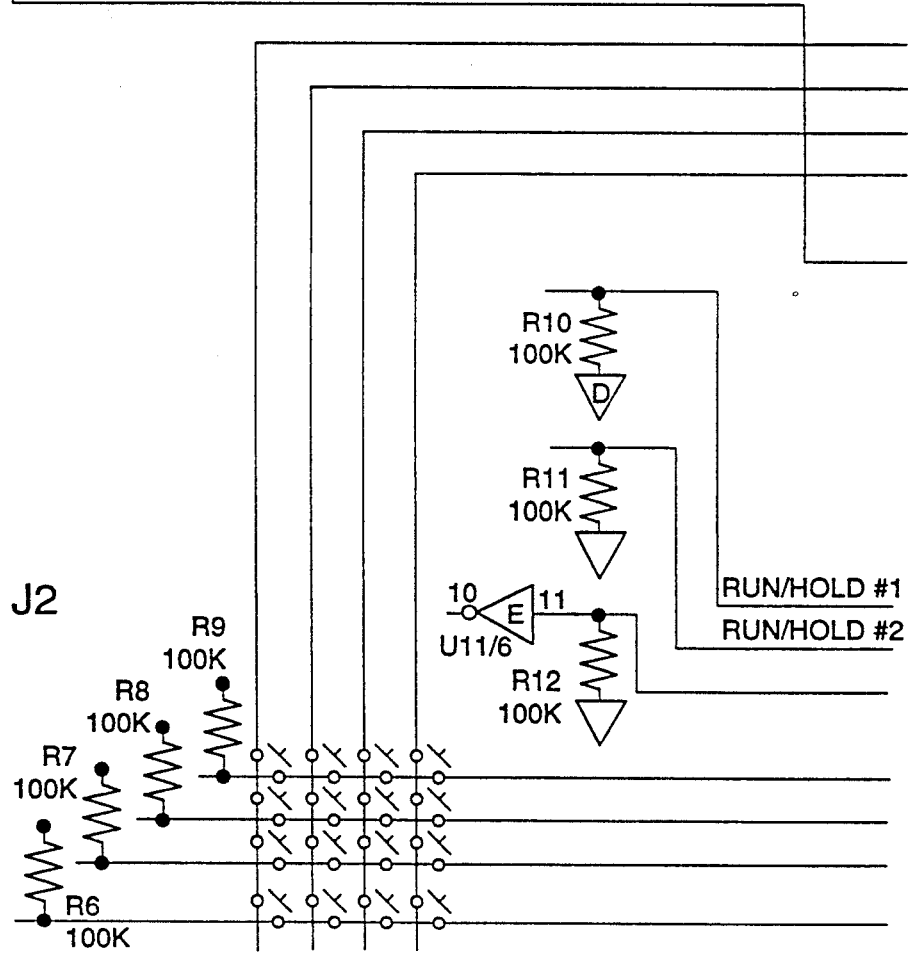
FIG. 21(2)

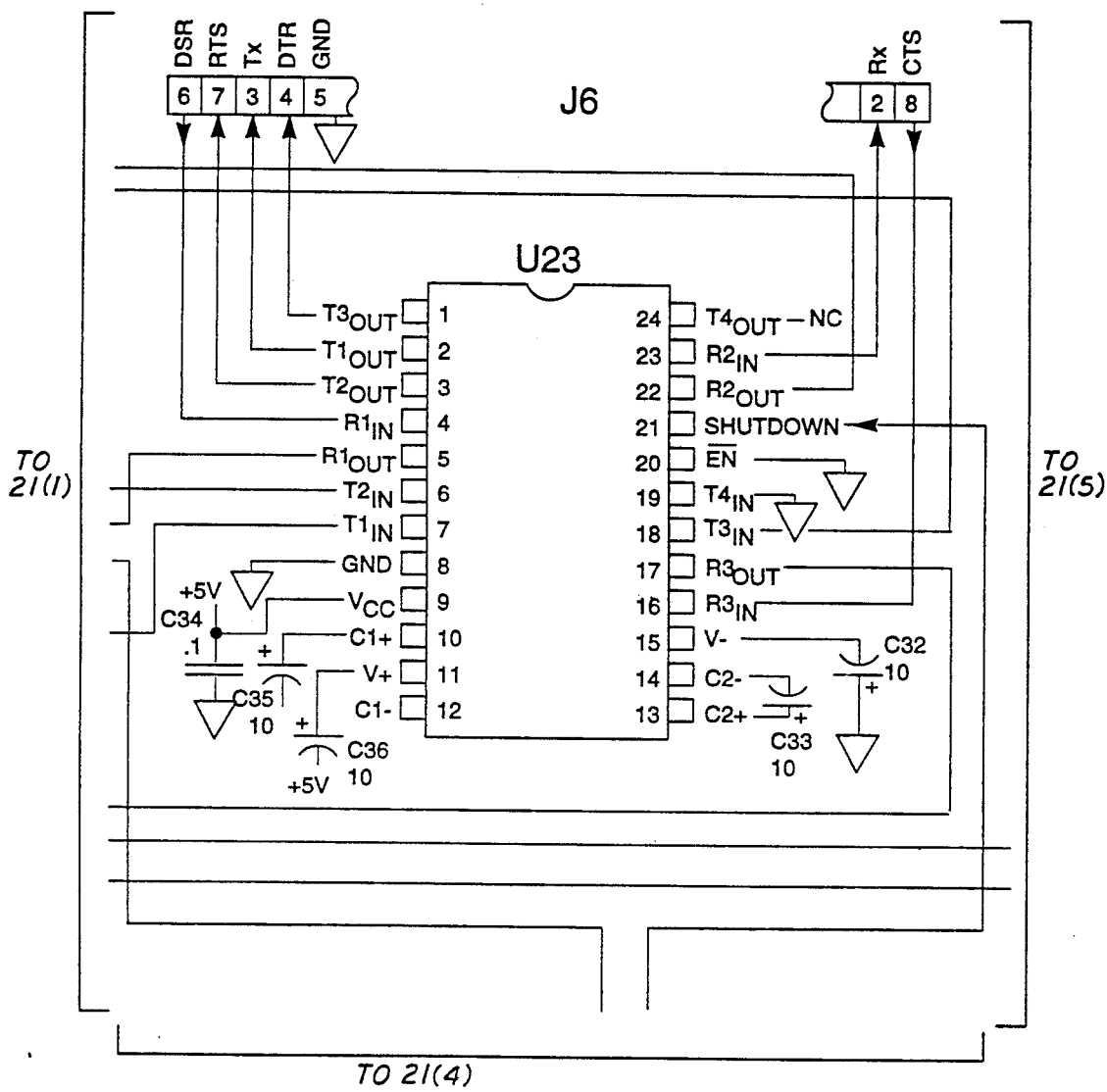
FIG. 21 (3)

COMPUTERIZED PORTABLE TESTING DEVICE FOR BACKFLOW VALVES

This is a continuation of copending application Ser. No. 07/513,424, filed on Apr. 23, 1990 now abandoned.

BACKGROUND

1. Field of the Invention

This invention relates to the highly specialized field of backflow-valve testing, an important activity which is subject to stringent government regulation; and more particularly to an equally specialized testing device for facilitating and improving the reliability of such testing.

2. Prior Art

Backflow valves are extensively used in public-works and industrial facilities to prevent fluids from migrating upstream in event of supply-pressure failure or improper overpressurization of discharge points. Upstream movement of fluids in such instances can contaminate upstream supplies, leading to many different kinds of adverse effects—depending upon the type of facility involved.

Such adverse effects include risks of poisoning (in the case of systems handling water, foods, medicaments, or other fluids for ingestion by people or animals), and explosive or corrosive damage to the facility, with consequent fire and health hazards (in the case of facilities handling highly reactive materials). In addition, such effects nearly always lead to protracted and very expensive operational interruptions, and thereby often to severe consequential damages.

On the other hand, the consequences of adverse test reports, to operators of many facilities, are very expensive. This fact, regrettably, leads to a potential for deception through installation of irregular plumbing arrangements, and even to bribery of testing personnel, as well as other abuses.

Thus backflow testing is subject to error through both inadvertence and various kinds of duplicity. The tests can be difficult, requiring carefully selected and trained testing personnel. Personnel must have great alertness, thorough technical comprehension of facility operation—to properly interpret test results, as well as to detect improper plumbing installations—and a high degree of personal integrity.

It is for these reasons that backflow testing in many industrial and public-works fields is governmentally required, regulated, and in some instances conducted. Unfortunately, the number of valves to be tested is enormous, and the number of such qualified personnel relatively small.

In the present document we shall refer to the "upstream", "inlet" or "source" side of a valve, as distinguished from the "downstream", "outlet" or "discharge" side. This terminology departs from popular nomenclature in the backflow-valve industry, which most often refers to the "high pressure" and "low pressure" sides (or sometimes just the "high" and "low" sides) of the valve, respectively.

The nomenclature used in this document is preferred for present purposes, to facilitate unambiguous discussion of abnormal pressurization conditions—which are in fact the entire focus of backflow valves and their testing. Such abnormal conditions run precisely contrary to the implicit assumption that the source side is at a suitably higher pressure than the discharge side.

In addition, there are various types of backflow valves, some having one or more built-in cutoff valves in series with the valve on each side, or providing special pressure-bleeding ports to atmospheric pressure. Such additional valving, and in some cases the resultant added chambers, are incorporated into backflow valves for various reasons, but particularly for convenience in attaching test equipment, and in isolating the pressure-responsive mechanism of the valve from the actual source and discharge plumbing, for testing.

In systems employing valves that lack such built-in features, equivalent test valving is usually included instead in the system plumbing. Hence for relative simplicity and definiteness throughout the remainder of this document, except where otherwise clear from the context, we shall simply refer to the basic backflow valve itself, and its source and discharge ports—disregarding the possible presence of additional valving and chambers.

In interpretation of this document and particularly the appended claims, it is therefore to be understood that our references to the "source" and "discharge" ports or sides of a valve mean the features of the basic backflow valve itself.

The process of testing a backflow valve, even under the best of conditions, necessarily includes performance of at least four functions, or groups of functions, at the same time. These functions include (1) careful and substantially continuous or simultaneous monitoring of pressures on both the upstream and downstream sides of the valve—and, in one way or another, the difference between those two pressures—while (2) making various plumbing connections temporarily, (3) observing and determining performance of the valve under different pressurization conditions, and (4) making permanent, accurate and clear contemporaneous records of both the pressurization conditions and the observed performance of the valve.

Accordingly, such testing requires at least one pressure-measuring instrument, to permit the pressure monitoring just described as the first of the four enumerated functions. As may be appreciated from the above description of functions which must be performed concurrently, the testing heretofore has also called for great presence of mind.

Prior instruments supplied for use in backflow-valve testing exacerbated this latter requirement. As will be explained, they are somewhat cumbersome to use; and have other drawbacks whose recognition forms part of the present invention and thus will be set forth in a later section of this document.

Early backflow-testing instruments included dual-needle mechanical pressure gauges, for connection between the source and discharge sides of the valve under test. One needle registers gauge pressure at one of the two ports, and the other needle the pressure at the other of the ports (i. e., the source and discharge sides of the valve, respectively), each with a display of 200 pounds per square inch full-scale.

As will be appreciated, these dual-readout mechanical gauges are actually rather ingenious, and represented a significant effort in the direction of making the inspector's work humanly possible. In more recent units of the same type, some additional operational aids have been built in.

All these devices, however, remain difficult to use because in proper testing the operating pressure must usually be controlled to a rather close tolerance—which is hard to read on a scale of 200 pounds per square inch. To directly read differential pressure between the two ports, it was necessary to obtain and attach an entirely separate differential gauge and plumbing—typically displaying on a center-zero scale with full-scale excursions of plus-and-minus 15 pounds per square inch. Worse yet, the differential control pressures must be read to a fraction of one pound per square inch, which is hard to read on a scale of plus-and-minus 15 pounds per square inch.

These rather fussy requirements for watching the pressure values, coupled with the familiar "stiction", hysteresis and orientation sensitivity of mechanical valves, makes backflow-valve testing with a dual-needle gauge very awkward, time-consuming and wearying work. Yet many of these instruments remain in use at the time of this writing.

An improved pressure-monitoring instrument for backflow-valve testing has been available for several years. It was developed by two of the present three coinventors, and is manufactured by Fire & Safety Electronics (doing business as Phase Research) of Santa Ana, California, and sold by Duke Products of Irvine, Calif.

The Duke Products unit has two solid-state pressure sensors, attached to the source and discharge sides of the valve respectively. It provides a digital readout derived from a single analog-to-digital converter that is manually switchable between the source- and discharge-pressure sensors.

The same digital readout is also switchable to display the differential pressure. The operator can select any one of the three readouts by operating the display selector switch.

This digital-readout instrument has met with enormous commercial success. That success is considered a testimonial to the difficulty of taking readings to a fraction of one percent of full-scale on a mechanical gauge. Because electro-mechanical sensors, coupled to a digital display, can measure pressure within a tenth of a pound per square inch, the Duke instrument is actually capable of testing operation of a backflow valve to its manufacturer's specifications.

Nevertheless the present inventors have recognized several ways in which the utility of the digital instrument can be even further refined and improved. The specifics of this recognition, and the ways in which the present inventors have succeeded in accomplishing the refinements and improvements, will be set forth in later sections of this document.

SUMMARY OF THE DISCLOSURE

The present inventors have recognized, through very extensive trial-and-error with the Duke Products instrument discussed above, that the instrument was amenable to important improvements and refinements. Before presenting a definition of what is disclosed in this document, we shall offer an informal preliminary orientation.

Through analysis of the specific operations which must be performed by backflow-valve testing personnel, we have recognized that it would be extremely beneficial for efficiency and accuracy of the tests to display simultaneously values of all three pertinent pressures—the high- and low-side pressures, and the differential pressure. Thus, for example, it is not always sufficient to display only the differential pressure at any given time, since such display fails to disclose whether the high- and low-side pressures are both drifting in the same direction at about the same rate; and such information can be very important.

In some portions of a backflow-valve test, particularly to check the cutoff function, all three pressures are to be displayed while at least one pressure is varied—that is to say, varied by the inspector's manipulations of the system under test—so that the differential pressure is sometimes less and sometimes more than a specified increment. In other portions of a backflow-valve test, particularly for leak testing, all three pressures are to be displayed while no pressure changes are imposed upon the valve.

Further, for integrity as well as added efficiency and accuracy of the tests we have recognized that it would be extremely valuable to print a permanent record of all three pressures, together with elapsed time during the test—and to embed these data within a standardized printout format that militates against falsification of tests.

In addition we have determined that the testing of a backflow valve is a sufficiently complicated process to justify incorporation of a programmed digital-electronic microprocessor into a test instrument. The microprocessor receives signals from pressure-sensor measurements of at least two of the three pertinent pressures, and performs several important functions—including suppression of insignificant fluctuations in differential pressure, that otherwise distract and confuse testing personnel.

We have implemented these and many other advantageous features in a state-of-the-art apparatus. Further, we have subjected this apparatus to extensive testing and evaluation, both in the laboratory and in the field, and as a result we have introduced additional improvements derived on a trial-and-error basis.

An important area of optimization of a backflow-valve testing device in accordance with our invention relates to the number of independent pressure sensors employed, and also the number of analog-to-digital converters used to process the sensor signals for use in the microprocessor. Although pressure sensors can be automatically moved from one measurement point to another, and analog-to-digital converters can be automatically switched from one sensor to another, such maneuvers have complicated implications upon measurement speed, accuracy and reliability.

We have determined that the most advantageous course is to provide two dedicated independent sensors to measure two of the three pertinent pressures, respectively; and also to provide two dedicated analog-to-digital converters to process the signals from the two sensors, respectively. In principle, using sensors in common between pressure ports, or converters in common between sensors, is advantageous in eliminating errors that arise through unavoidable mismatch of the sensors or converters.

We have recognized, however, that switching sensors from pressure port to pressure port, or converters from sensor to sensor, introduces unacceptable transients that degrade the measurement (and complicate the system) more significantly than they improve matters by reducing mismatch problems. On the other hand, we have also determined that directly measuring all three pressures is counterproductive in terms of mismatch and related problems, and accordingly that one of the three pressures is most advantageously derived from values of the other two. Other solutions to these optimizations, however, are believed to be within the scope of our invention.

We will now turn from the informal and preliminary orientation above to somewhat more rigorous definitions.

Our invention is a backflow-valve testing device. It is for testing a backflow valve that is, when in service, connected between a fluid source and a fluid-discharge port. In one of its operational modes, the testing device is for use by testing personnel in determining whether the backflow valve interconnects the source to the discharge port only if pressure at a source side of the valve exceeds pressure at a discharge side of the valve by at least a specified increment.

In its most highly preferred form, the testing device includes first and second pressure sensors.

It also includes some means for connecting the first and second sensors to monitor, respectively, two of the following three pressures: (1) pressure at the source side of the backflow valve, (2) pressure at the discharge side of the backflow valve, and (3) differential pressure between the source and discharge sides of the backflow valve. For purposes of generality and breadth of expression in this document, we shall refer to these means as the "sensor-connecting means".

Our testing device also includes some means for deriving a value of the remaining one of the three pressures. These means, again for generality and breadth, we shall call the "deriving means". The deriving means are responsive to the first and second sensors.

Our device further includes some means for substantially simultaneously displaying values of all three pressures for a pressures while at least one pressure is varied so that the differential pressure is sometimes less and sometimes more than the specified increment mentioned above. These means—here again, the "displaying means"—are responsive to both sensors and to the deriving means.

Thus, by virtue of the features of our device, testing personnel can follow values of all three pressures, together with concurrent operation of the backflow valve, during variation of pressure so that the differential pressure is sometimes less and sometimes more than the specified increment. This function, as will be appreciated, is highly specialized to the field of backflow-valve testing.

In another of its operational modes, the testing device is for use by testing personnel in determining whether the backflow valve or immediately associated plumbing is leaking. For such operation, our invention provides a testing device that includes displaying means for substantially simultaneously displaying values of all three pressures for a protracted period, while no pressure changes are imposed upon the valve. As is the case in the operational mode discussed in the preceding paragraphs, the displaying means now under discussion are responsive to both sensors and to the deriving means.

By "protracted period" we mean a suitable time for determining whether leakage is present, and if so what the rate of such leakage may be. Accordingly such a period may be in a range between, e.g., ten and thirty seconds—or as appropriate in some cases even longer, e.g., ten minutes.

The foregoing may be a definition of our testing device in its broadest or most general form. From the foregoing it can be appreciated that even this most general form provides the most fundamental of the beneficial improvements and refinements which we have recognized as desirable—as mentioned at the beginning of this section.

For greatest enjoyment of the benefits of our invention, however, we prefer to provide our testing device with certain additional features or characteristics that optimize its performance, convenience, and usefulness.

Thus as an example we prefer to include at least one analog-to-digital converter, connected to respond to analog electrical signals from the sensors and to develop digital electrical signals corresponding to the analog signals from the sensors respectively. We prefer to provide also, in conjunction with the at least one analog-to-digital converter, some means for digitally combining the digital signals arithmetically to derive the above-mentioned value of the remaining one pressure and for controlling the display means. These means—the "digital electronic processor means" or more simply "digital processor means"—are responsive to the at least one converter.

As another example, we prefer to include some means for printing a permanent record of substantially simultaneous values of all three pressures during variation of pressure so that the differential pressure is sometimes less and sometimes more than such specified increment. These "printing means" are responsive to the digital processor means. As will be appreciated from earlier passages in this Summary of the Disclosure, these means are associated with the first-mentioned operating mode. For use in association with the second-mentioned operating mode, we prefer to include means for printing a permanent record of substantially simultaneous values of all three pressures during the protracted period in which no pressure changes are imposed upon the valve.

As another example, we prefer to include a small, hand-held portable case holding essentially all of the components of the testing device—e.g., when present, the pressure sensors, and the deriving, display, and printing means, and portions of the connecting means. In conjunction with this specialized case we prefer to include a battery housing, within the case, for holding and operatively connecting a battery to power the electrical components that are present—such as, for example, the deriving, display and printing means.

As further examples, we prefer that the printing means automatically print elapsed time with each set of pressure values; and also print heading and footing information on the permanent record, before and after the pressure and time values. We prefer that the heading and footing information, considered together, include these test parameters: substantially unique identification of the testing device itself, identification of testing personnel operating the device, calibration status of the device, condition of a battery in the device, and date and time of the beginning or end of the test, or of both. We also prefer to make provision for identification of the valve being tested; such identification is entered manually by the testing personnel, or preferably automatically by reading of a bar code, optically readable characters, magnetic-strip code, or like indicia associated with the valve under test.

We particularly prefer that, in at least one operating mode of the device, the processor means control the display means to equalize the displayed values of source- and discharge-side pressure, and to display zero as the value of the differential pressure, if the source-side pressure is within a specified threshold range of the discharge-side pressure. Such a specified threshold range is advantageously on the order of 0.2 pound per square inch.

In addition we prefer that our testing device include a digital memory—within, or interconnected with, the processor means—for storing pressure values and other test parameters. In conjunction we prefer that the testing device also include some means for periodically establishing electronic communication between the processor means and a host computer, to debrief the processor-means memory to such a computer.

As a final example, we strongly prefer to provide the above-mentioned "at least one analog-to-digital converter" in the form of first and second analog-to-digital converters, connected to respond to analog electrical signals from the first and second sensors respectively, and to develop digital electrical signals corresponding to the analog signals from the first and second sensors respectively.

We wish to make clear that many or all of the features or characteristics introduced above are advantageously combinable with each other, although many are usable independently of one another, all within the scope of our invention. We also wish to make clear that use of three independent sensors (with as many as three independent analog-to-digital converters), is also believed to be within the scope of our invention—although for reasons mentioned earlier we prefer to use only two sensors.

All of the foregoing operational principles and advantages of the present invention will be more fully appreciated upon consideration of the following detailed description, with reference to the appended drawings, of which:

BRIEF DESCRIPTION OF THE DRAWINGS

In FIG. 1 the printer-paper outer cover appears in position on the case.

FIG. 2 is a like drawing, partly exploded, showing a unitary shaped upper housing section—which forms the front, rear and top panels of the FIG. 1 case—together with certain related components that are mounted to the upper housing section. In FIG. 2 the printer-paper outer cover, mentioned above, appears raised from the case to afford a view of the interior of the printer compartment; within that compartment the printer-paper inner access door appears hinged upward.

FIG. 4 is a like drawing, greatly enlarged, showing a representative key cap for use in conjunction with any of several switches on the FIG. 3 circuit board.

FIG. 8 shows a unitary shaped inner electronics enclosure, battery pack with cover, and unitary shaped lower housing section.

FIGS. 16(1)–16(3) illustrate a representative permanent record printed by the FIG. 1 device, in testing a DC valve.

FIGS. 17(1) and 17(2) show a like record of testing an RP valve.

FIGS. 18(1) and 18(2) show a like record of testing a PVB valve.

DETAILED DESCRIPTION OF THE PREFERRED EMBODIMENTS

Figure 1:
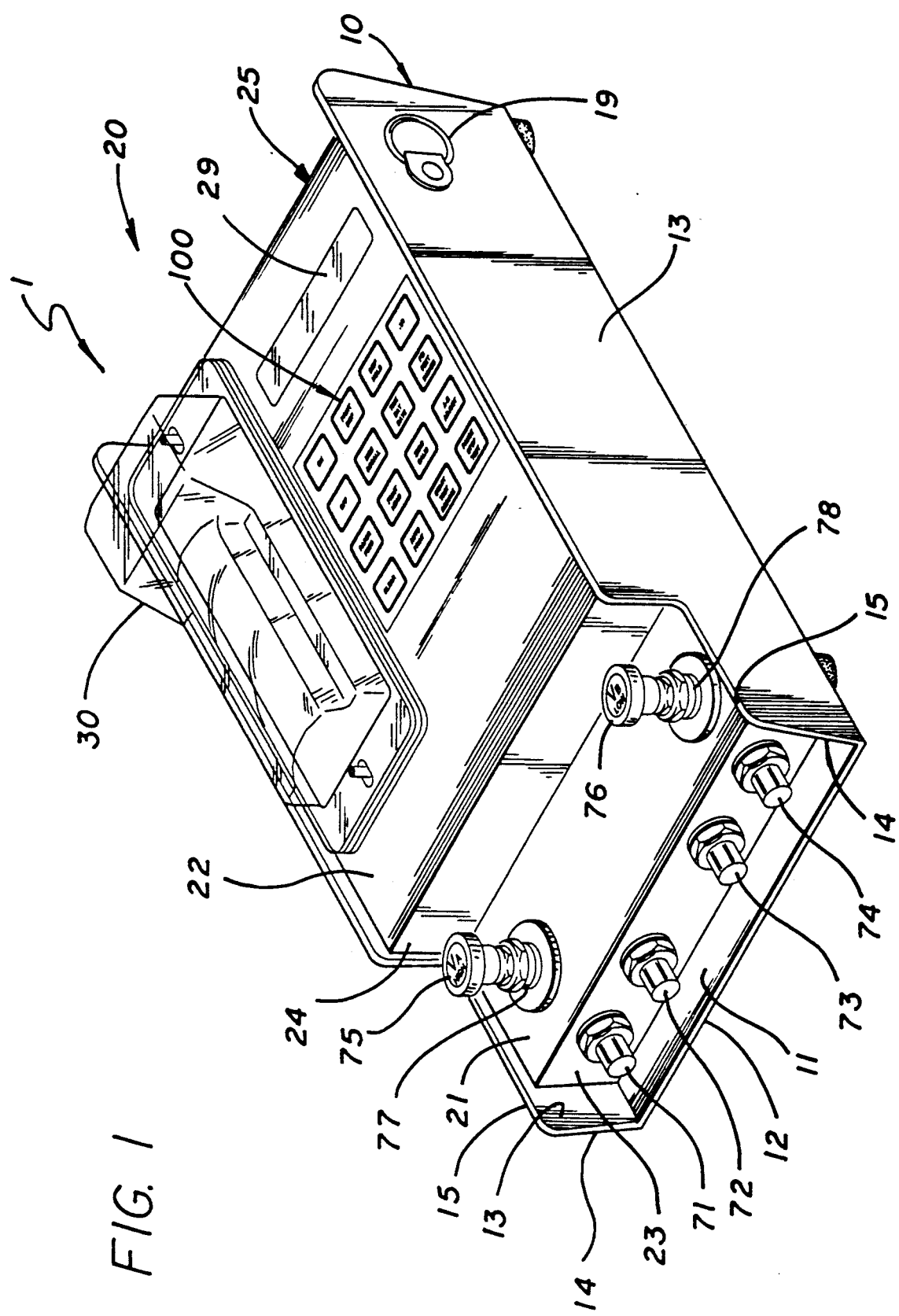
FIG. 1 is a perspective drawing showing the exterior case, controls and piping-attachment points of a backflow-valve testing device that is a preferred embodiment of our invention.

As shown in FIGS. 1 through 3, and FIG. 8, our invention preferably takes the form of a portable handheld device that is mounted in a case 1. The case 1 itself consists of four main elements.

Those elements include a lower housing section 10, which forms a base 11 and upstanding side walls 13 for the system; and an upper housing section 20, which is fixed upon the base 11 and engages the side walls 13. The four main elements of the case also include a printer-paper outer cover 30, removably mounted upon the upper housing section 20; and an inner enclosure 50 (FIG. 8), fitted between the lower and upper housing sections 10 and 20.

The lower and upper housing sections 10 and 20 are preferably formed of aluminum sheet. The upper section 20 is bent to form two upper decks—namely, a front deck 21 and rear deck 22; and also three vertical panels—namely, a front panel 23, an intermediate step panel 24 that vertically offsets the two decks 21-22, and a rear panel 25. The upper section 10 is also bent at its extreme ends to form two horizontal inner feet 26 and 27.

These feet are held to the base 11 as by screwing four screws through clearance holes 18 in the base 11 and into attachment holes 28 punched through the inner feet 26, 27, provided with threaded inserts (not shown). These same four screws advantageously secure four elastomeric pads or outer feet 17 to the underside of the base 11.

The inner enclosure 50 is a unitary molded plastic tray, with upstanding side, front and rear walls 51-54. It contains the electronics system, and it isolates that system environmentally by sealing against the underside of the upper housing section 20. For this latter purpose the inner enclosure 50 carries a continuous foam gasket 55 along the tops of all four walls 51-54.

As will be appreciated, environmental isolation is of utmost importance in a specialized system for testing of backflow valves, for two reasons. First, the environment of such valves in many or possibly most installations is wet—and in a significant fraction of installations is also corrosive. Second, under excessively heavy use or abuse, leaks might develop within the testing device itself.

A battery cover 60 fastens into position beneath the electronics enclosure 50. This cover surrounds—at all directions except the top—a battery pack 61 that is held (as by rivets) against the underside of the electronics enclosure 50. The battery pack thus has its own independent environmental isolation, to protect the electronic system from damage due to acids that might leak from batteries.

The printer-paper outer cover 30 and the rear deck 22 are fitted with mutually mating magnetic gaskets 31, 32 respectively. Two alignment pins 33, 34 are secured to the rear deck 22 for passage through mating alignment holes 35, 36 in the cover 30. These provisions facilitate positive positioning and firm securing of the cover 30 in place, while permitting its instant demounting—for loading of printer paper or removal of printed records. The cover 30 is not waterproof.

A carrying handle 38 is secured rotatably to the rear vertical panel 25 of the upper housing section 20, to facilitate carrying the device to and from inspection sites in the field. Two "D" rings 19 are fixed to the side walls 13 of the lower housing section 10 for attachment of a shoulder strap (not shown), also to facilitate transporting the device. As will be clear, our testing device when so carried by either handle or strap is reoriented with its longest (front to back) dimension vertical, its two top decks facing sideways, etc.

Other features of the invention that are clear in the same drawings include four tubing or plumbing fittings 71 through 74, which protrude through the front vertical panel 23. The good condition of these fittings can be crucial to reliable test results, particularly in leak tests.

When our testing device is carried by its handle, these fittings are protected—by the downward-extending front edges 12, 14 of the base 11 and side walls 13 respectively—from accidental impact with nearby objects. These front edges 12, 14 also serve as a temporary support for the case 1, allowing the case to be rested on end in its handle-carried orientation without damaging the fittings 71-74.

Similarly two valve control knobs 75, 76 extend upward on valve stems 77, 78 respectively from the front deck 21. In the handle-carried orientation of the case 1, these knobs 75, 76 and stems 77, 78 are protected by the outward-extending forward edges 15 of the front segments of the side walls 13. This protection is enhanced by the step panel 22, which forms a protective recess for the valve controls. When our testing device is in its normal operating orientation (resting on the elastomeric outer feet 17) this recessed arrangement tends to protect the valve controls from damage by articles that may be placed across the decks 21, 22.

As seen in FIG. 2, the valve-stem clearance holes 79 are elongated in the forward-to-aft direction, to facilitate firm clamping of both the tubing connections 71-74 and the valve stems 77, 78 to the mutually perpendicular formed sheet-metal front deck 21 and panel 22 respectively. (Details of these attachments appear in FIG. 9.)

Figure 2A:
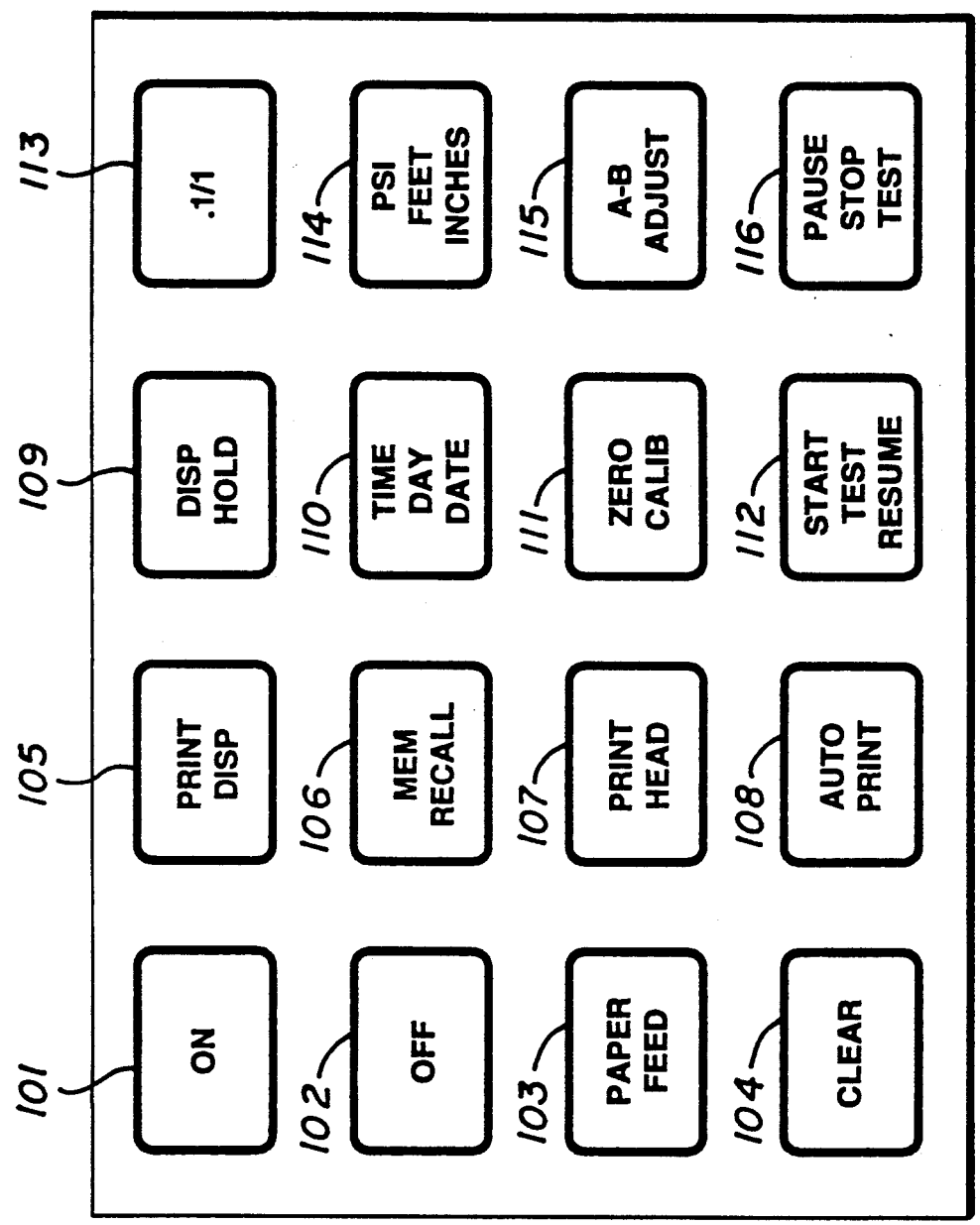
FIG. 2a is a plan view, considerably enlarged, of the keyboard portion of the top panel.
Figure 3:
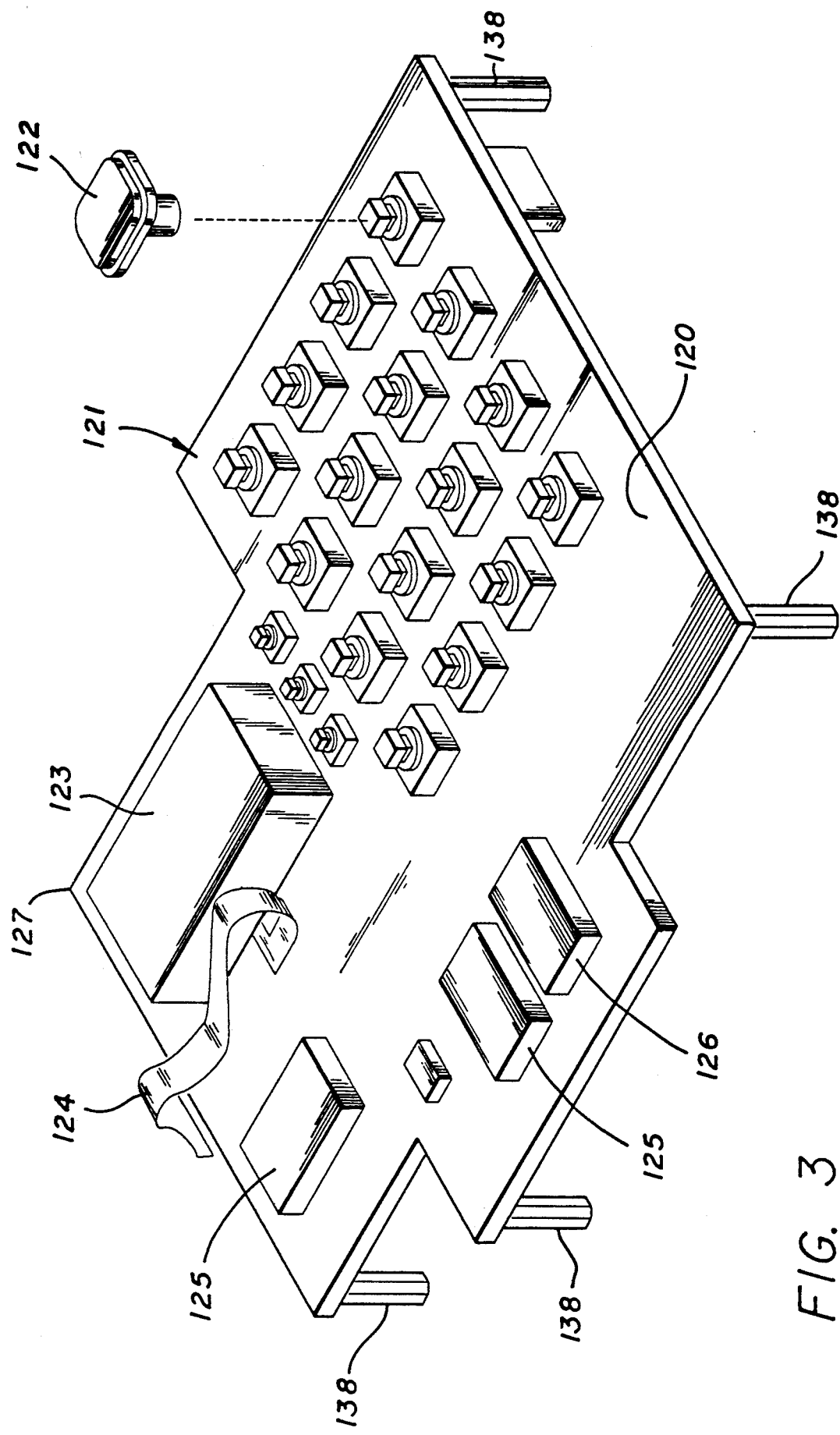
FIG. 3 is a perspective drawing, partly exploded, of an upper circuit board that is mounted within the FIG. 1 case, just below the top rear panel of the FIG. 2 upper section.
Figure 5:
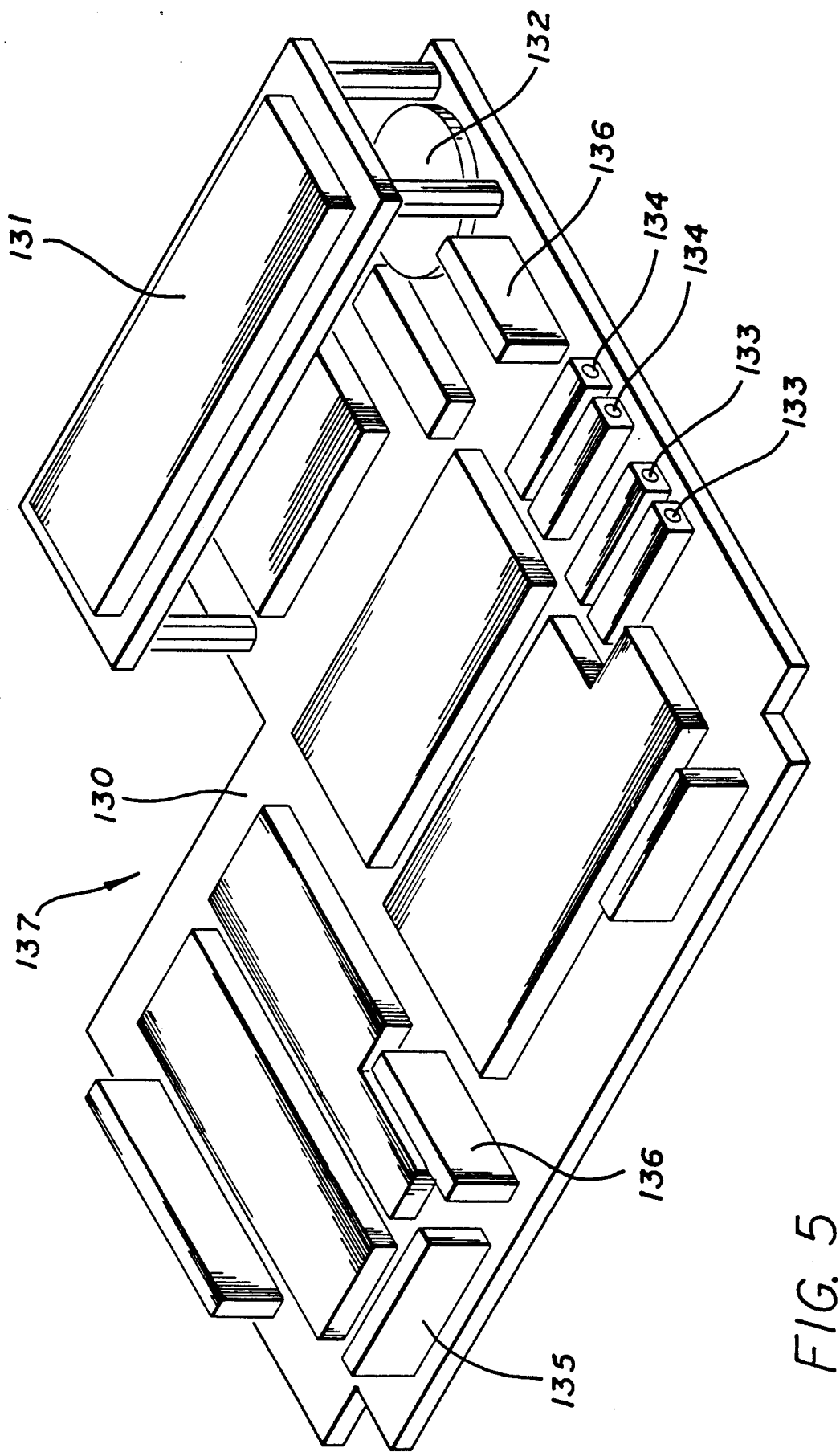
FIG. 5 is a view, similar to FIG. 3, showing a lower circuit board, or motherboard, that is mounted within the FIG. 1 case. The motherboard is disposed just below the upper circuit board.

Also visible in FIGS. 1 and 2 are a flexible keyboard overlay 100, and a window 29 for viewing a liquid-crystal display 131 (FIG. 5). The keyboard overlay 100 is a continuous, waterproof elastomeric sheet for environmental isolation, and includes indicia that present a title for each switch, as shown in FIG. 2a.

Just below the rear deck 22 is an upper printed-circuit board 120, spaced from the rear deck 22 by standoffs 39. This upper board 120 carries an array of mechanical switches 121, aligned below respective indicia on the keyboard overlay 100.

Between each switch 121 in the array and the corresponding indicium on the overlay 100 is a respective keycap 122. For clarity of illustration in FIG. 3, only one representative keycap 122 is shown, but as will be understood the apparatus includes a separate cap 122 for each switch 121 respectively.

The keyboard overlay 100 has the outward appearance of a membrane keypad. Such a membrane keypad has the advantage of presenting a unitary, sealed surface that protects the internal elements from the environment.

On the other hand, the key areas on a membrane keypad undergo very little travel when actuated, and accordingly visual observation of resulting apparatus function is usually required to verify that a key has indeed been actuated. Such an additional requirement on the attention of testing personnel would be very undesirable for backflow testing in the field, as entries must be made quickly while attending to other pieces of equipment and other functions.

Some equipment using such keypads provides an acoustic signal for the operator, for verification of actuation. Such acoustic systems are sometimes difficult to hear in noisy field environments; and if very loud, for reliable audibility, are also considered by many people to be unpleasant or offensive in constant use.

Another type of keypad now in popular use is an elastomeric sheet with outward-extending, formed individual key areas on the outside of the apparatus. On the inside, behind each key area, is an electrically conductive area for engagement with a printed-circuit board. Such keypads can be made with considerable key travel, but require a cover panel with individual holes through which the individual key areas protrude.

Use of such a perforated cover panel would be very undesirable for backflow testing in the field. The region between the elastomeric sheet and the perforated panel would accumulate debris and contaminants, potentially leading to an eventual interruption of service.

Still another type of keyboard providing satisfactory travel is a typewriter-style unit employing individual switches, each with its own keycap. Such keyboards permit ample travel, and in fact overtravel—but no positive action to indicate by tactile sensation that connection has been made. Accordingly acoustic indication is usually provided; a soft clicking sound is generally acceptable in an office environment, but the drawbacks of such a feature in field use have been outlined above.

In addition, typewriter keyboards of course are relatively very open structures, inviting severe accumulation of debris and liquids. Finally, because of the strongly contoured geometry of the keys, they are not readily amenable to provision of smooth protective overlays.

All of these drawbacks are avoided by the configuration used in our preferred embodiment, as shown in FIGS. 1 through 4. The individual keycaps 122 are custom-formed (FIG. 4) to closely abut one another, providing a relatively smooth infra-structure for support of the smooth, fully sealed protective keyboard overlay 100 on the rear deck 22. The mechanical switches 121 provide a positive action, with ample travel of roughly 0.25 to 0.4 mm (0.010 to 0.015 inch), for tactile verification of operation.

As shown in FIG. 2a, the keyboard overlay 100 has four rows and four columns of keys, whose titles appear in the drawing. The ON key 101 turns on the computer portion of our testing device, and initates a self-test routine. The OFF key 102 turns the unit off.

The PAPER FEED key 103 advances the paper by the height allowed for one printed line, for each actuation of the key. If held depressed, this key advances the paper continuously.

The CLEAR key 104 stops any printing that may be in progress. A single actuation of the key stops either the "auto print" or "test" functions (discussed below), if in progress. If pressed a second time after the "test" function, the CLEAR key 104 also stops printing of a footing. In addition, the CLEAR key returns the display to reading the column headings and pressures after use of the "memory recall" function (also discussed below).

The PRINT DISP ("print display") key 105 prints the two lines of information shown on the liquid-crystal display. During the "memory recall" function, this key prints test results from memory. Further, during the "auto print" and "test" functions, the PRINT DISP key 105 prints the next line with a notation "****" next to the pressure values.

The MEM RECALL ("memory recall") key 106 displays a message on the liquid-crystal display—either "PRINT DISPLAY" for all current tests, or "MEMORY RECALL" for prior tests. This key also causes the device to begin cycling through all prior tests for which results are in memory.

The PRINT HEAD ("print heading") key 107 initiates printout of a custom heading—ten lines maximum—if so programmed at the factory, foliowed by identification of the tester, its calibration status, system-check status, battery level, and time, day and date. The AUTO PRINT key 108 initiates an automatic printing sequence; this sequence too begins with a printout of the time, day and date, and then proceeds to printing of elapsed time with the high, low and differential pressures values every ten seconds.

The DISP HOLD ("display hold") key 109 causes the pressure readings on the liquid-crystal display 131 to remain unchanged, while the key is held depressed. When actuated during the "test" or "auto print" function, the DISP HOLD key 109 also prints "HOLD" in the time column for the next regular data printout. If used while time, day and date are displayed, this key begins a clock-setting sequence, and advances the cursor through setting modes for the time.

The TIME DAY DATE key 110 causes the liquid-crystal display to show the time, day and date; and places the system in the time-setting mode. If used when those data are already shown, this key returns the system to pressure-value display.

The ZERO CALIB ("zero calibration") key 111 automatically readjusts to zero the values read from both sensors, provided that neither sensor is actually sensing a pressure greater than two pounds per square inch. This key is intended for use with both sensors open to ambient pressure.

If pressed when no test is in progress, the START TEST RESUME key 112 assigns the next available test serial number in sequence to a new test, prints that test number with column headings, and starts the test at elapsed time zero. If pressed while a test is paused, this key 112 causes the test to resume.

The 0.1/1 key 113 changes the display, printout and values in memory by rounding the data for both high- and low-pressure channels to whole units, if the display is reading in units of pounds per square inch or in feet; however, differential pressure continues to be expressed in tenths. The PSI FEET INCHES key 114 determines the units in which the display operate: each actuation of this key advances the system through a sequence of the three units. If pressed when the unit is in the time-setting mode, these two keys respectively increment and decrement the hour or minute setting of the real-time clock.

The A-B ADJUST key 115 calibrates the discharge-side or "B" sensor to equal the value then obtained from the source-side or "A" sensor—provided that values actually found from the two sensors, when the A-B ADJUST key 115 is actuated, are within 0.4 pound per square inch of one another. The PAUSE/STOP TEST key 116 stops the "test" function if pressed once during that function; if pressed a second time, this key also causes the testing device to print a footing.

The electronics and firmware which provide all of these functions, as well as many additional aspects of operation, will be presented near the end of this detailed description. First we shall conclude our discussion of the physical layout of the apparatus, and show how our testing device is typically interconnected with valves to be tested.

Also on the upper circuit board 120 is a thermal printer 123, with two flexible cables 124 that interconnect the printer directly to data and power connections elsewhere. The board 120 also carries three power-supply chips 125, 126.

One of these integrated-circuit chips serves as a separate power supply 126 for the printer, and the other two units 125 furnish power to the analog and general data-processing circuits. This allocation of the power-supply functions is advantageous to minimize measurement and data-display degradation through cross-talk, via the power supplies, from the relatively high-power printer drivers to the sensitive analog channels and general data-processing functions.

Spaced below the upper circuit board 120 by standoffs 138 is a lower printed-circuit board or motherboard 130. This board carries all of the analog and general data-processing circuits, and a liquid-crystal display 131—thus to an extent isolating these sensitive elements from vibration-generating mechanical units on the upper board 120—i.e., the printer 123 and switches 121. Circuitry and a connector on the motherboard 130 provide drive and control power to the printer directly via its separate cables 124 noted earlier.

For versatility in displaying various different types of information, the liquid-crystal display 131 is preferably of a dot-matrix, forty-eight-character (twenty-four characters in each of two lines) supertwist type. It is elevated above the rear edge of the upper board 120, and aligned to be visible through the window 29 in the rear deck 22.

Whenever the main battery pack 61 is switched off, discharged or removed, an auxiliary battery 132 on the mother-board 130 provides power for the clock, memory and related circuitry. This system maintains continuity of time information, and retains the headings and test data in memory.

Also on the motherboard 130 are factory-adjustment controls—zero- and scale-adjustment controls 133, 134 for the source- and discharge-side measurement channels respectively. In addition this board 130 carries a receptacle 135 for one termination of an internal cable used in connecting our testing device to a host computer; and also carries one half of a connector 136 that interconnects the two circuit boards 120, 130.

Both circuit boards 120, 130 are cut away, and the inner enclosure 50 for the electronics system is recessed, at their respective left-rear corners 127, 137, 57 to form an unobstructed space that serves as the paper-housing portion of a printer-and-paper compartment 40. The paper-housing portion thus extends nearly the full interior height of the case 10, to accommodate a full roll or pack 41 of printer paper.

Figure 6:
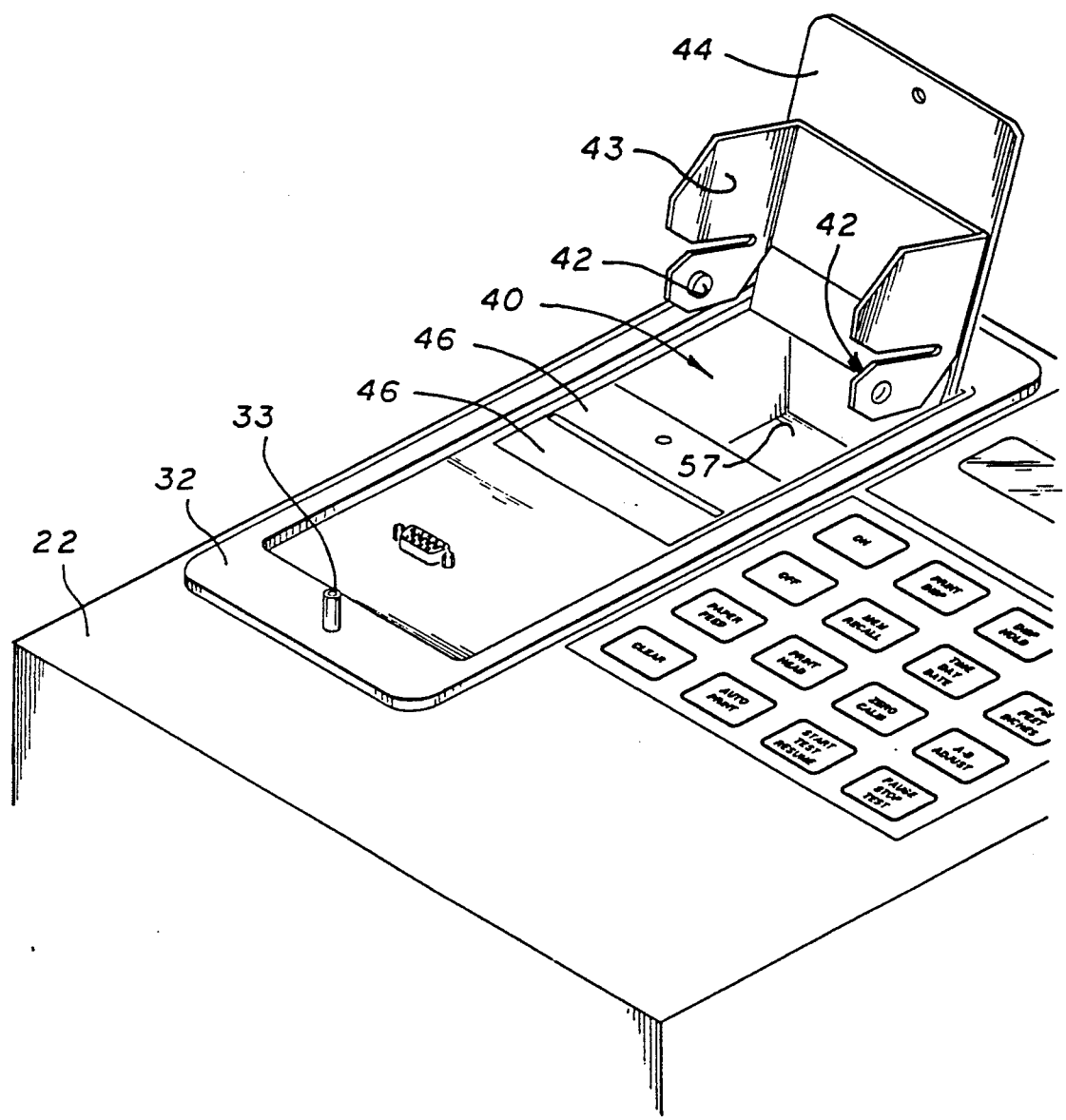
FIG. 6 is a like view, but enlarged, showing the interior of the printer compartment.
Figure 7:
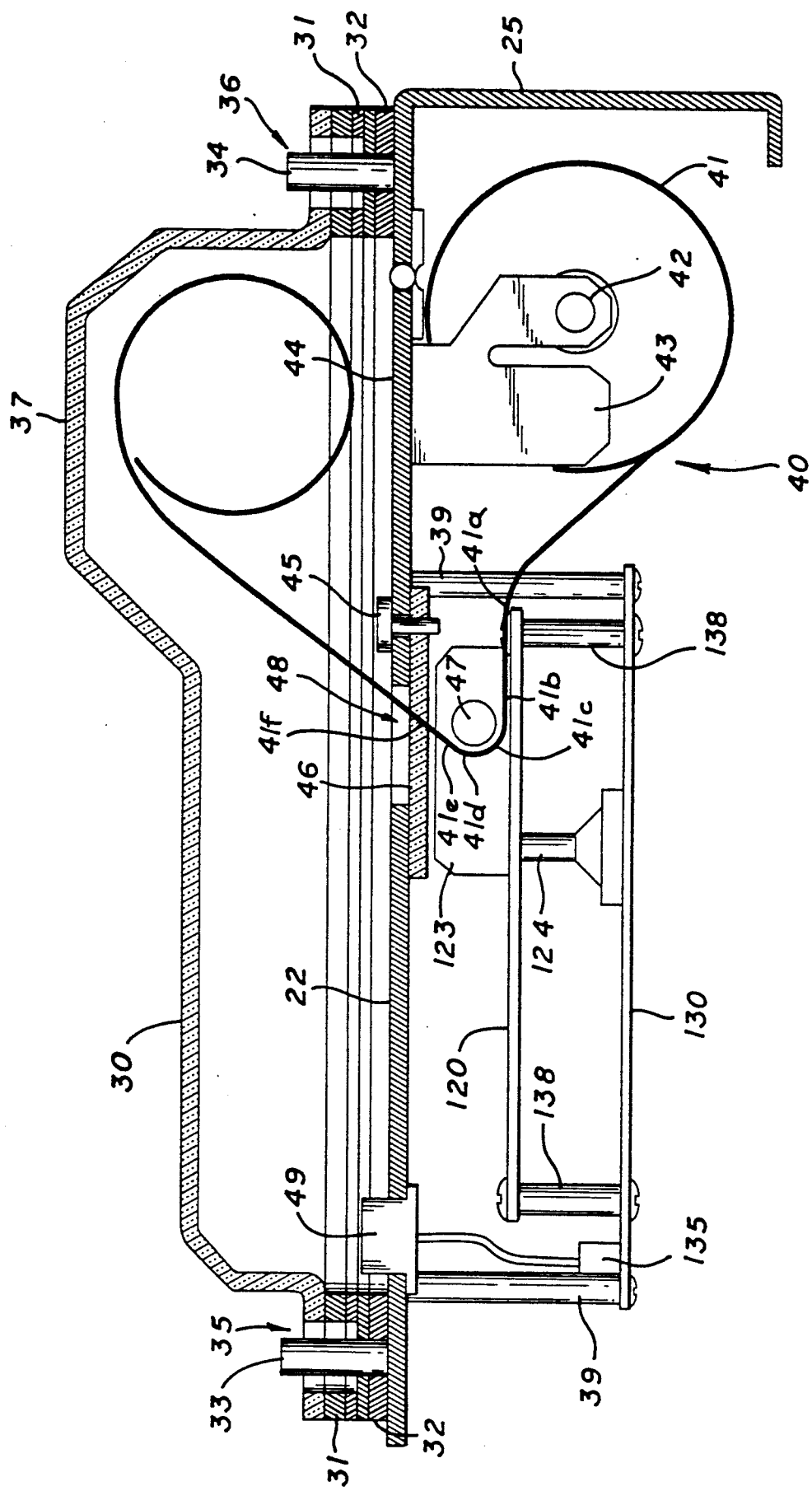
FIG. 7 is an elevation in longitudinal section, showing the upper housing section, the printer compartment, and the two circuit boards.

As shown in FIGS. 6 and 7, the paper roll 41 is rotatably carried on a spindle 42—which is in turn suspended within the printer-and-paper compartment 40, by a double-sided bracket 43, from the underside of an opaque inner cover 44. This cover is hinged so that when opened it carries the bracket and spindle upward out of the compartment 40 to facilitate loading a fresh roll 41 of printer paper.

To retain the paper in position for operation of the testing device, a securing screw 45 passes through a clearance hole in the cover 44 and threads into the rear end of a printer-viewing window 46. The screw thus holds down the cover, and with it the paper.

During such operation the paper passes from the bottom of the roll or pack 41 forward at 41a to the rear edge of the upper circuit board 120, and then further forward at 41b across that rear edge and into the rear of the printer 123 via an input slot. Within the printer, the paper next passes at 41c beneath the printer drum 47; and then at 41d in front of the printer drum 47 for imprinting.

A twenty-four-character field is printed on 5.7 cm (2¼ inch) thermal paper, at the front of the drum 47. Thence the paper proceeds at 41e out of the printer via an exit slot at the top of the printer 123, and finally at 41f through an aligned exit slot 48 in the printer-viewing window 46.

The window slot 48 is angled to guide the printed paper rearward, to accumulate within a dome 37 forming the upper rear portion of the outer cover 30 (FIGS. 1 and 2). The upper, forward edge of the angled slot 48 serves as a paper cutter to facilitate neat removal of a completed test record.

The previously mentioned cable from the computer-data receptacle 135 (FIG. 5) on the motherboard 130 is terminated just beneath the rear deck, at another data receptacle 49 (FIG. 6). This receptacle 49 serves as an external port for cable connection (not shown) to a host computer.

Figure 9:
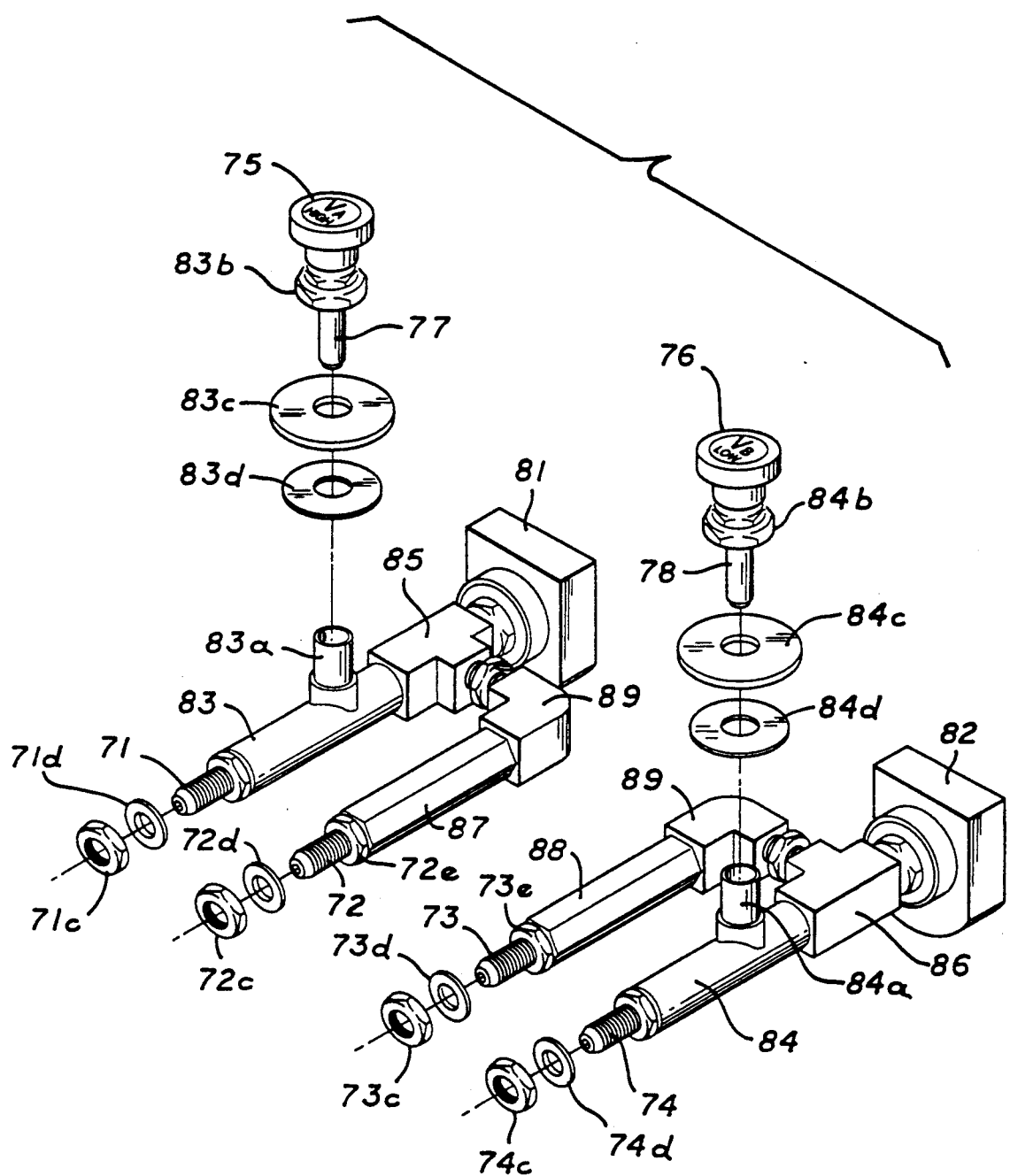
FIG. 9 is a like view of the plumbing—together with associated pressure sensors-and certain mounting hardware—for the FIG. 1 apparatus.

As shown in FIG. 9, the four pressure fittings 71-74 are connected in pairs, within the case 1, to two pressure transducers or sensors 81, 82 respectively. These are solid-state integrated strain-gauge units, rated to 200 pounds per square inch and providing a precise reading to within plus or minus one-tenth pound per square inch. The sensors in turn are wired to preamplifiers (FIG. 19) on the motherboard 130.

The source-side or high-pressure fittings 71, 72 are both connected to one common sensor 81. The outboard source-side fitting 71, however, is connected to that sensor 81 through a valve 83 (and a "T" connection 85), whereas the inboard source-side fitting 72 is connected to the same sensor 81 directly—i.e., through uninterrupted or direct piping connections 85-87-89.

Symmetrically, the discharge-side fittings 73, 74 are connected to a common sensor 82. As on the source side, the discharge-side outboard connection is via a valve 84 (and "T" connection 86), while the inboard connection is direct, through piping 86-88-89.

The valved or indirect connections in both the source and discharge sides are via standard forty-five-degree male flare fittings 71, 74, threaded into the valves 83, 84 respectively. The direct (inboard) piping in both high- and low-pressure sides is through custom flare fittings 87, 88 respectively, which are turned from hexagonal stock; and thence through respective conventional elbow-nipple combinations 89 to the common "T" fittings 85, 86.

All four flare fittings 71-74 are clamped to the front panel 23 by external jam nuts 71c-74c respectively, with intermediate washers 71d-74d. The inboard fittings also carry internal jam nuts 72e, 73e. The valve bodies 83a, 84a at both sides protrude upward with their stems 77, 78 respectively through the oval valve-body clearance holes 79 in the front deck 21; and are clamped to that deck by internally threaded circular plastic panel nuts 83c, 84c, with intermediate washers 83d, 84d. The valve bonnets 83b, 84b thread onto the bodies 83a, 84a respectively in generally the usual fashion—but above the panel nuts 83c, 84c.

The use of these internal connections in testing the various backflow-valve types can now be appreciated. We shall present some discussion of these connections and procedures here—and additional details after introducing the electronics and firmware subsystems.

FIGS. 10 through 15 illustrate the test connections to the several valve types. In each of these drawings, some or all of the testcocks and shutoff valves shown in association with the backflow valve which is under test may be either actually built into the backflow valve itself—or some or all of these testcocks and shutoff valves may be part of the system into which the valve under test has been installed. Functionally speaking, such variations are all immaterial to use of our device.

Shutoff valves upstream or downstream of the valve under test (or both, for some valves) are always to be closed in preparation for testing. Thus the backflow valves themselves are depressurized or equally pressurized throughout all their sections at the outset of the test; and special provision must be made for application of test pressures to various points in the valve or system. That is one major function of the valved fittings 71, 74 that are included in our testing device.

For other tests, venting of the sensors to ambient pressure is required. This is a second major function of the valved fittings 71, 74.

Figure 10:
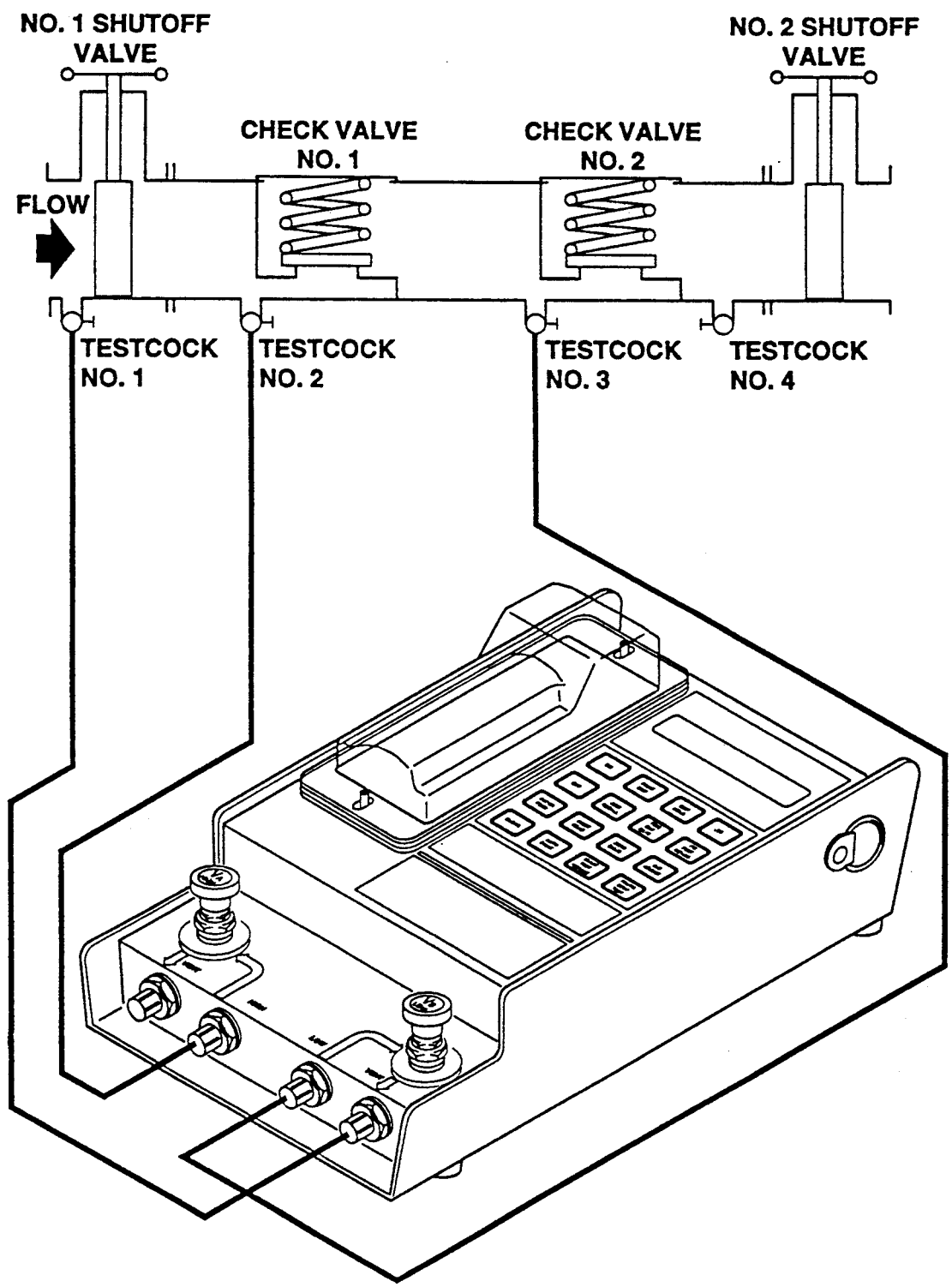
FIG. 10 is a primarily diagrammatic view, but with the FIG. 1 device appearing roughly in perspective, showing that device connected to test an input stage of one type of backflow valve: a type known as a "DC" or "double check" valve.
Figure 11:
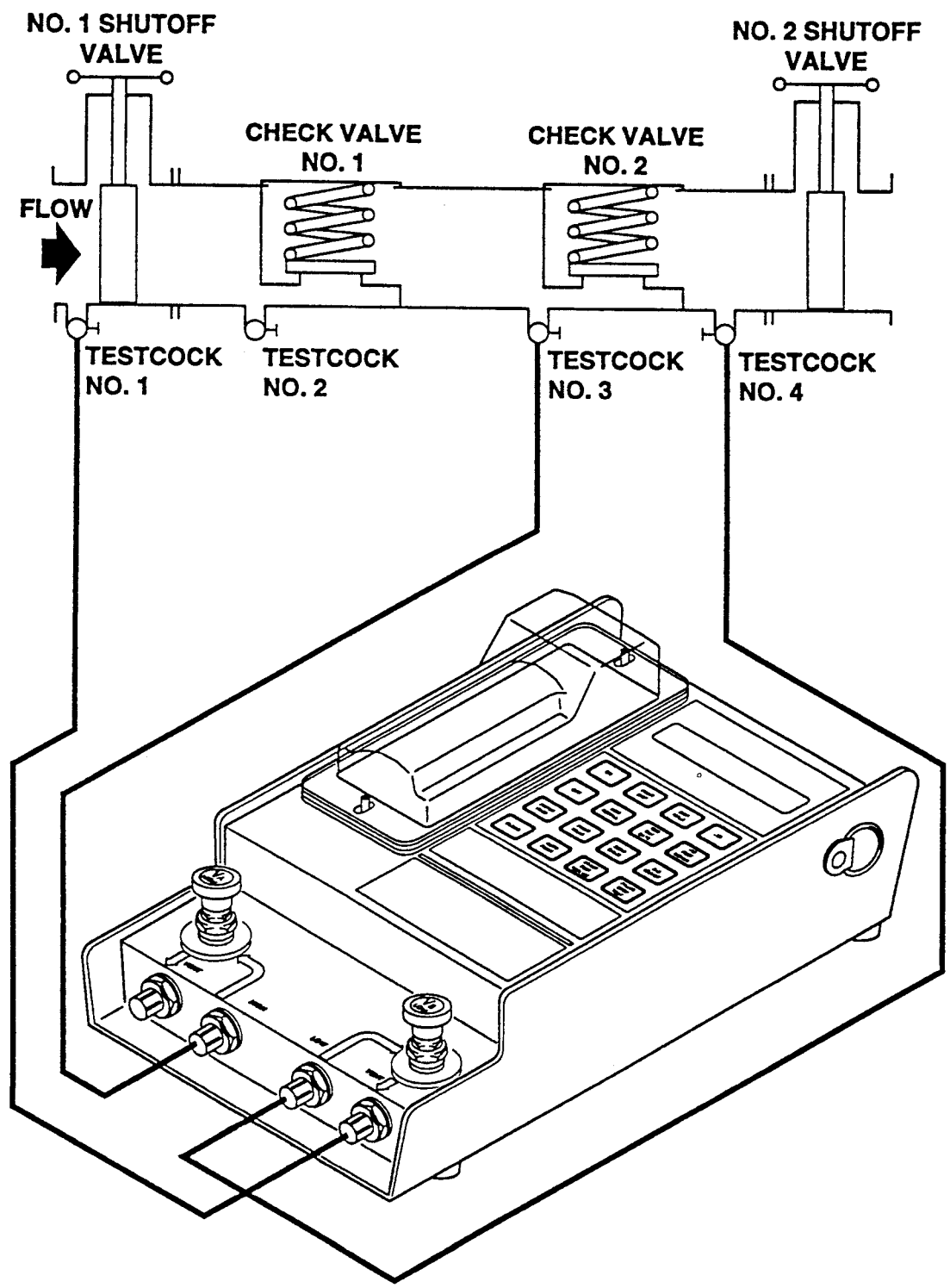
FIG. 11 is a like view of the FIG. 1 device connected to test an output stage of the same DC type of backflow valve.

FIG. 10 illustrates connection of our testing device to a DC or double-check valve. Such a valve indeed has two check-valve sections, in series as shown; FIG. 10 represents connection for testing of the first section or stage, and FIG. 11 represents connection for testing the second section or stage.

In FIG. 10 the direct or unvalved plumbing connections of our testing device are used to connect the high-pressure sensor to the source side of check valve #1—the first stage or section—through its testcock #2; and the low-pressure sensor to the discharge side of the same section, through its testcock #3. Meanwhile the valved connections of our device are used to apply positive pressure from the isolated high-pressure source, via its testcock #1 that is upstream of the No. 1 shutoff valve, to the discharge side of the backflow-valve first stage; and to preliminarily vent the supply side of that stage to ambient.

It will be recognized that these latter two connections represent backpressure on the first stage—which is to say, an abnormal pressurization condition, to which the first-stage check valve should respond by closing to prevent backflow. Furthermore, the valve should close tightly, so that not even small leaks propagate backward along the system from the discharge to the source side of the first stage.

Our device thus is used to verify first that a back-pressure is in fact being applied to check valve #1; and second that the pressure differential across that stage is maintained and the source side of the stage remains at ambient pressure—even if the initially established vent path is closed, as at either testcock #2 or our source-side valve 83.

If these conditions are met, then the two direct-connection fittings are reconnected to testcocks #3 and #4 as shown in FIG. 11, to repeat the test for the second stage, check valve #2. If not, however, then other tests can be made to verify the fault and determine some of its characteristics.

Figure 12:
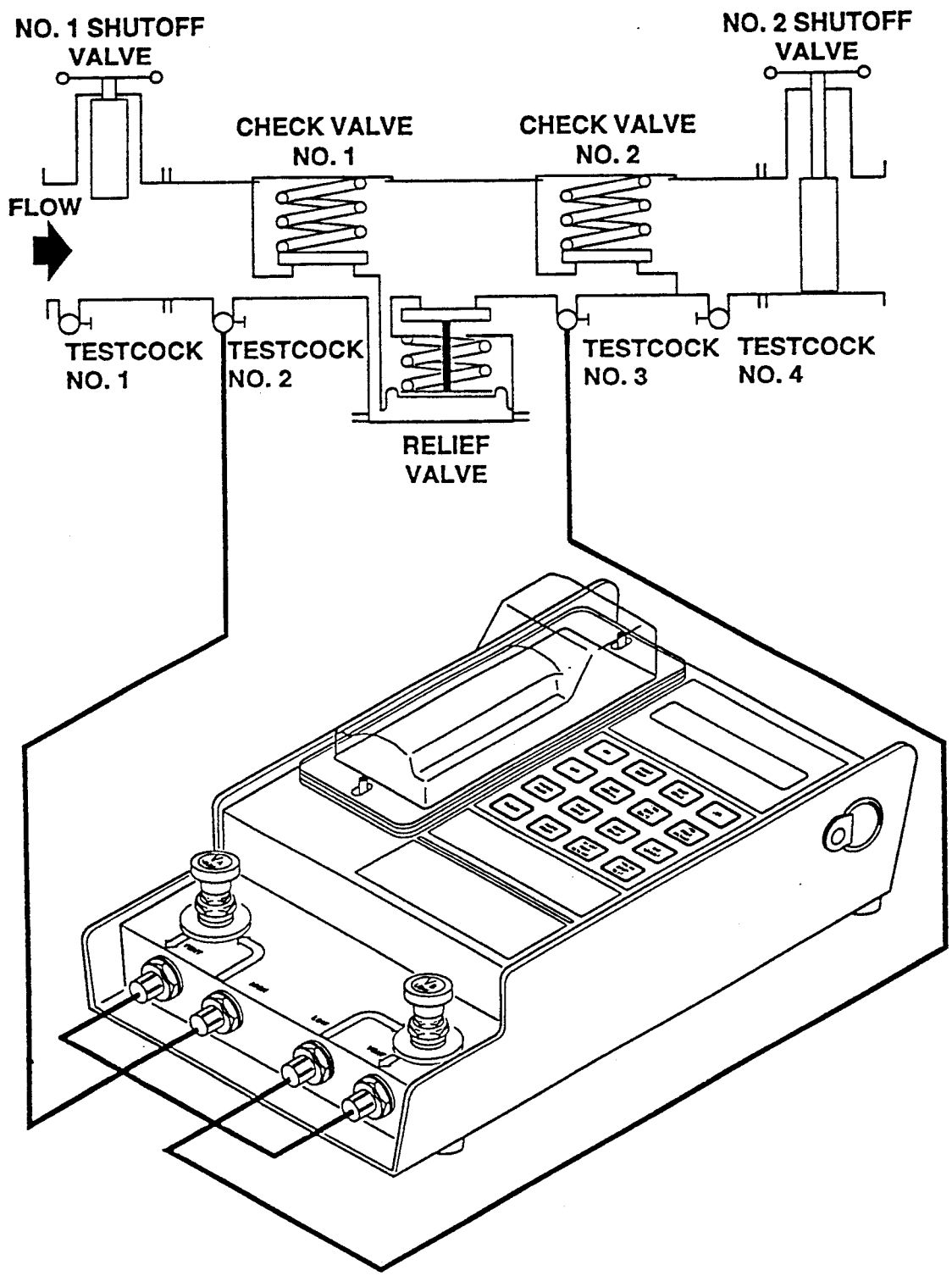
FIG. 12 is a like view of the FIG. 1 device connected to test an input stage of a second type of backflow valve: a type known as an "RP" or "reduced pressure" valve.
Figure 13:
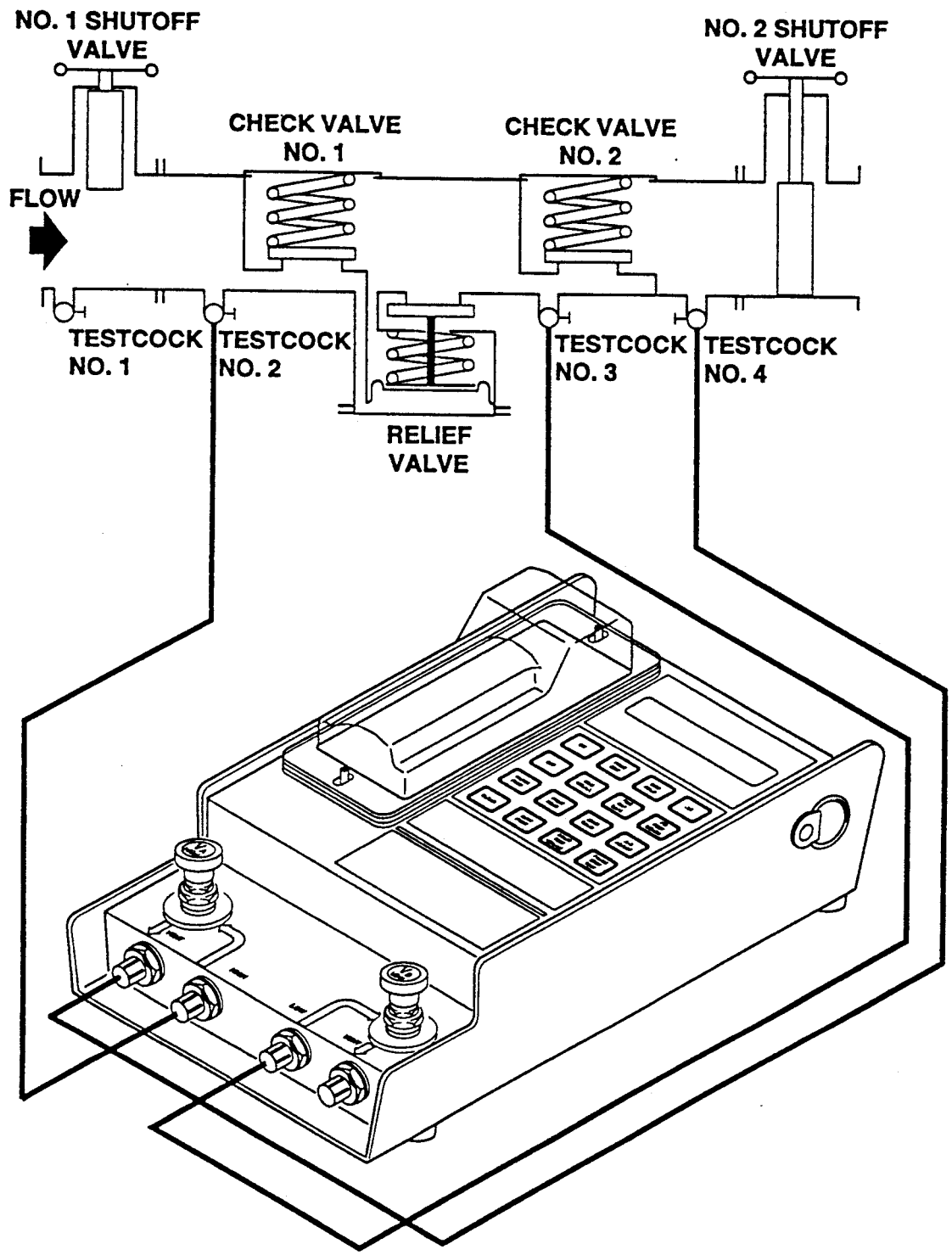
FIG. 13 is a like view of the FIG. 1 device connected to test an output stage of the same RP type of valve.

FIGS. 12 and 13 illustrate connection for testing of an RP valve. Valves of this type also have two check-valve sections in series and differ from the DC system only by interposition of a relief valve, as shown in the drawings, between the two check-valve sections.

During normal operation to supply fluid from the pressurized source to the discharge point (left to right in the drawings), both check valves are open; and the flow produces a pressure drop across each check valve. The relief valve has a sensing diaphragm that is in parallel across check valve #1 and thus in parallel with the control spring of that valve. The source-side pressure exceeds the central-chamber or first-stage discharge-side pressure by a high enough differential, acting on the sensing diaphragm of the relief valve, to hold the relief valve closed against the action of its own bias spring.

In event of source-pressure failure, or anomalous pressurization of the discharge side of the valve, the check valves should both close; at the same time, equal pressurization across the relief-valve sensing diaphragm—or back-pressure across that diaphragm—leaves that valve to be controlled by the bias spring, which forces the relief valve open. The resulting discharge to ambient from that valve is designed to protect the source against contamination through possible leakage of either check valve.

For test purposes, when shutoff valve No. 2 is closed to halt flow through the system, pressure should equalize throughout the system. In the absence of an adequate positive differential across check valve #1, that section should close; at the same time equal pressurization across the relief-valve sensing diaphragm allows the bias spring to force the relief valve open as in the case of pressure failure.

In this instance, however, the resulting discharge to ambient from the relief valve should open check valve #1 slightly, resulting at equilibrium in a slow leak through check valve #1 and the relief valve in series. Such a condition could leave some ambiguity as to the location (as between the two valves) or character of the fault; test procedure therefore should permit resolution of such ambiguity.

Operation of the first two valves in the system is tested by interconnecting the source and discharge sides of check valve #1, through use of a bypass hose between the two valved fittings 71, 74. Shutoff valve No. 1 remains open during test of an RP valve; high pressure for testing purposes is accordingly available at testcock #2. The bypass hose therefore allows equal pressures to be maintained in the source and discharge sides of the first stage without any flow through check valve #1—the flow through the relief valve being supplied through the bypass hose and our testing device.

Thus by careful adjustment of either of the valves 83, 84 in our device, testing personnel can determine whether—at negative, zero or small positive differential across check valve #1—that valve is closed and the relief valve is open, as they should be. If these conditions are not satisfied, further tests can pinpoint the fault.

Testing of the second stage, check valve #2, in an RP valve is substantially the same as for the first stage, but simpler as the relief valve is not involved. A small amount of backpressure from testcock #2 is applied to the discharge side of the second stage—through the valved fitting 71, in our device, that is more usually connected to the source side.

Ambient pressure can be applied to the central chamber (i.e., the source side of the second stage) through the other valved fitting 74 in our device; consequently in this particular connection arrangement the backpressure will be measured as a positive pressure. (This has the advantage of requiring fewer connection changes; but as will be apparent the reversal of pressure indication can be avoided by reversing the tubing connections if desired.)

Figure 14:
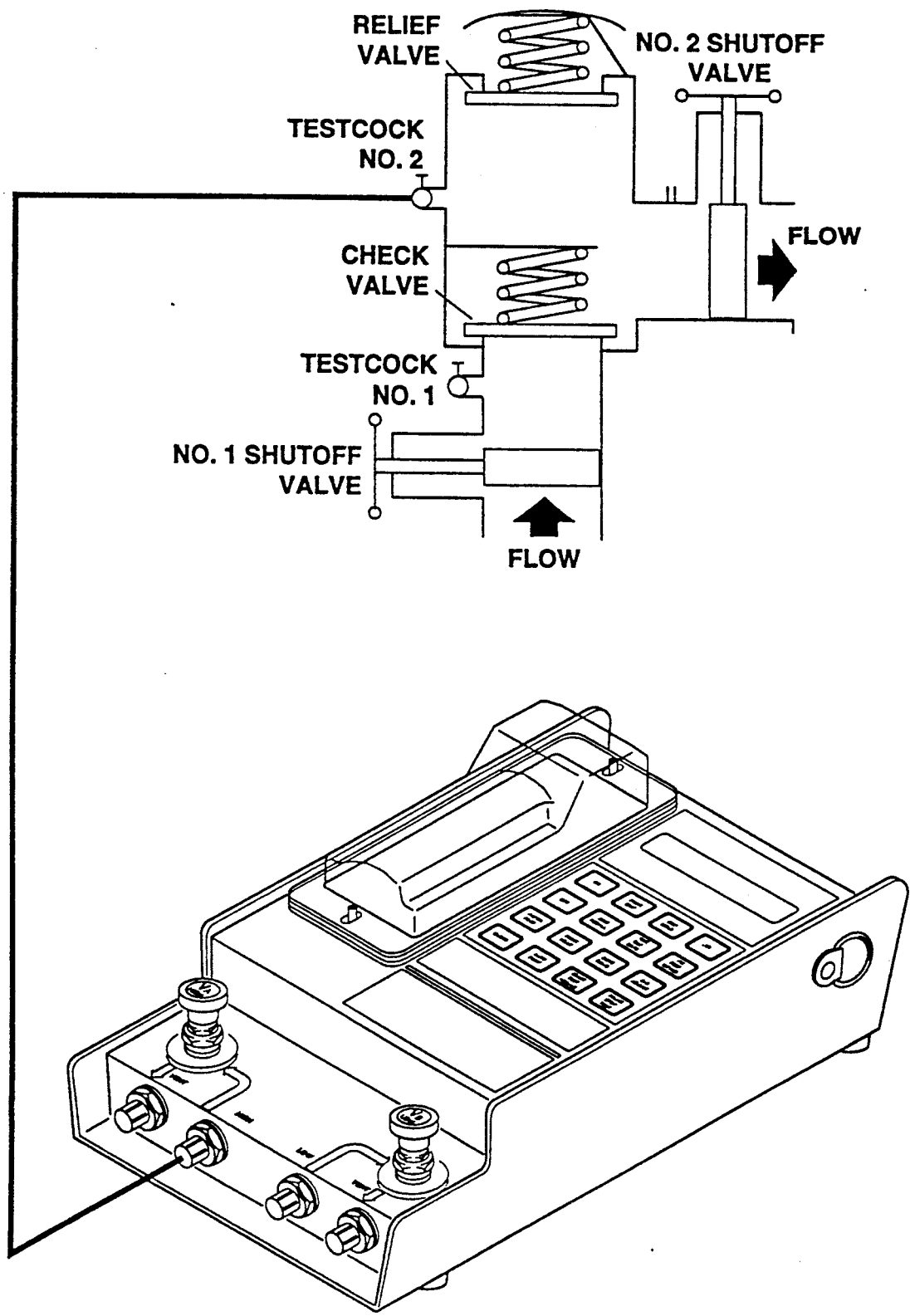
FIG. 14 is a like view of the FIG. 1 device connected to test an input stage of still a third type of backflow valve: a type known as a "PVB" or "pressure vacuum breaker" valve.
Figure 15:
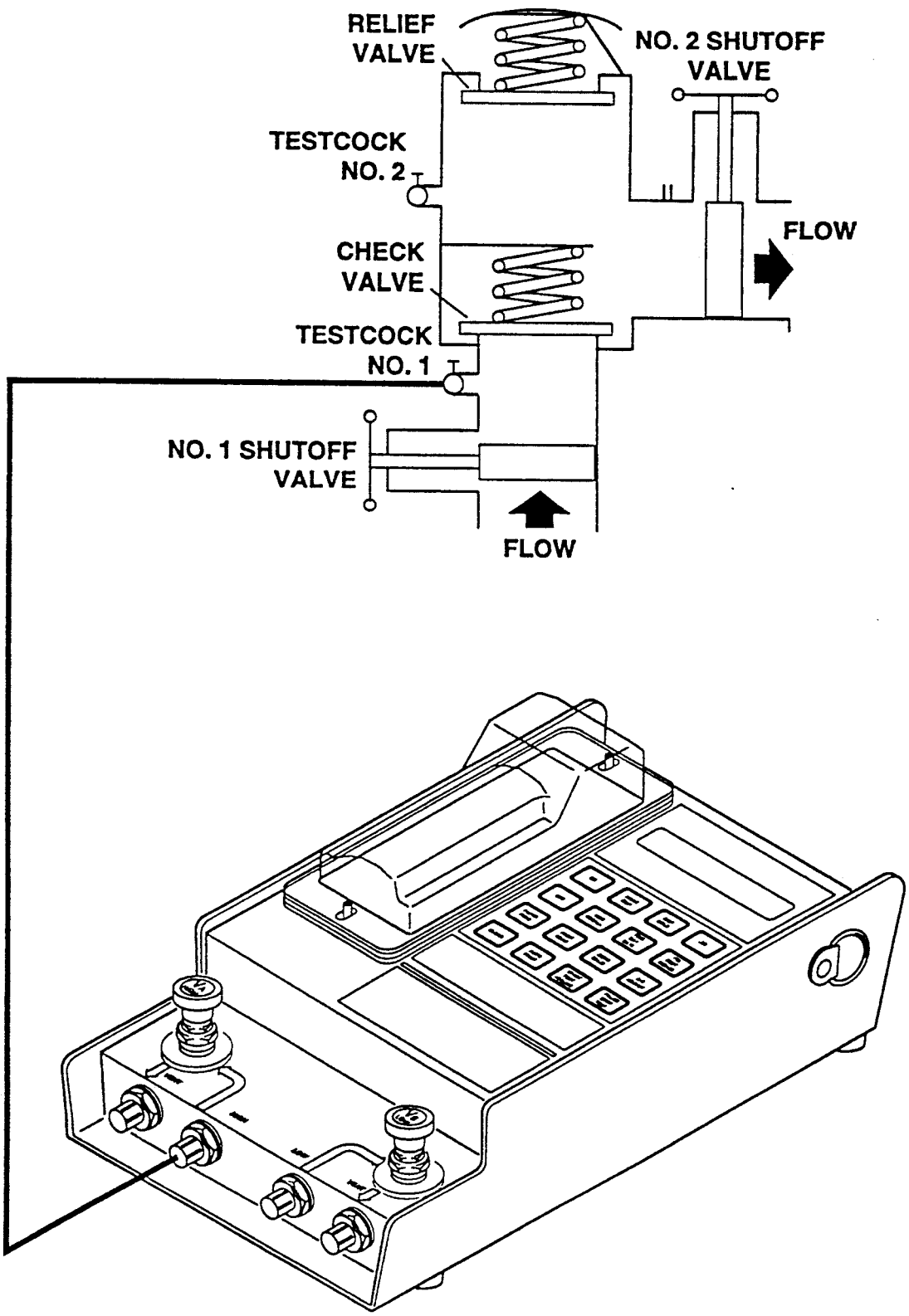
FIG. 15 is a like view of the FIG. 1 device connected to test an output sta e of the same PVB type of valve.

As shown in FIGS. 14 and 15, a PVB valve is a simpler version of an RP valve: a PVB valve has only one check-valve stage, and its relief (or "air inlet") valve simply vents the valve chamber to ambient whenever pressure in the chamber falls below a control value.

In FIG. 14 the two shutoff valves are both closed, and the pressure across the check valve should fall to zero—shutting the check valve. The relief valve will remain closed as long as internal pressure is sufficient to hold the biasing spring in compression. Liquid is then released from the chamber by a gradual opening of the source-side valve 83 on our testing device, until the relief valve opens. This critical pressure is then captured in memory, and in the permanent record, through actuation of the DISP HOLD key 109.

FIG. 15 shows a test with the system repressurized and both shutoff valves again closed. Our source-side sensor A is connected to testcock #1, and pressure in the chamber is dropped by opening testcock #2. When the dripping stops at testcock #2, the check valve is closed and holding. The pressure then displayed, and printed by actuation of the DISP HOLD key 109, is the pressure differential to ambient at which the check valve maintains a seal.

Figure 19:
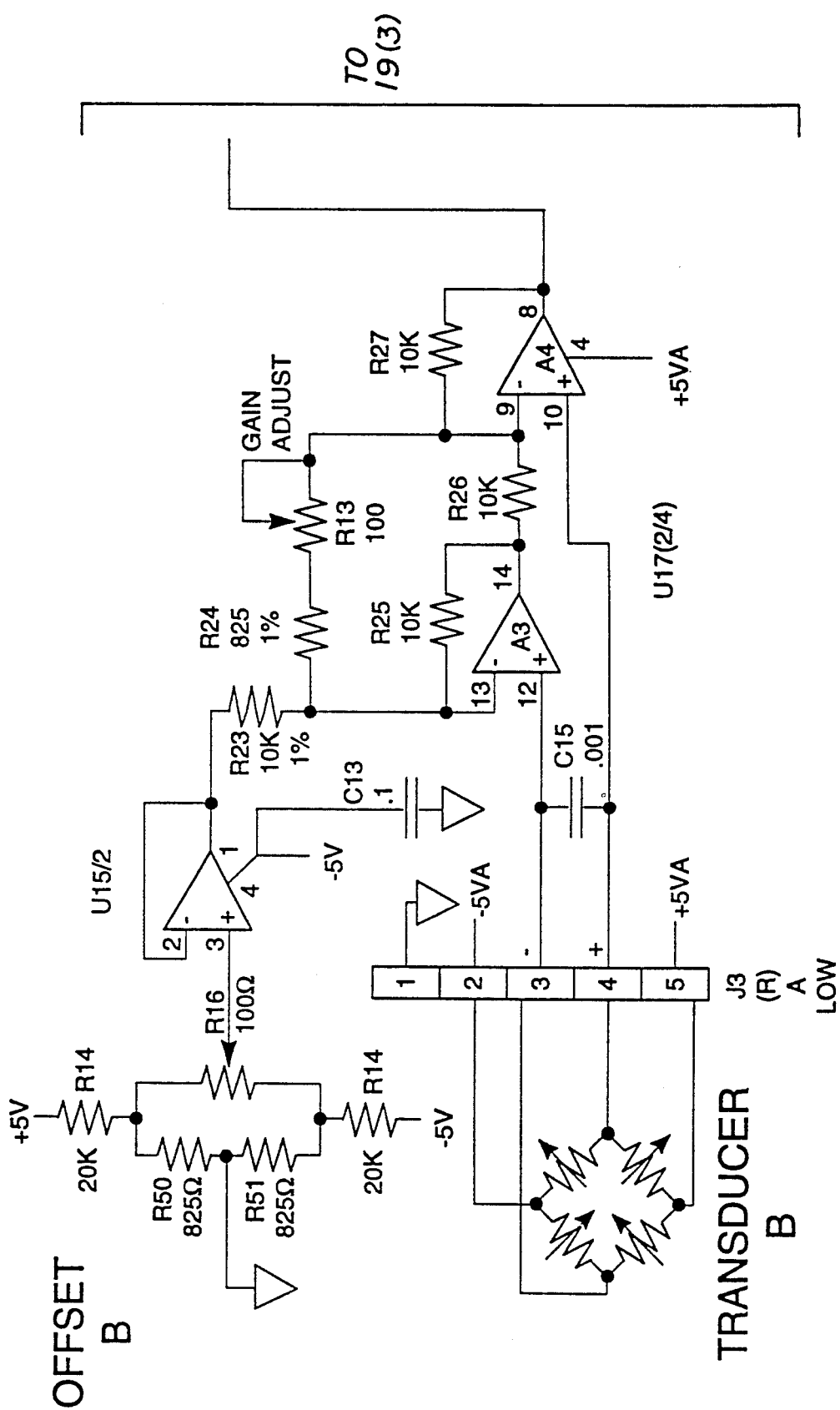
FIGS. 19(1)–19(7) are electronic schematics of the FIGS. 1 device, showing the measurement-input or head end of the system—including pressure sensors, analog preamplification and buffer stages, analog-to-digital conversion, and digital gating onto a data bus.
Figure 19:
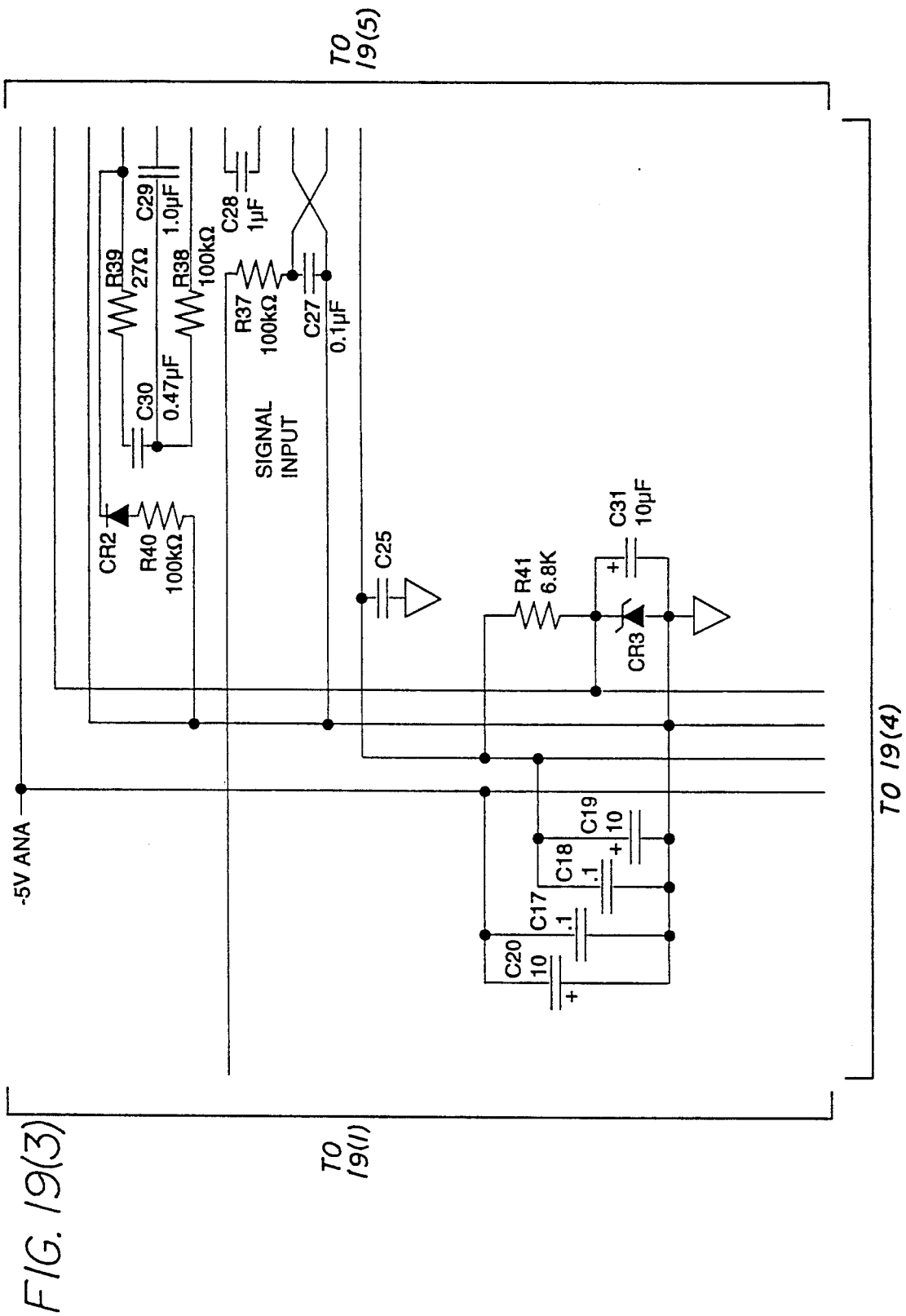
Figure 19:
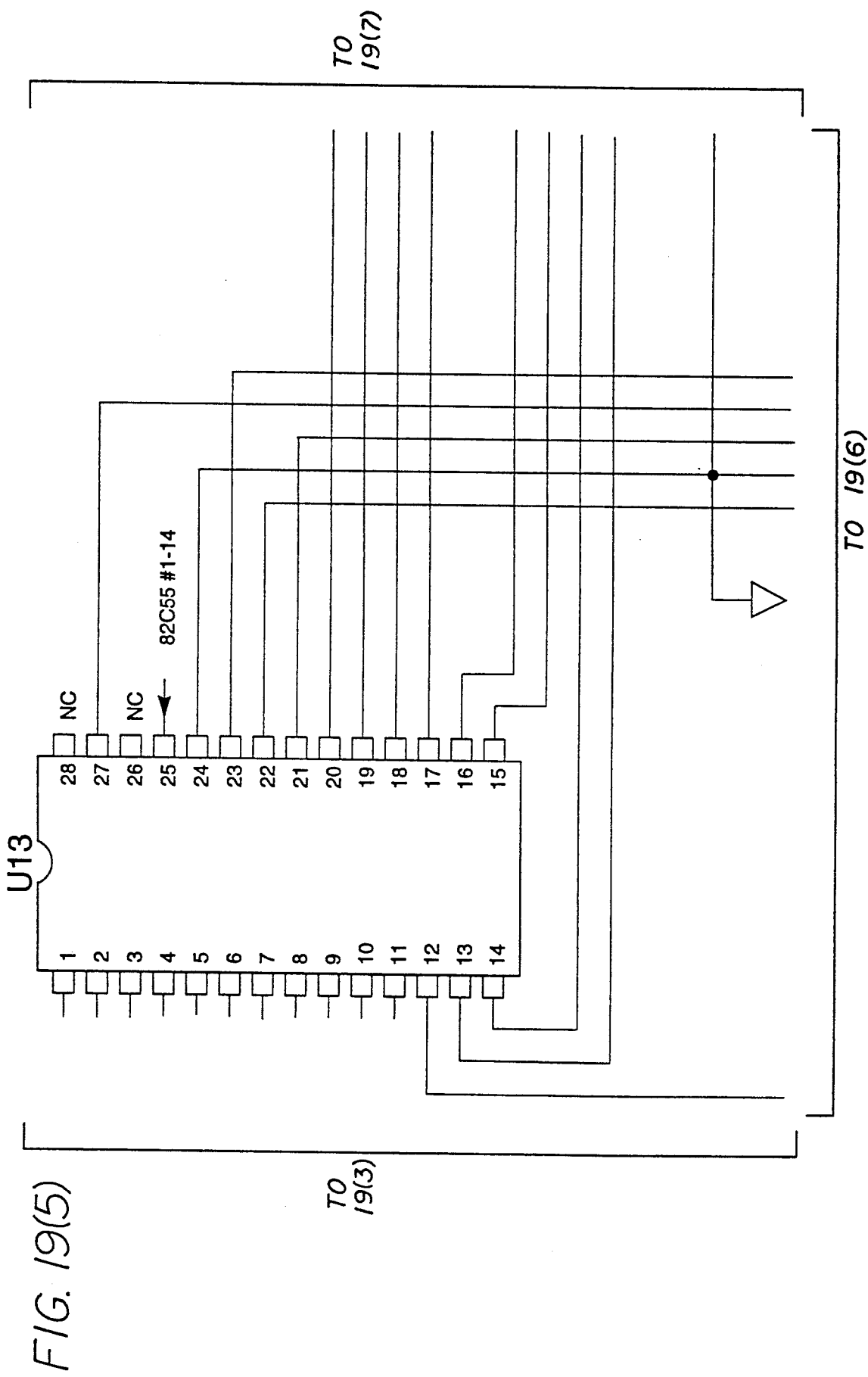
Figure 19:
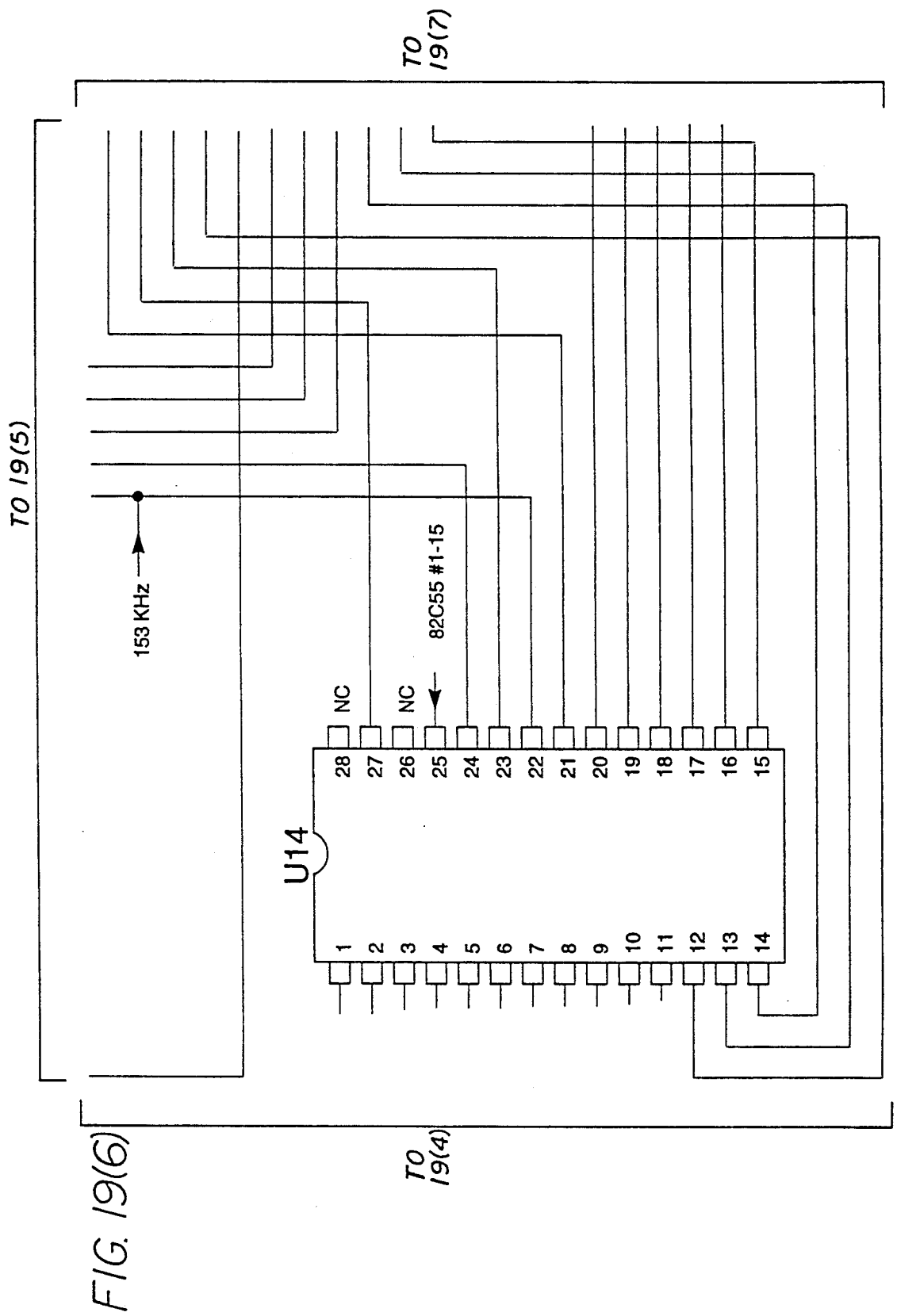
Figure 19:
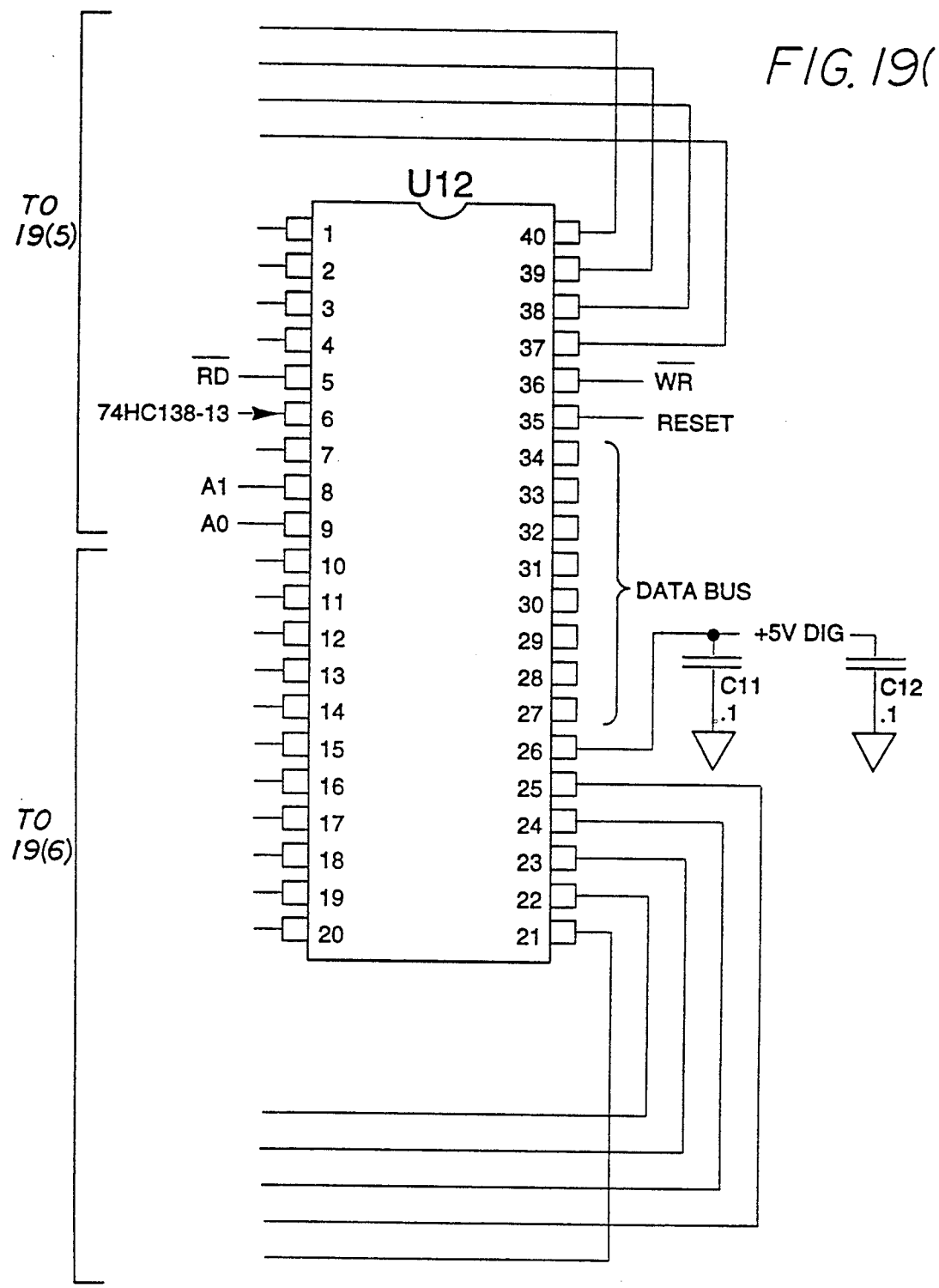

As shown in FIG. 19, the two pressure sensors A and B (the source- and discharge-side sensors respectively) are treated independently and equivalently in the electronic system of our testing device. Each sensor provides signals to a separate, conventional preamplifier, whose zero offset and gain are adjustable. The zero-offset adjustments are potentiometers R16, R20; and the gain adjustments are variable resistors R13, R17.

Preamplified analog signals from the sensors are fed into the analog-to-digital-converter circuits U13 and U14, which are dedicated to the discharge- and source-side signals respectively. An input/output circuit U12 prepares the digital outputs from these converters for interfacing to a microprocessor, and handles all of the necessary timing.

Also shown in FIG. 19 is a solid-state analog switch U16 that directly reads the battery level. This switch, and its analog output, time-share the analog-to-digital converter U14 (normally used for converting the source-side pressure data, as noted above), developing a digital battery-level signal for use in the system.

Figure 20:
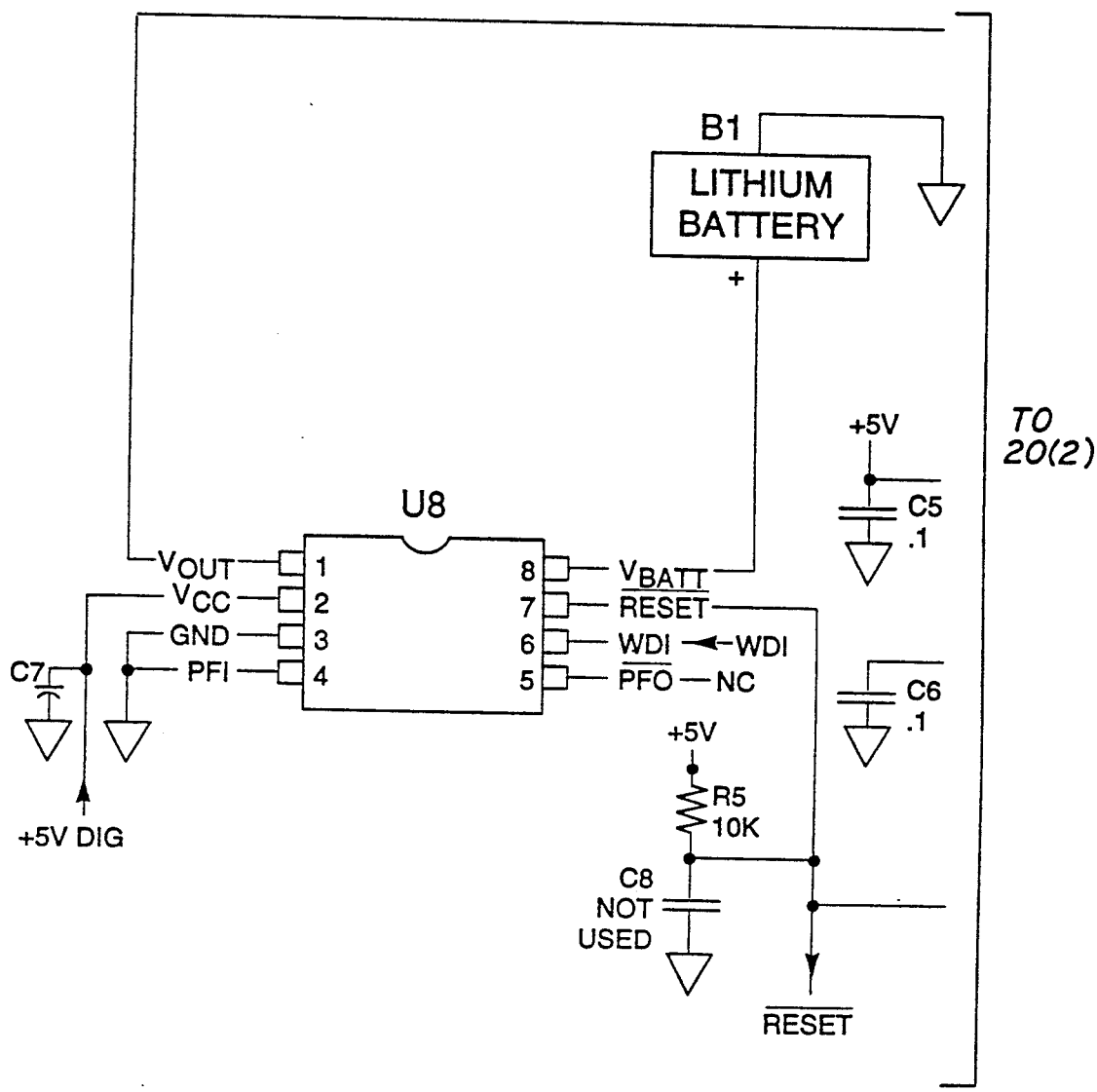
FIGS. 20(1)–20(4) are like schematic showing the control center of the system—particularly including the central processor, system clock, address coding, and longterm data storage.
Figure 20:
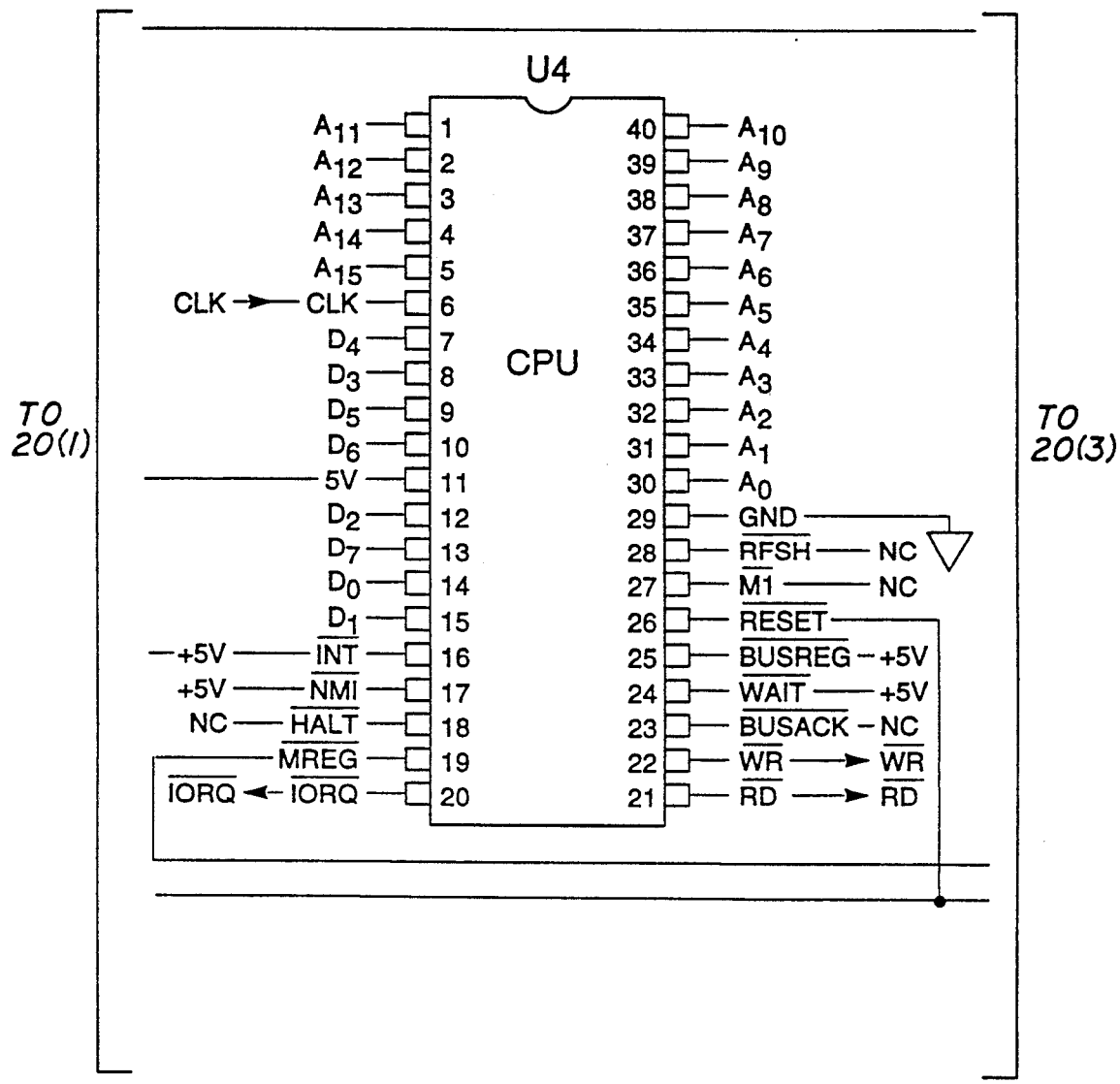
Figure 20:
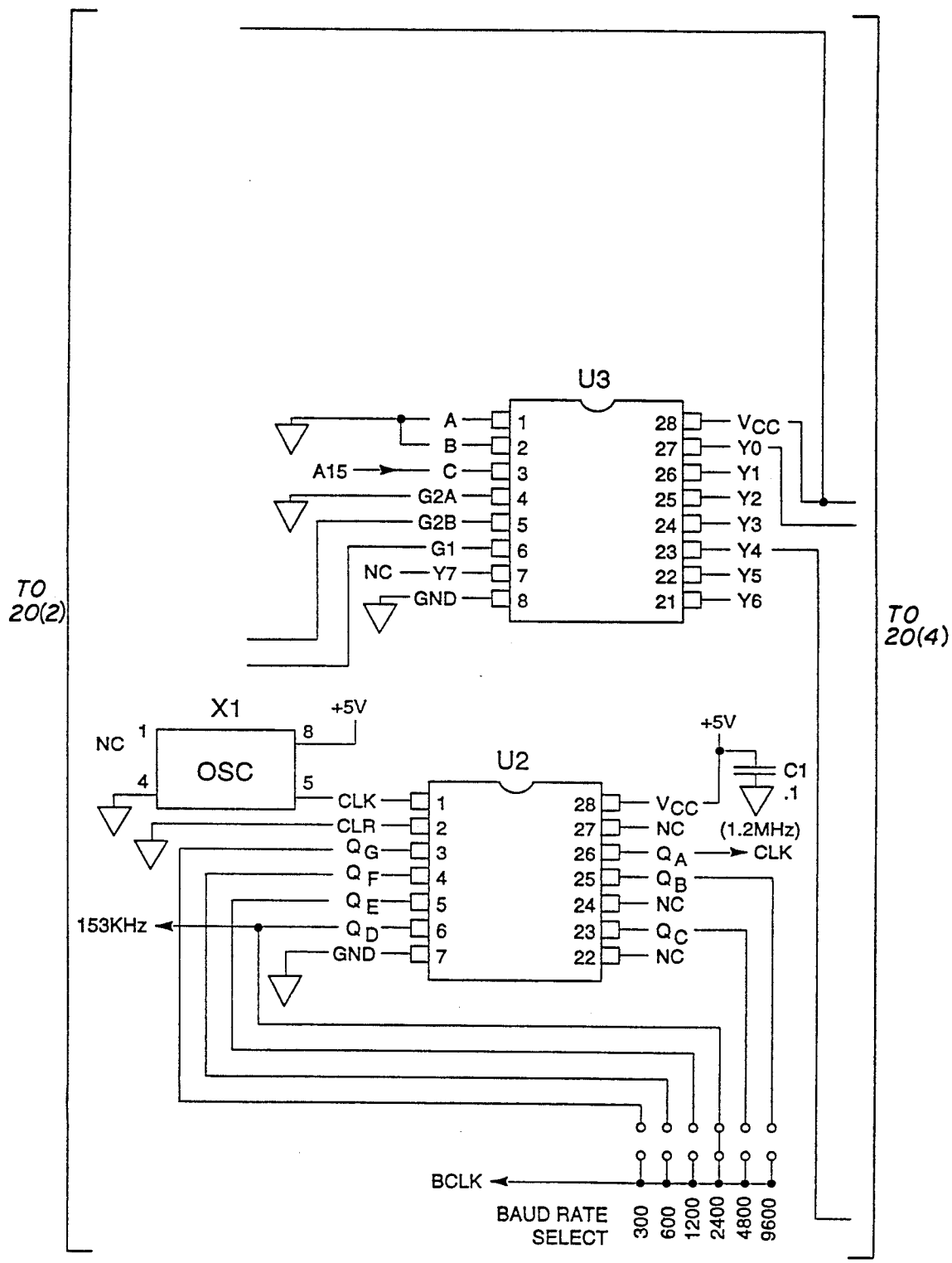
Figure 20:
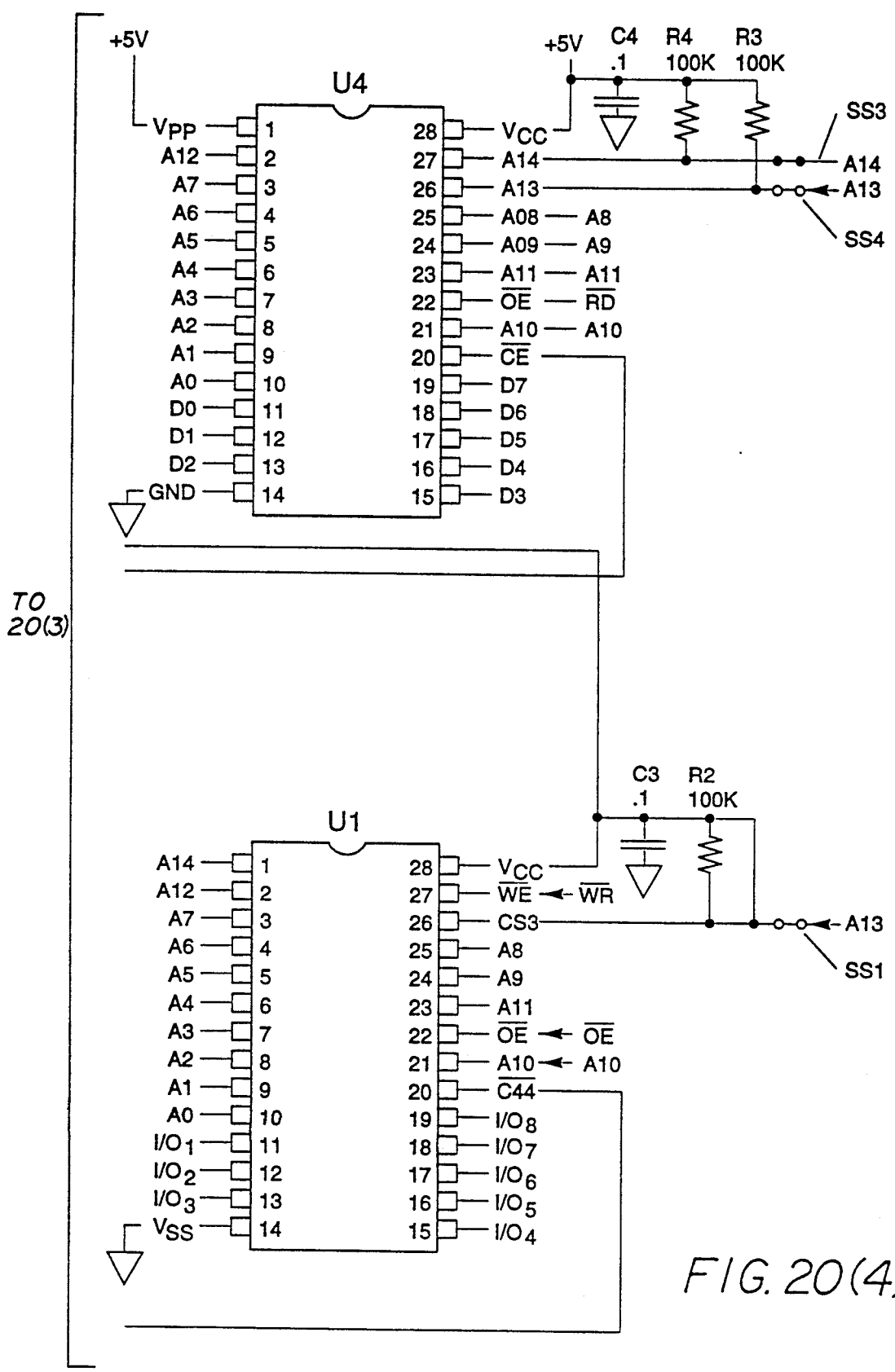

FIG. 20 shows the microprocessor U6, which is used in a generally conventional configuration that includes interfacing with an external random-access memory U1, a read-only memory U4, and an oscillator X1. Clock signals from the oscillator X1 are divided down in a ripple counter U2 for use in our device; the same oscillator also supplies clock signals for the interface to the host computer.

Memory-chip selection is performed by an address decoder U3. A battery B1, with a power-failure sensor and supply switch U8, is included to provide backup power for the random-access memory U1.

As is conventional in microprocessor systems, the processor U6 supports data and address buses that are carried throughout the digital system. Our data and address buses are eight- and sixteen-bit lines respectively.

Figure 21:
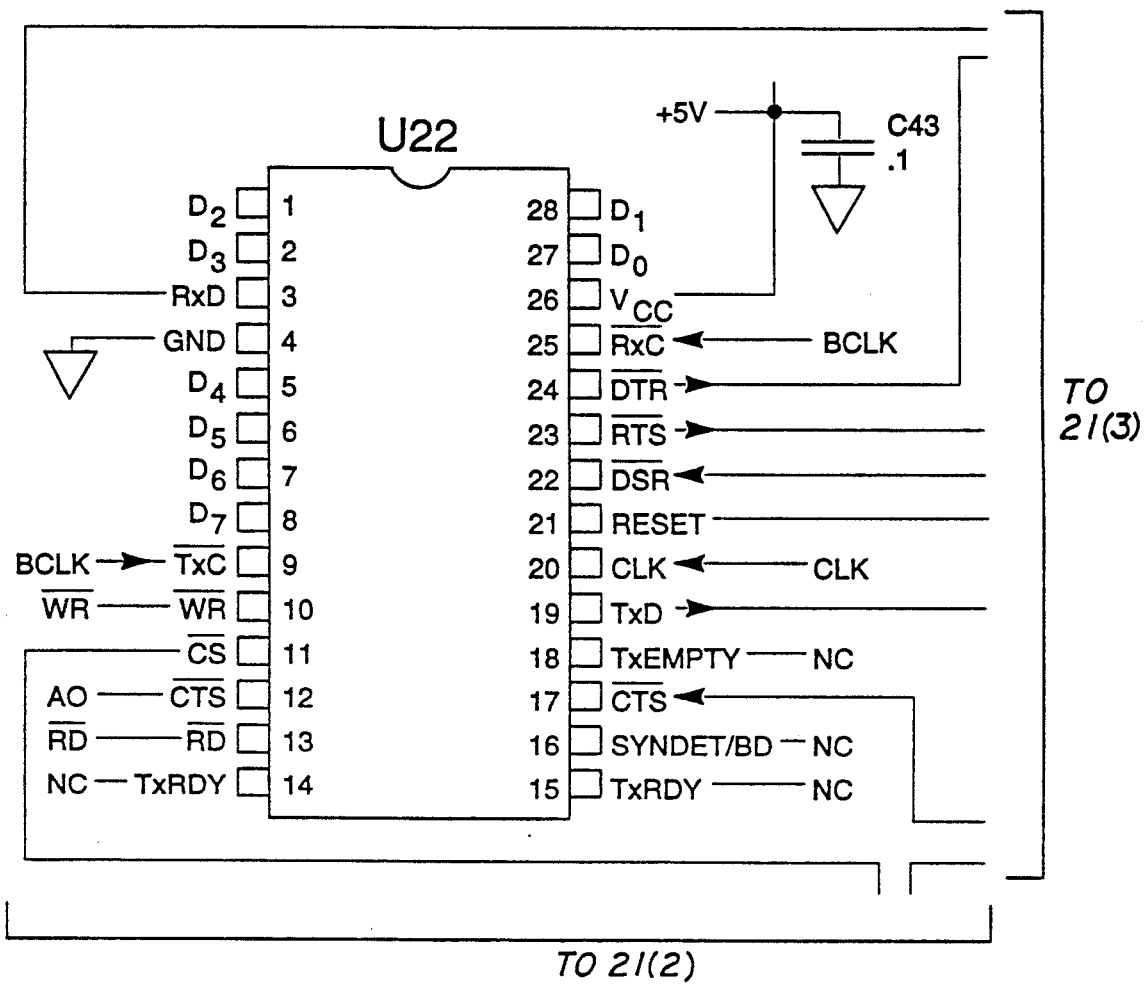
FIGS. 21(1)–21(10) are like schematic showing the digital input and output subsystem—including keyboard inputs, display and printout devices, and respective ports or interfacing between these input and output elements and the microprocessor.
Figure 21:
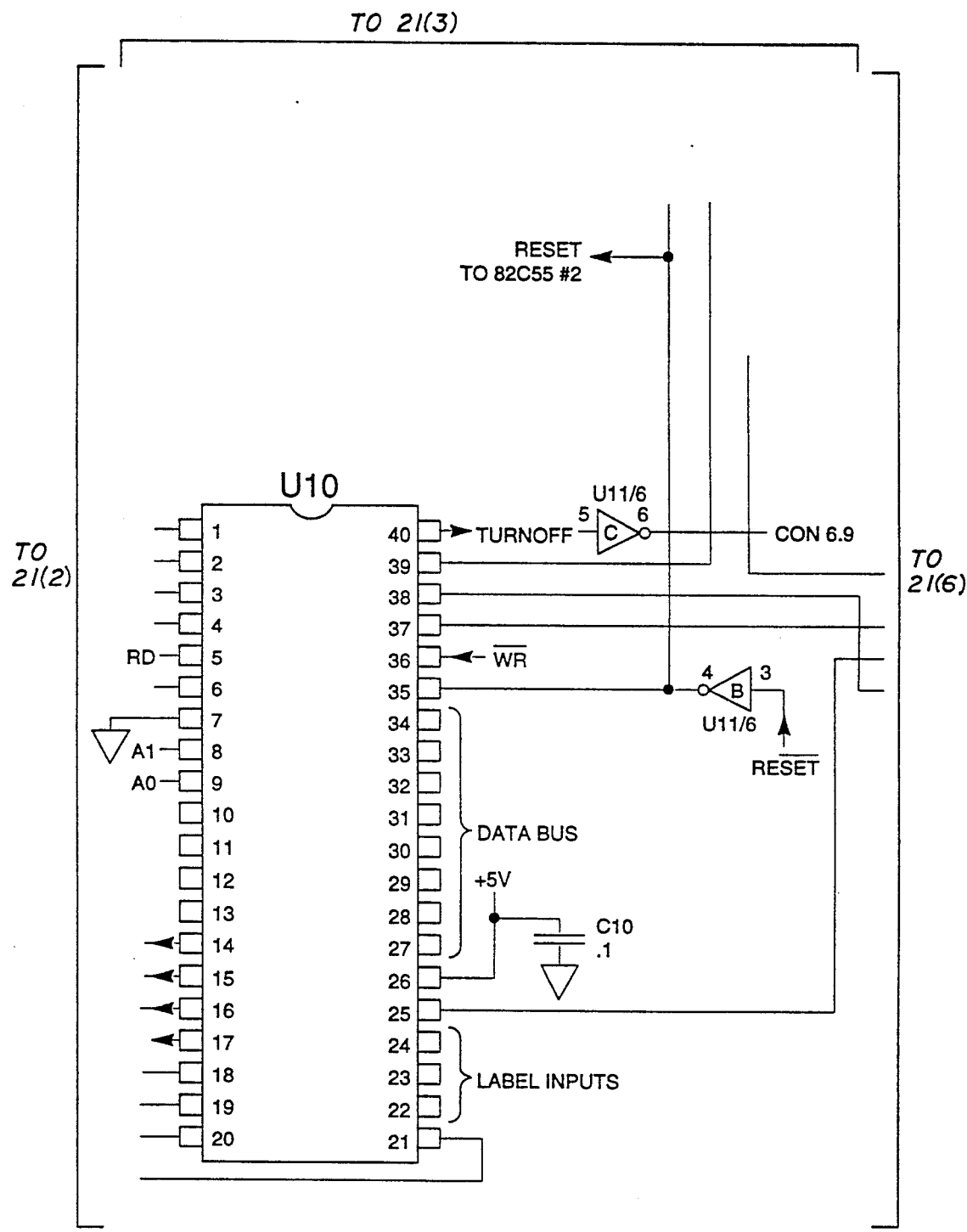
Figure 21:
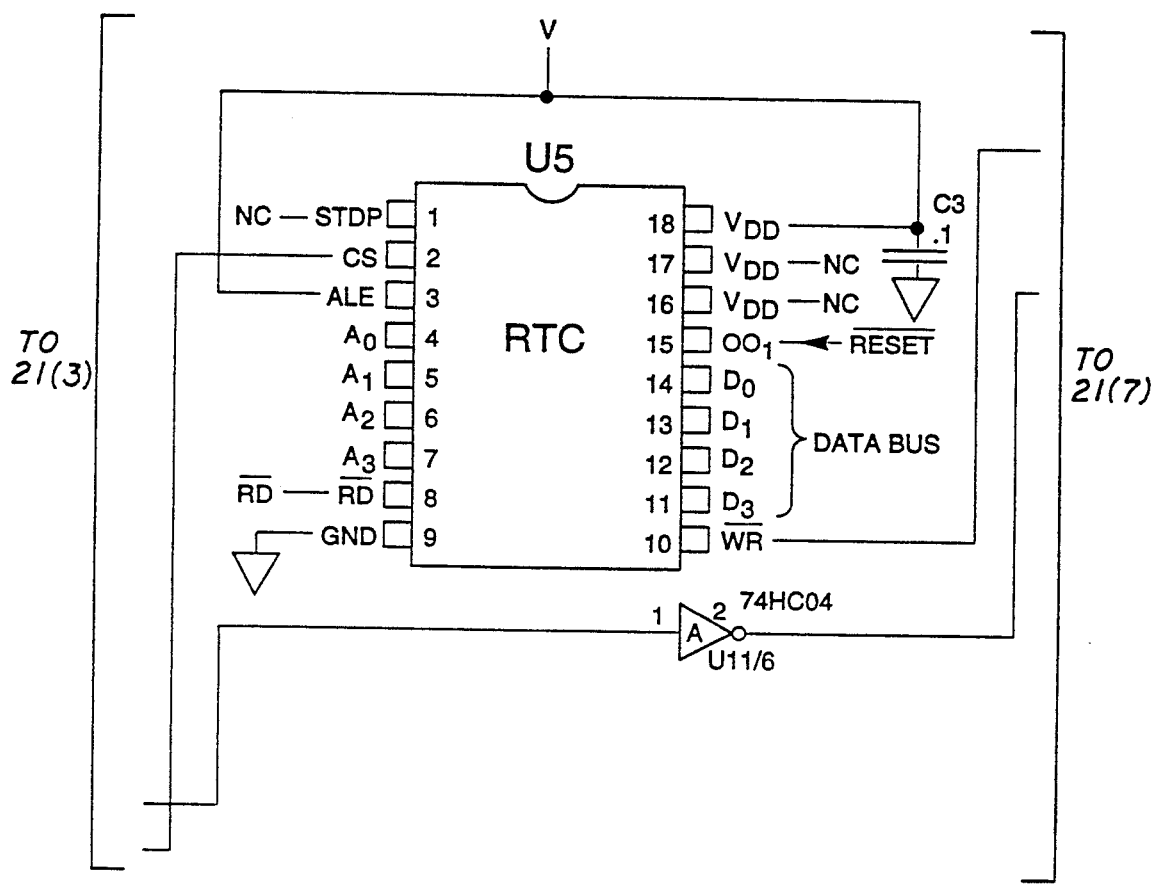
Figure 21:
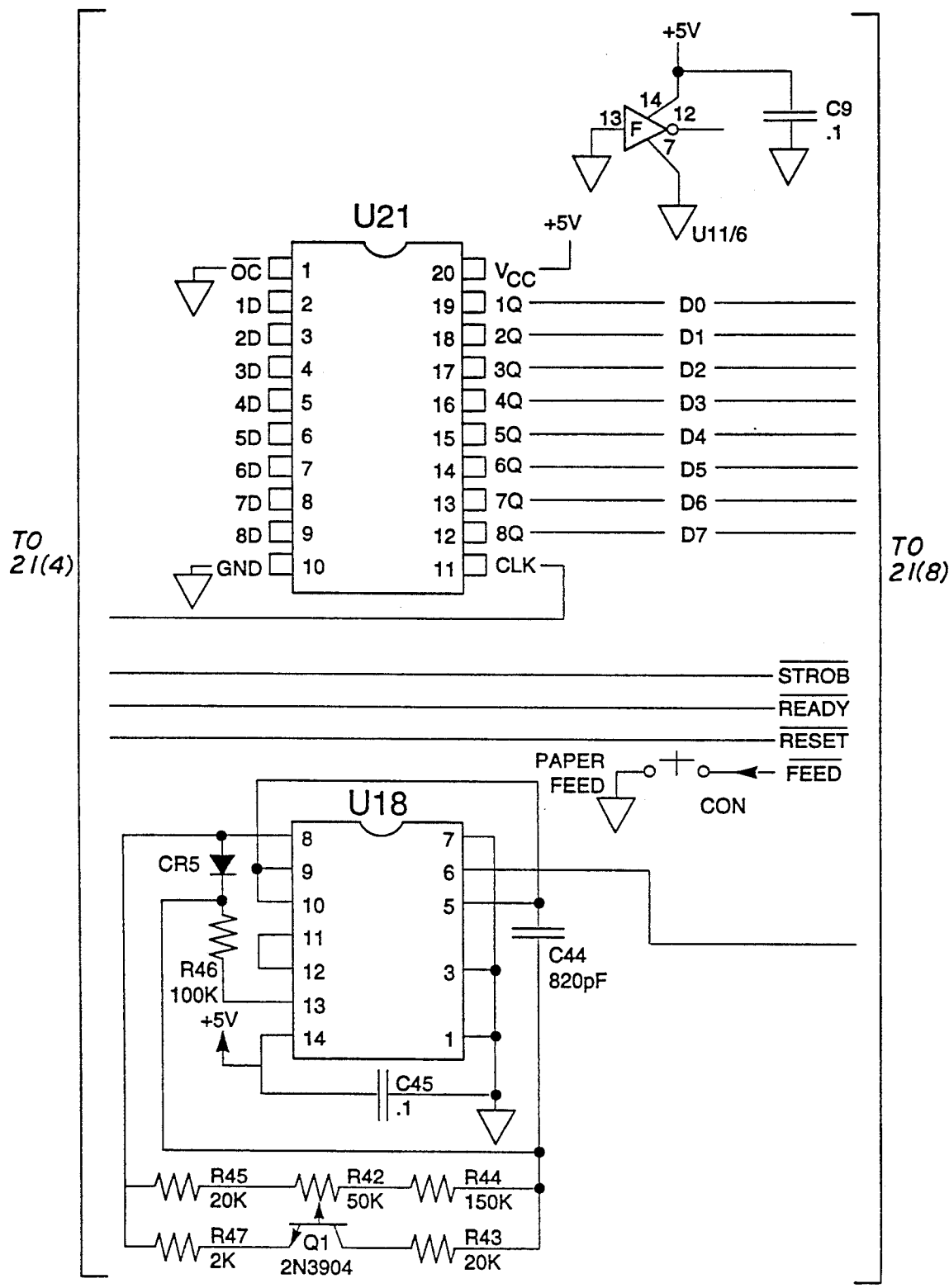
Figure 21:
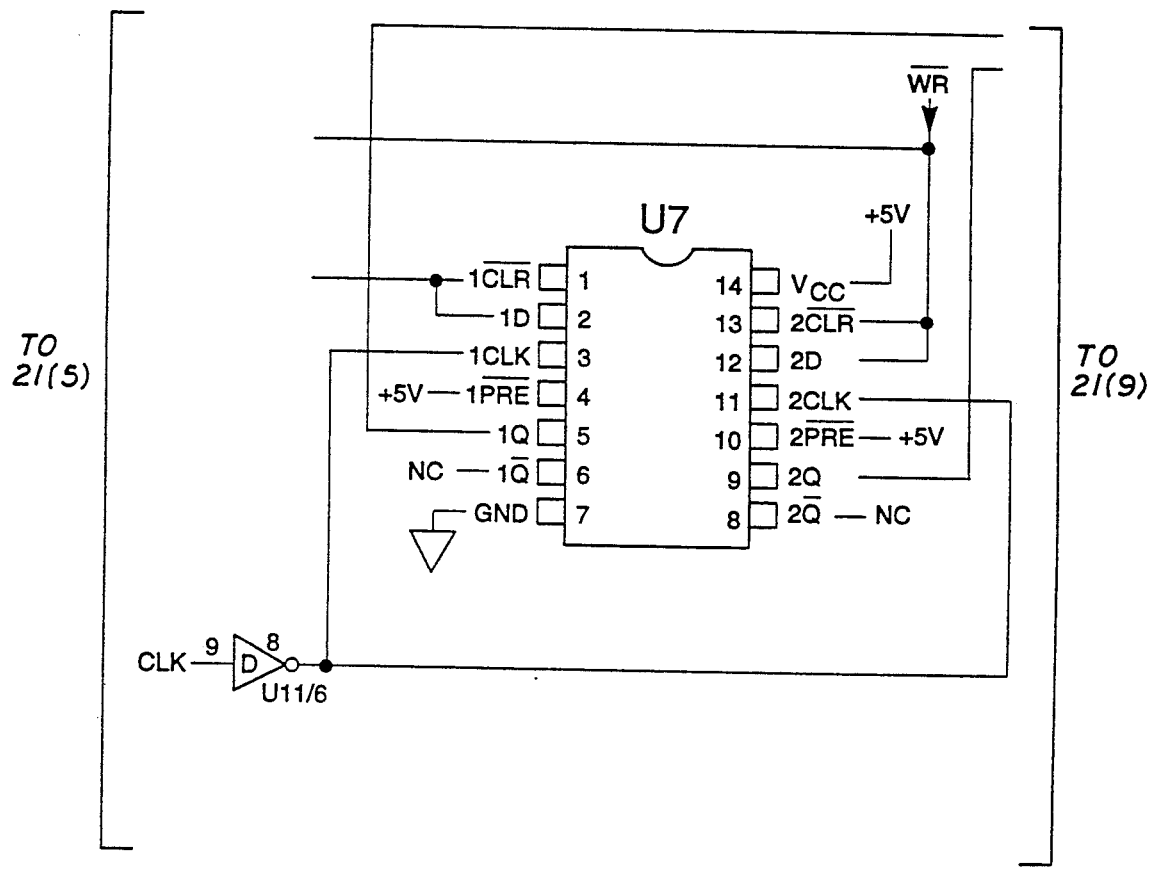
Figure 21:
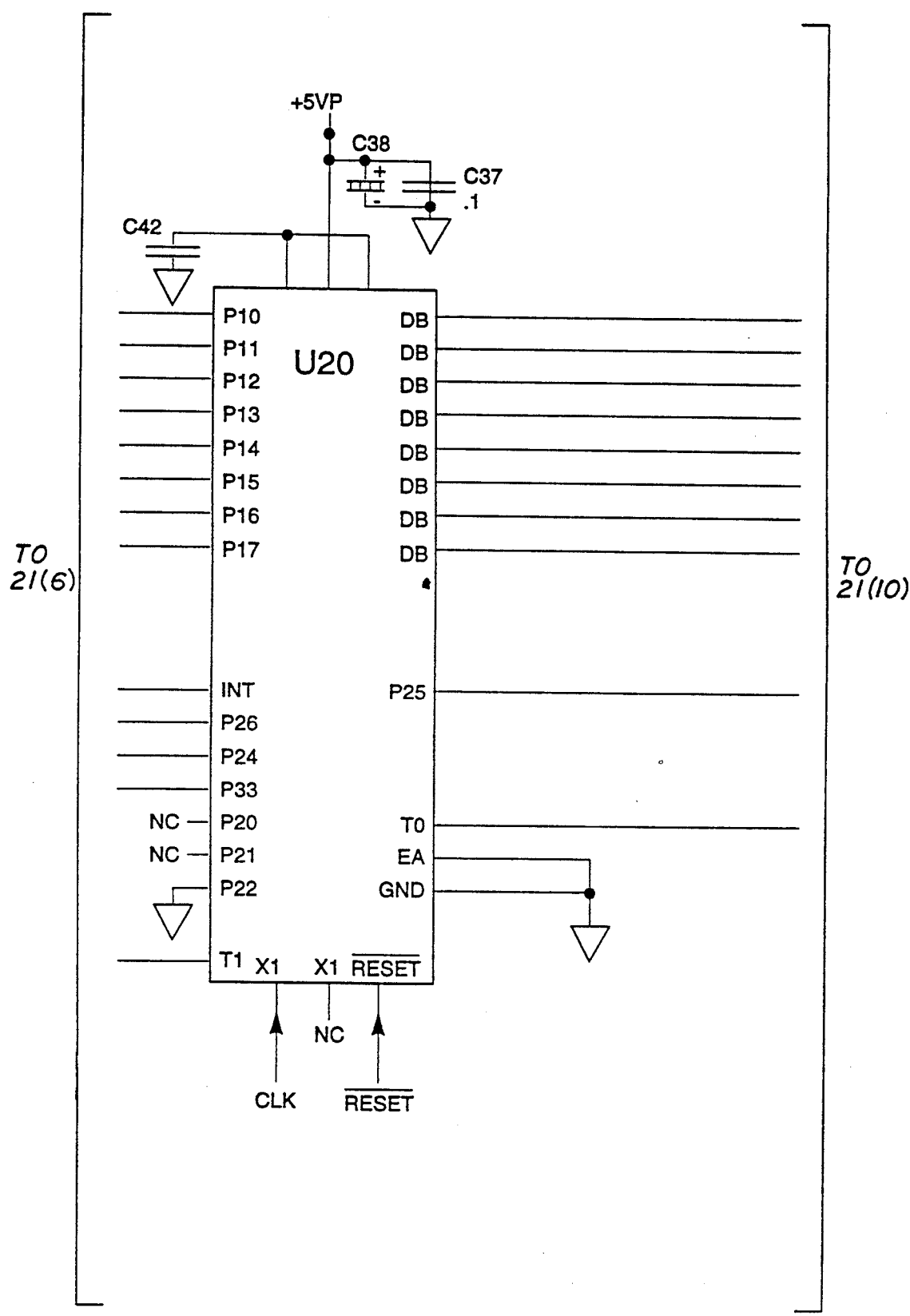
Figure 21:
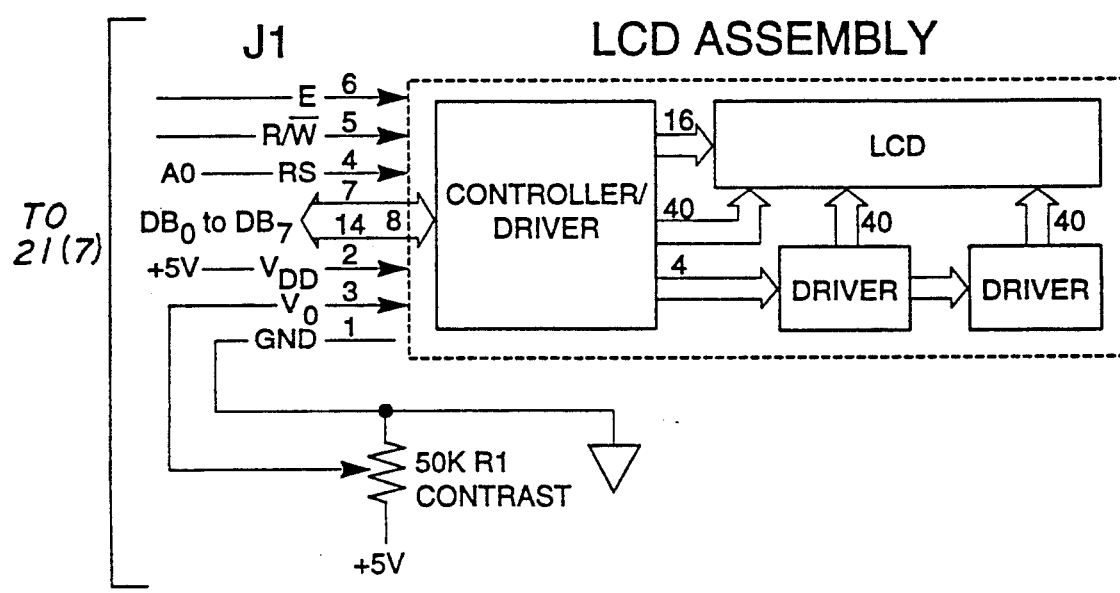
Figure 21:
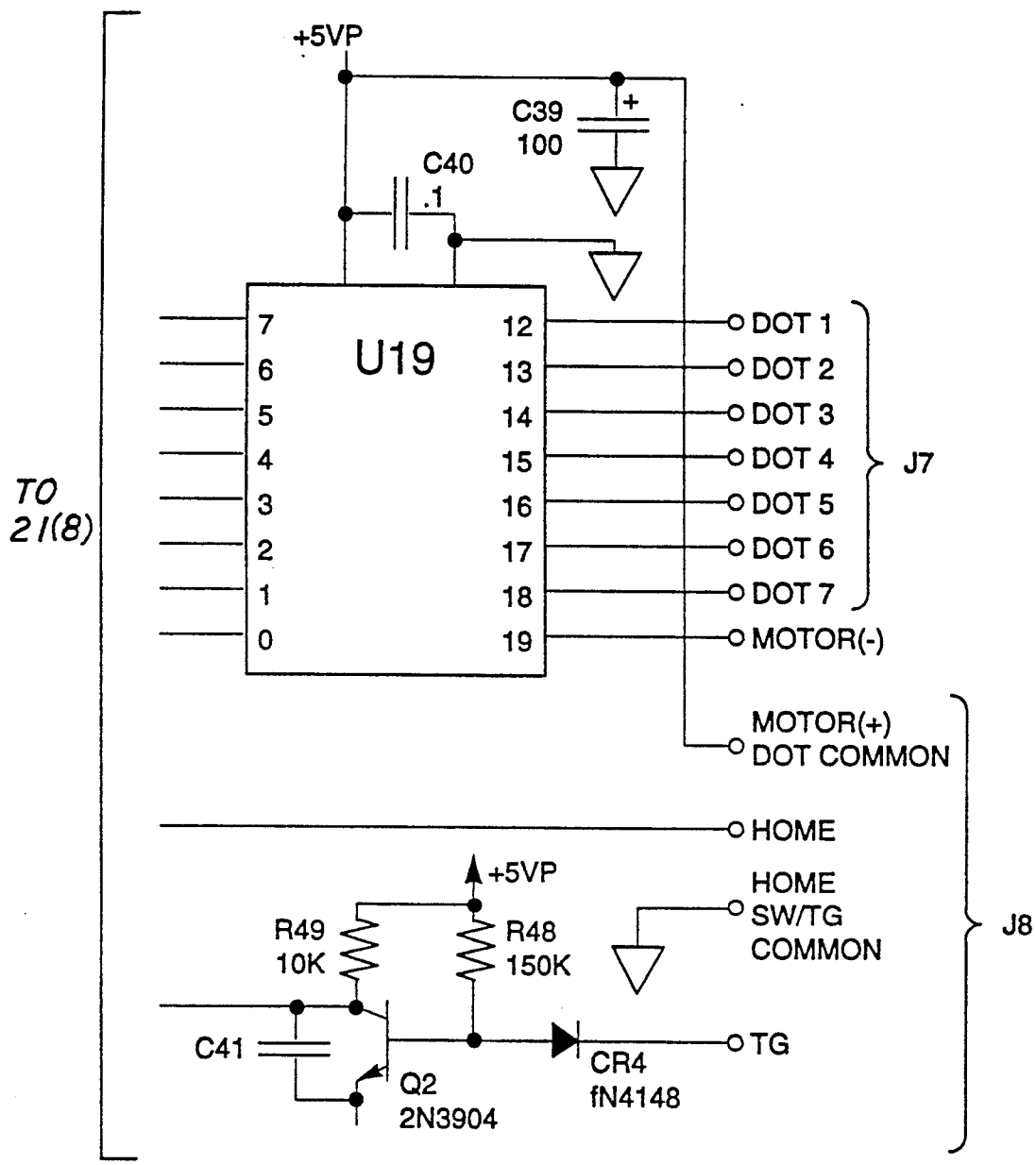

As illustrated in FIG. 21, the system includes a real-time clock U5, with its own independent oscillator. This clock U5 provides time, day and date to the processor U6. In manufacture of our testing device this clock should be factory-preset; thereafter the clock should be user-adjustable via the keyboard—but only as to hour and minute.

A decoding chip U9 determines which of several components is actively communicating with the microprocessor U6 via the data bus. More specifically, the decoder U9 selects between the display D1, printer 123, host-computer port J6, keyboard 121, converters U13, U14, and a real-time clock U5.

The microprocessor U6 thus drives the display D1 and printer 123 through the data and address buses. A programmable peripheral interface U10 links the buses with the keyboard, and also is used to select the analog-to-digital converter inputs to the data bus.

The peripheral interface U10 provides access to three special-function keys 129 (FIG. 3), in addition to the keys 121 discussed earlier. The special-function keys 129 are accessible only within the electronics housing, for factory programming and test procedures.

Latch circuits U7 and U21 hold data for the display D1 and printer 123 until those devices are ready to receive data. Printer-interface circuits U18, U19 and U20 are provided in a conventional configuration. A bidirectional parallel/serial converter U22 and driver chip U23 operate together conventionally to provide RS232C interfacing between the computer port J6 and the data bus.

Figure 22:
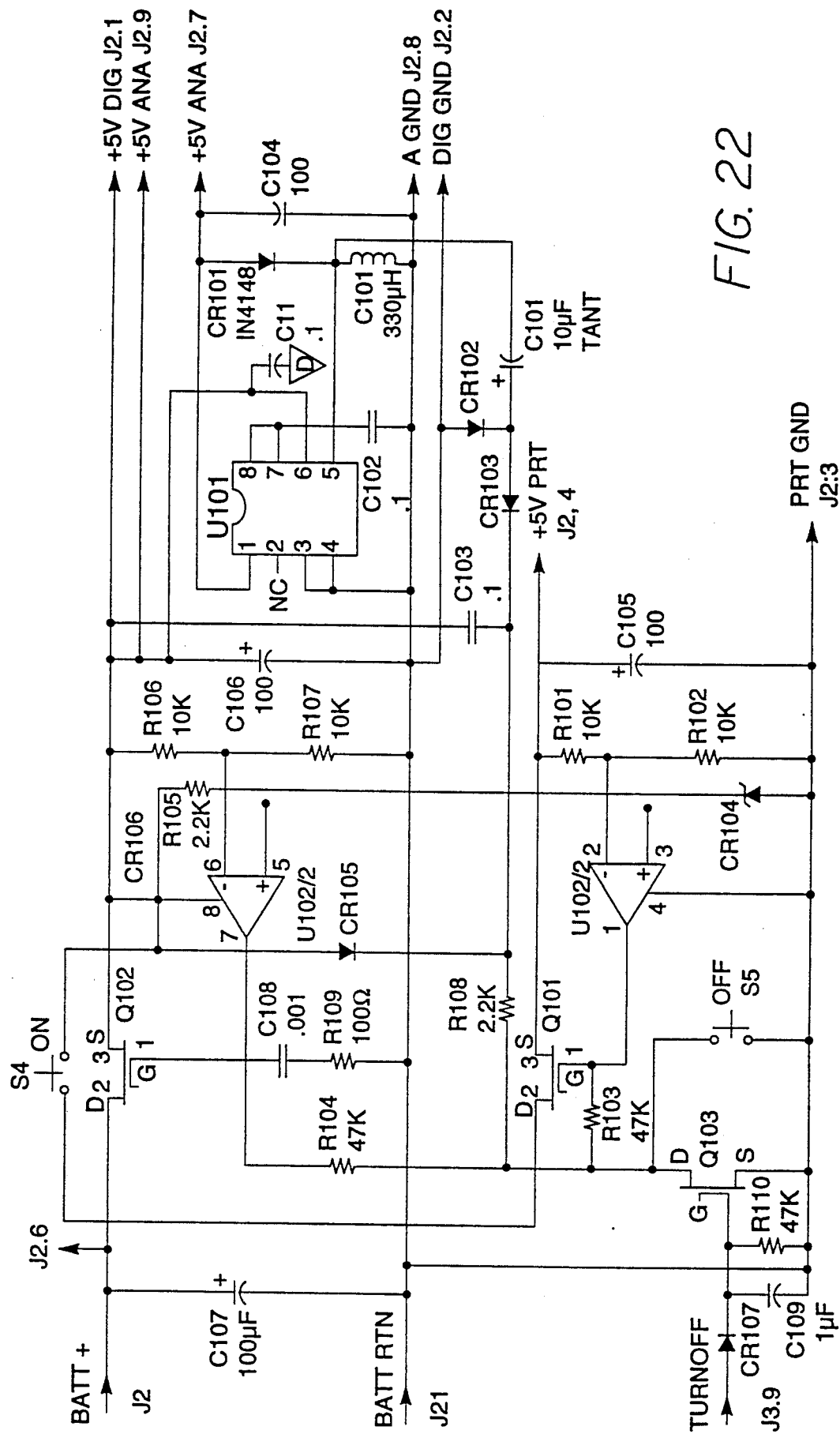
FIG. 22 is a like schematic, but primarily analog, showing the system power supplies.

FIG. 22 is the power-supply schematic. The system includes three independent sections: a positive-five-volt supply and one negative-five-volt supply for the digital and analog circuitry, and a more fully isolated positive-five-volt supply for the printer. The negative supply is of conventional configuration, using an integrated circuit U101.

The three supplies for the digital and analog circuitry are drawn through the source terminal of one field-effect transistor Q102, whose gate is controlled by one half of an operational amplifier U102. Reference voltage is established by a zener diode CR104.

The printer supply has its own field-effect transistor Q101. That transistor is similarly controlled by the other half of the same operational amplifier U102, using the same reference voltage.

Both supply sections in common are energized by actuation of the ON switch S4, and deenergized by actuation of the OFF switch S5. Firmware-initiated deenergization is also provided, by application of a "turnoff" signal through a diode CR107 and a field-effect transistor Q103 as shown.

System power is automatically turned off if for fifteen minutes no pressure is sensed at either the source-side sensor A or discharge-side sensor B, and none of the keys 121, 129 is actuated. This function conserves the life of the main battery 61.

The positive-supply leads for the digital and analog circuitry diverge at a point as close as possible to the first-mentioned field-effect transistor Q102; and pass to the motherboard 130 on separate pins of the interboard connector 136. Similarly the digital, analog and printer ground paths diverge at the point of entry of the battery wires 62 (FIG. 5) to the upper printed-circuit board 120; and also pass to the motherboard 130 on separate pins of the interboard connector 136.

Figure 23:
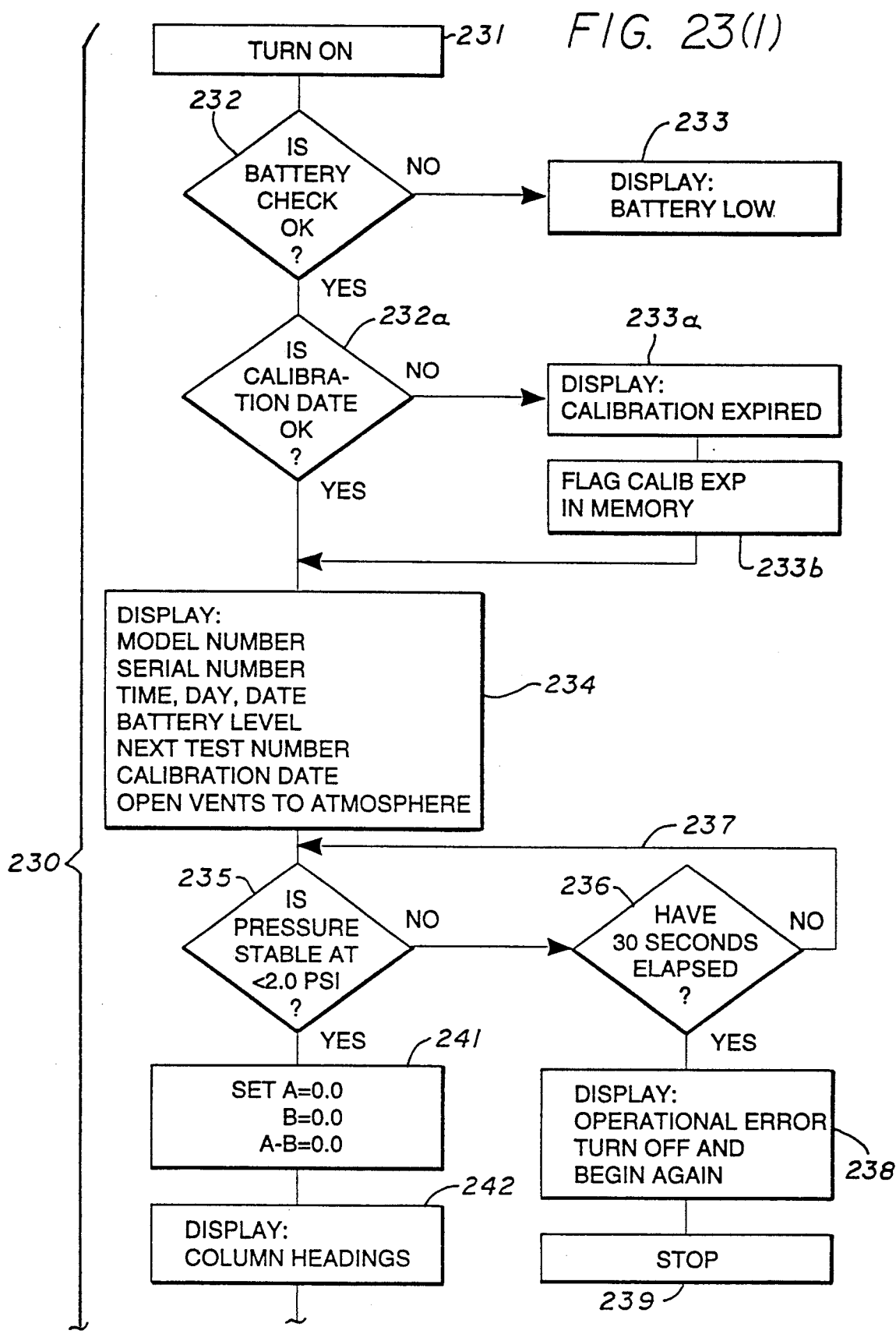
FIGS. 23(1) and 23(2) are flow charts representing the operation of the program or firmware that is loaded into the microprocessor at manufacture, to control operation of the entire system.
Figure 23:
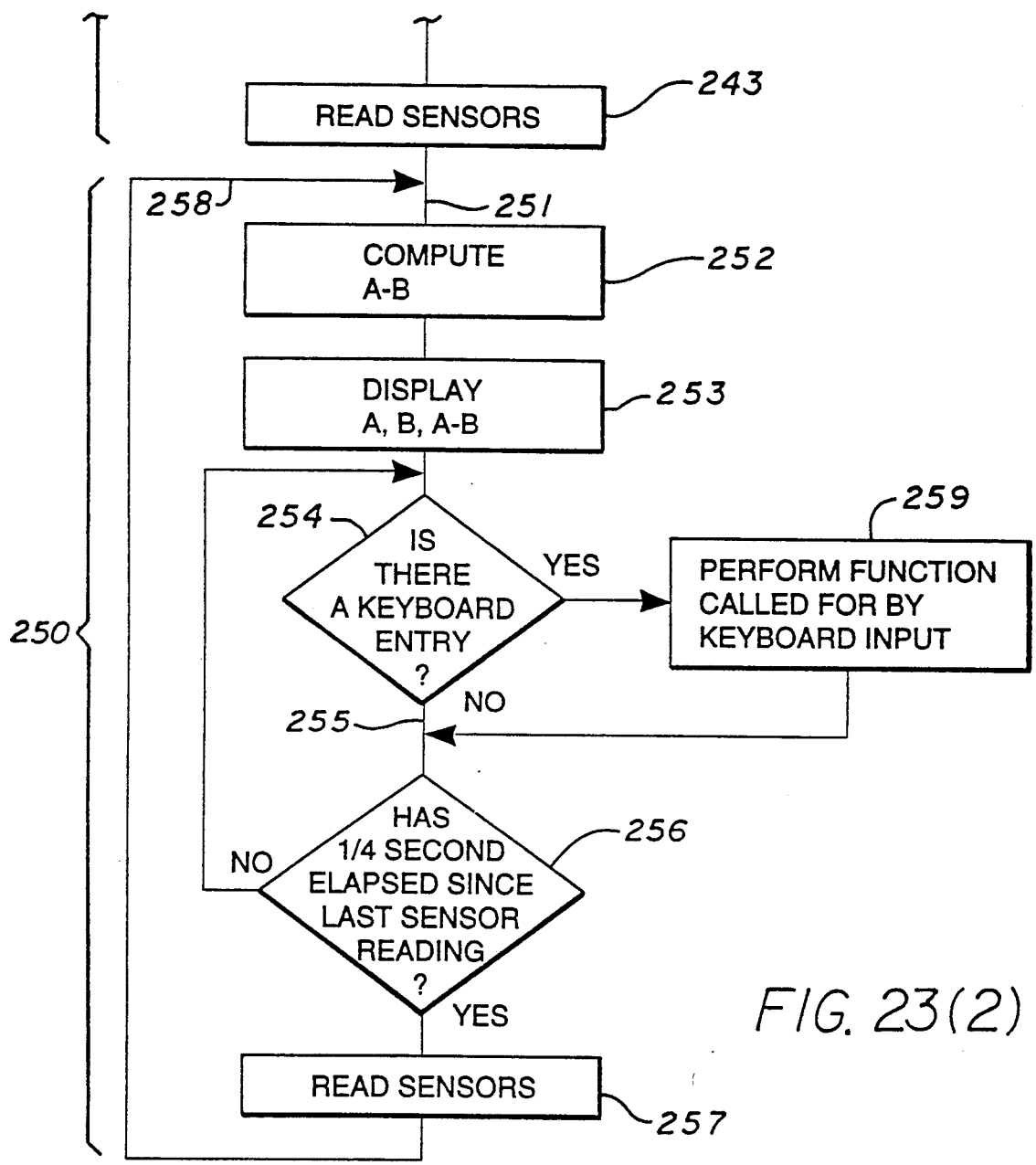

As shown in FIG. 23, upon power-up 231 the system automatically performs internal power and calibration-date tests 232, 232a. It then produces respective displays 233, 233a, 234, depending upon the results of these tests.

If calibration is expired, an internal flag 233b is set that allows the tester to be operated but causes a warning disclaimer to print at the beginning and end of each test or auto-print sequence, stating, e.g., "Calibration is expired—data are not valid for certification."

If both tests 232, 232a are passed, the display 234 includes the testing-device model and serial numbers, time, day, date, battery level, next available test serial number, previous calibration date and recalibration due date. The display 234 also includes the operator instruction "OPEN VENTS TO ATMOSPHERE".

The system then initializes the calibration of the pressure sensors, following a timing loop 235-236-237. In this loop 235-237, the sensor signals are read into memory and tested for excessive pressure for the zeroing process, and also for stabilization of the sensors.

Unless the test 235 for pressure stabilization below two pounds per square inch is passed within thirty seconds, as measured at the loop counter 236, the system generates a dibplay 238 "OPERATIONAL ERROR—TURN OFF AND BEGIN AGAIN". The firmware then proceeds to interruption 239 of the system power, and blocks all further operation of the system until the OFF key 102 and then the ON key 101 are operated in sequence.

If all of the preliminary tests 232, 232a, 235 are successful, the next step is zeroing 241 of the readouts for the two sensors, producing a column-heading display 242, and a preliminary reading 243 of the two pressure sensors. The system then reaches the starting point 251 of the main operating loop 250 for the system.

In that loop, the steps performed include calculation 252 of the differential pressure, display 252 of values for all three pressures, and rereading 257 of the sensors. These functions repeat in sequence roughly four times a second, as determined by the inner-loop counter 256, while the interface U10 (FIG. 21) monitors the keyboard.

In the primary logical route 251-258 through the main operating loop 250, each pass through the loop includes a test 254 for the presence of keyboard activity. This version 251-258 of the loop 250 repeats until interrupted at the keyboard-input test 254.

Inputs from the keyboard to turn the apparatus off, or to advance paper through the printer, operate directly on the power supply or printer mechanism independently of progress through the program sequence—that is, independent of position in the firmware flow chart, FIG. 23. Other keyboard inputs can interrupt only the read-and-display cycle 250 as shown.

When such inputs have been received at the keyboard interface U10, system operation digresses from the keyboard-input test 254 to perform a keyboard-selected printout or auxiliary function 259. Some other interruptions of the main operating loop 250 occur automatically without keyboard input; certain of these interruptions of an incidental sort that are mentioned in this text are omitted from FIG. 23 for simplicity of the drawing.

Upon actuation of the START TEST/RESUME key 112, the system prints and stores in memory values of the pressures on both sensors, and their differential, every two seconds for up to four minutes—for a total of one hundred twenty-one printed lines. Before starting a test, the operator should press the PRINT HEAD key 102 to print a heading that identifies both the operator and the apparatus, and indicates battery and calibration status.

To pause during a test for changing hoses, etc., the operator presses the PAUSE/STOP TEST key 116 once—and then resumes the test when ready by pressing the START TEST RESUME key 112. During such a pause, the elapsed-time counter continues to run; and a blank line is printed to call attention to the interruption in continuity of the time scale.

The duration of the pause, however, is not subtracted from the four-minute test period; and the number of printed data lines remains at one hundred twenty-one. Pauses may be introduced any number of times during a test.

To stop the test, the operator presses the PAUSE/STOP TEST key 116 twice or the CLEAR key 104 once. Either of these actions also initiates printing of the footing information; but if desired the operator can suppress that printout by pressing the CLEAR key 104.

During test and auto-print operation, use of certain function keys also causes special indications to be automatically printed in the time column. Use of the PRINT DISP key 105 prints the indicium "****"; use of the DISP HOLD key 109 prints the word "HOLD".

A sequential or serial number is automatically assigned to each test, and is stored in memory, when the system enters its "test" operating mode—but not the "auto print" mode. The tests are assigned numbers one through 64,000. Up to seventy-five partial tests or fifty complete four-minute tests can be held.

The system stores all test activity, including time, day, date, pauses and special indications, as well as the pressure values. Pressure-differential values are not stored, but automatically recalculated as needed in event of later printout.

Tests (but not "auto print" sequences) may be recalled and printed from memory at any time. They may be reprinted as many times as desired. Test information reprinted from memory still remains in memory, but once so reprinted is automatically erased without warning, in chronological order, when the memory is full. In other words, the memory is considered full when there is no capacity remaining and none of the stored tests has been previously printed from memory.

If tests in memory have not been recalled and printed, and the memory is full, the system displays a message indicating that the oldest information in memory will be erased before a new test can be started. That information can then be printed, if desired, before proceeding with the new test. In any event, pressing the START TEST/RESUME key 112 again will start the next test—erasing earlier tests from memory as required.

To recall any or all of the stored tests, the operator first presses the MEM RECALL key 106. The system responds by prompting the operator to press either the MEM RECALL key 106 again to recall an individual test, or instead the PRINT DISP key 105 to recall all stored tests.

If the operator then presses the MEM RECALL key 106, the system responds by displaying the serial number of the most recent test in storage. The operator can press the same key again, repetitively, to see in sequence the serial numbers of all earlier tests that are still in memory. Once the serial number of a desired test is displayed, the operator then presses the PRINT DISP key 105 to print that test.

To instead recall and print all tests that are in memory, after the initial actuation of the MEM RECALL key 106 and the system query in response, the operator presses the PRINT DISP key 105. The entire memory contents will then print out, with the tests in reverse order—i.e., the most recent test first. The operator can press the CLEAR key 104 to stop printing whenever desired.

During operation in the "test" or "auto print" mode—i.e., following use of the START TEST/RESUME key 112 or AUTO PRINT key 108 respectively—certain controls are disabled. These are the MEM RECALL key 106, PRINT HEAD key 107, AUTO PRINT key 108, TIME DAY DATE key 110, ZERO CALIB key 111, PSI FEET INCHES key 114, A-B ADJUST key 115, and the 0.1/1 key 113.

The system reserves memory for up to ten lines of heading information. If no heading information has been custom-programmed at the factory, titled blanks instead are stored and printed for hand entry of identifying data.

The standard footing printout includes the test serial number, time, day and date, and titled blanks for use by the operator in identifying the valve under test—as by manufacturer, type and serial number. Other titled blanks are also printed for manual entry of, e. g., comments, the date, and the operator's name and signature.

Through actuation of the PRINT HEAD key 107, headings may be printed before tests are reprinted from memory—or indeed at any time when the system is not in its "test" or "auto print" mode. The system prints footings, however, only at the time a test is actually just concluded. This limitation is imposed for integrity of the printed permanent records.

Whenever pressure values are displayed on the liquid-crystal display 131, that module also shows—just above the pressure values—the units of measurement (for example, "PSI") in which those values are being expressed. In printed records, similar information appears as column headings, together with an additional heading for the elapsed-time column, shown as "M:S", meaning minutes and seconds.

Our testing device holds in memory the date of the most recent true physical calibration of the sensors—that is to say, laboratory calibration against a known pressure and external reference gauge. The calibration date is set at the factory, at the time of each such true calibration, and expires in a specified interval, for example one year.

If physical calibration has expired, this fact is indicated by the display 131 during the power-up sequence (see block 234 in FIG. 23). A like notation is automatically stored in memory and included at the beginning and end of each printed record.

Zero-pressure readout values for both sensors are calibrated automatically each time the device is turned on. This operational zeroing procedure actually has no effect on the sensors or preamplifiers, but rather recalibrates the microlo processor system to the raw pressure data then arising from the two sensors.

When no test or auto-print sequence is in progress, the operator can initiate such an operational zero recalibration manually—by first operating the valves 83, 84 to vent both sensors to ambient, and then pressing the ZERO CALIB key 111. Such recalibration is very helpful when pressures are being displayed and printed in inches or feet of water, particularly when testing PVB backflow valves; in such tests, one side is open to the atmosphere, and the sensors in the testing device must be held at the same level as the testcock on the PVB valve.

Operational zero recalibration is automatically blocked when pressure on the sensors exceeds one-half pound per square inch. Zero recalibration is nevertheless possible while the apparatus is connected to a water column, provided that the water surface is not more than about fourteen inches higher or lower than the sensors in the instrument.

In some instances, operational zero recalibration may leave a slight variation between the readings from the source-side and discharge-side sensors. When no test or auto-print sequence is in progress, this inconsistency in the displayed and printed values can be eliminated by pressing the A-B ADJUST key 115.

The microprocessor calibration for the discharge-side sensor is then revised so that the two values are the same and the differential value is zero. Such revision is blocked, however, and an error message displayed, if the two sensor values differ by more than 0.2 pound per square inch.

Our invention further contemplates incorporation of additional sensors for monitoring humidity and temperature, and recording the resulting data as a part of pertinent test information. Such additional information can be useful for refining calibration, or test implications, under some circumstances.

We shall now present special test procedures for use with our testing device in testing backflow valves of the three above-described valve types, respectively. We have developed these procedures to take advantage of the many new and unique convenience, accuracy and data-integrity factors that are now available by virtue of our invention.

For definiteness, we shall couch the procedure in the form of direct instructions to testing personnel. (Throughout this document we are using interchangeably and synonymously the phrase "testing personnel" and the words "operator" and "inspector".)

First we shall take up procedures for testing valves of the DC type. In following this presentation, please refer to FIGS. 10 and 11—and to FIG. 16, which shows a representative printout with simulation of manually added notations.

DC test procedure

A. Flush all testcocks.

B. Turn the tester on (before connecting hoses). The tester must display all zeroes. Close both tester valves 83 and 84 (using the control knobs 75, 76).

Test No. 1: test the No. 1 check valve

1. Install a high-side hose between testcock #2 and the tester source-side unvalved (or "direct") fitting 72.

2. Install a low-side hose between testcock #3 and the tester discharge-side unvalved fitting 73.

3. Open testcock #2, and then the tester source-side valve 83 to bleed the high-side hose; then close the source-side valve 83.

4. Open testcock #3, and then the tester discharge-side valve 84 to bleed the low-side hose; then close the discharge-side valve 84.

4'. Press the PRINT HEAD key 107, and wait for the heading to print; then press the START TEST/RESUME key 112.

5. Close the shutoff valve #2 first, and then #1.

6. Slowly open the tester source-side valve 83, and lower the high-side pressure about two pounds per square inch differential below the low-side pressure (differential reading about −2.0 psi).

Close the tester source-side valve 83. If the reading is maintained, record as "tight"; if not, do the confirming test presented below.

6'. Press the PAUSE/STOP TEST key 116.

Confirming a. Open shutoff valve #1 to repressurize the assembly.

b. Install a bypass hose between the tester discharge-side valve 84 and testcock #1.

Open testcock #1 and bleed it by loosening the hose connection at the tester discharge-side valved fitting 74. Tighten the hose connection.

b'. Press the START TEST/RESUME key 112.

c. Close shutoff valve #1.

d. Lower the assembly pressure about ten pounds per square inch, by loosening the hose connection at testcock #3.

e. Simultaneously open both the tester source-side and discharge-side valves 83, 84 very slowly, reducing the high-side pressure something less than five pounds per square inch (differential reading −5.0 psi or less). Close both tester valves 83, 84. If the differential is held, record as "tight".

e.' Press the PAUSE/STOP TEST key 116.

7. Close all testcocks, remove hoses and reopen shutoff valve #1. Proceed to test No. 2.

Test No. 2: test the No. 2 check valve

1. Install a high-side hose between testcock #3 and the tester source-side unvalved fitting 72.

2. Install a low-side hose between testcock #4 and the tester discharge-side unvalved fitting 73.

3. Open testcock #3 and then the tester source-side valve 83 to bleed the high-side hose; then close the tester source-side valve 83.

4. Open testcock #4 and then the tester discharge-side valve 84 to bleed the low-side hose; then close the tester discharge-side valve 84.

4'. Press the START TEST/RESUME key 112.

5. Close shutoff valve #1.

6. Slowly open the tester source-side valve 83 and lower the high-side pressure about two pounds per square inch below the low-side pressure (differential reading about −2.0 psi).

Close the tester source-side valve 83. If the reading is maintained, record as "tight"; if not, do the confirming test below.

6.' Press the PAUSE STOP TEST key 116.

Confirming a. Open shutoff valve #1 to repressurize the assembly.

b. Install a bypass hose between the tester discharge-side valve 84 and testcock #1.

Open testcock #1 and bleed it by loosening the hose connection at the tester discharge-side valved fitting 84. Tighten the hose connection.

b'. Press the START TEST/RESUME key 112.

c. Close shutoff valve #1.

d. Lower the assembly pressure about ten pounds per square inch by loosening the hose connection at testcock #4.

e. Simultaneously open both the source-side and discharge-side tester valves 83, 84 very slowly, reducing the high-side pressure something less than five pounds per square inch (differential reading −5.0 psi or less). Close both tester valves 83, 84. If the differential is held, record as "tight".

e'. Push the PAUSE/STOP TEST key 116 twice.

7. Close all testcocks, remove the tester and return assembly to normal operating condition.

Secondly we shall present procedures for testing valves of the RP type. Please refer to FIGS. 12, 13 and 17. Confirming tests, analogous to those given above for DC valves, may be readily devised by those skilled in the art—based upon our disclosures and teachings in this document.

RP Test Procedure (confirming tests omitted)

A. Open testcock #4 and flush testcocks #1, 2 and 3 on the backflow assembly. Then close testcock #4.

B. Turn the tester on (before connecting hoses). The tester must display all zeroes. Close both the source-side and discharge-side tester valves 83, 84.

Test No. 1: test the relief valve

1. Install a high-side hose between testeock #2 and the tester source-side unvalved fitting 72.

2. Install a low-side hose between testcock #3 and the tester discharge-side unvalved fitting 73.

3. Open testcock #3 and then the tester discharge-side valve 84. Next open testcock #2 slowly, and then the tester source-side valve 83.

Close the tester source-side valve 83, and then the tester discharge-side valve 84.

4. Close shutoff valve #2.

5. Observe the apparent first-check-valve differential reading on the tester.

6. Install a bypass hose between the tester source-side valve 83 and the tester discharge-side valve 84.

Open the tester discharge-side valve 84, and bleed air by loosening the hose connection at the tester source-side valved fitting 71.

Then tighten the hose connection and close the tester discharge-side valve 84.

6'. Press the PRINT HEAD key 107, and wait for the heading to print; then push the START TEST/RESUME key 112.

7. Open the tester source-side valve 83, and then slowly open the tester discharge-side valve 84 (no more than one-quarter turn). When the relief valve drips, depress the DISP HOLD key 109 for two seconds. Record the differential reading (it should be two pounds per square inch or more).

7.' Press the PAUSE/STOP TEST key 116.

8. Close the tester source-side valve 83 and the tester discharge-side valve 84.

Test No. 2: test the No. 1 check valve

9. Install a bypass hose between the tester source-side valve 83 and testcock #4.

Next open the tester source-side valve 83, and bleed air by loosening the hose connection at test-cock #4.

Tighten that same hose connection, and then close the tester source-side valve 83.

9'. Press the START TEST/RESUME key 112.

10. Open the tester discharge-side valve 84 to reestablish pressure within the "zone". Then close the tester discharge-side valve 84.

11. Open testcock #4, and then open the tester source-side valve 83. If the relief valve does not drip, record the second check valve as "closed tight".

Test No. 3: test the No. 2 check valve

12. Open the tester discharge-side valve 84 to reestablish the first check-valve differential pressure. Then close the tester discharge-side valve 84, and record the differential value.

12'. Press the PAUSE/STOP TEST key 116 twice, to stop the test.

13. Close the testcocks, remove the tester, and return the assembly to normal operating condition.

Thirdly we shall present procedures for testing PVB valves, with reference to FIGS. 14, 15 and 18. Again, skilled artisans will readily be able to provide confirming tests analogous to those we have shown above for DC valves.

PVB Test Procedure (confirming tests omitted)

NOTE: For both of the following tests, the tester must be held at the same level as the assembly being tested.

A. Flush testcocks #1 and #2.

B. Turn the tester on (before connecting hoses). The tester must display all zeroes. Close the tester source-side valve 83 and the tester discharge-side valve 84.

Test No. 1: test the air inlet

1. Install a source-side hose between testcock #2 and the tester source-side unvalved fitting 72.

(Alternatively, leave the source-side fitting loose at testcock #2, and press the ZERO CALIB key 111. Then tighten the fitting at testcock #2.)

2. Open testcock #2 and the tester source-side valve 83, bleed the hose, and then close the tester source-side valve 83.

3. Close the shutoff valves—first #2 and then #1.

3'. Press the PRINT HEAD key 107, and wait for the heading to print; then press the START TEST-/RESUME key 112.

4. Slowly open the tester source-side valve 83. When the air inlet float opens, depress the DISP HOLD key 109 for at least two seconds.

Record the differential reading (it should be one pound per square inch or more). Then close the tester source-side valve 83.

5. Close testcock #2 and remove the hose.

6. Open shutoff valve #1.

Test No. 2: test the check valve

7. Install a source-side hose between testcock #1 and the tester source-side unvalved fitting 72. (Also note the alternative procedure at step 1.)

8. Open testcock #1 and the tester source-side valve 83, bleed the hose; then close the source-side valve 83.

9. Close shutoff valve #1.

9'. Press the START TEST/RESUME key 112.

10. Open testcock #2. When the flow of water from testcock #2 stops, the differential reading is the pressure drop.

Record the differential reading (it should be one pound per square inch or more).

10'. Press the PAUSE/STOP TEST key 116 twice.

11. Close the testcocks and remove the tester. Return the assembly to normal operating condition.

Figure 8:
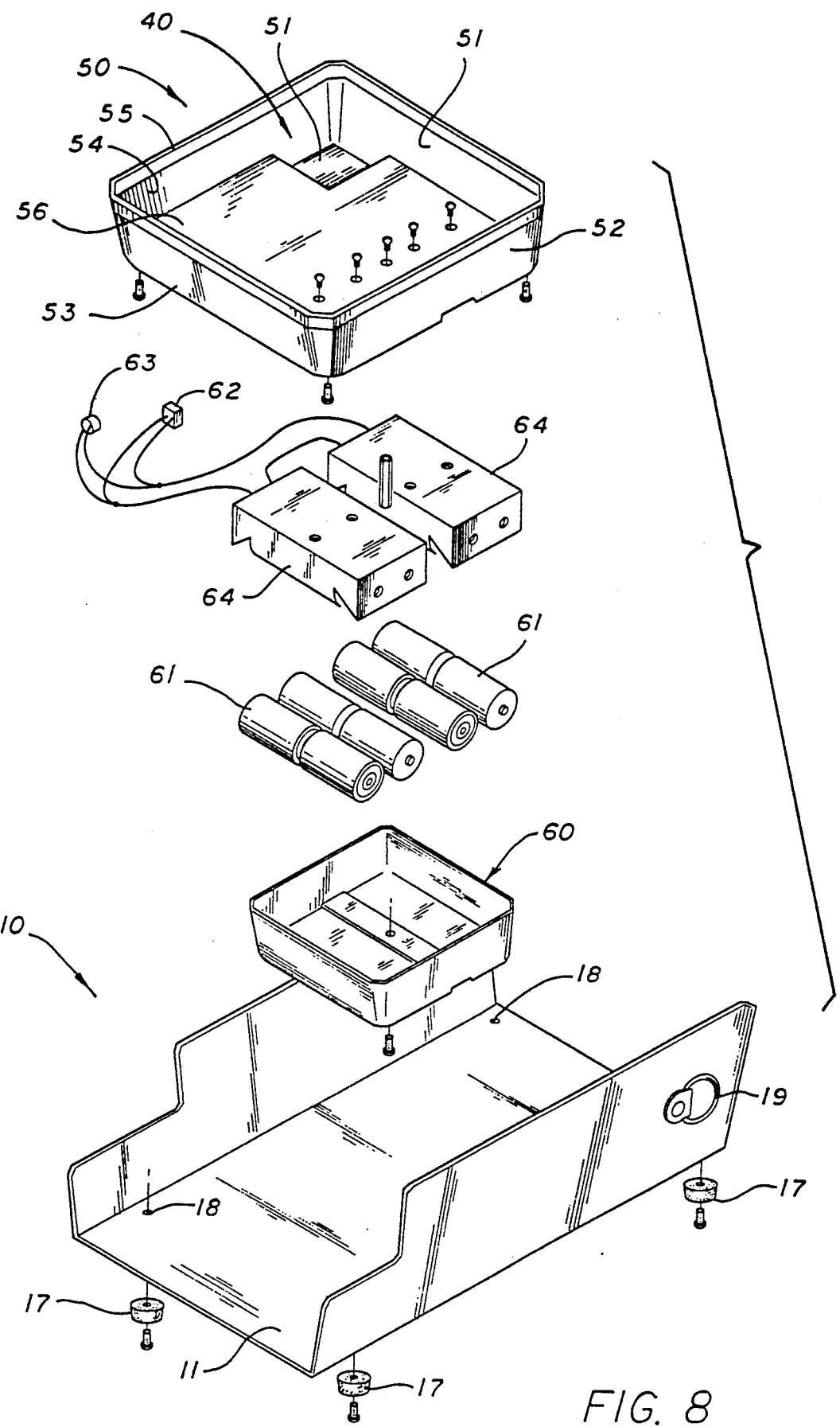
FIG. 8 is an exploded perspective view showing additional structural elements of the FIG. 1 case, and related components. More specifically.

We shall now conclude with some additional manufacturing details of our tester. Energy to support the power supplies is drawn from eight nickel-cadmium batteries in the pack 61 (FIG. 8). They can be recharged through a suitable adapter in about sixteen to twenty-four hours.

Overall dimensions of our testing device are roughly only 34 by 23 by 9 cm (13½ by 9 by 3½ inches); the outer cover 30 for the printer/paper compartment adds about 4½ cm to the height. The apparatus weights only about 4½ kg (10 pounds).

We prefer to fabricate the upper and lower housing sections 10, 20 of our device from anodized aluminum and powder-painted aluminum, respectively, with a polycarbonate overlay 100 for the keyboard and the display-viewing window 29; and a carrying handle of vinyl. The outer cover 30 is of acrylic and vinyl.

We prefer to provide a carrying case (not shown), made of polyolefin, ABS and urethane, for our testing device and its accessory hoses, fittings, etc. The device and case together occupy approximately 44½ by 33 by 15 cm, and weight about 8 kg.

The sensors A and B are compensated solid-state, thin-film, full-bridge strain-gauge hybrid transducers, accurate to one-quarter percent of full scale (two hundred pounds per square inch). Without special modification they are compatible with water. Without special modification they are compatible with water. The valves 83, 84 are needle valves of stainless steel and brass.

Values or component designators of the electronic components, with descriptions as appropriate, follow:

| | | |
|---|---|---|
| U1 | 62256 | 32 k × 8 CMOS RAM |
| U2 | 74HC4024 | ripple counter |
| U3 | 74HC138 | 3-to-8 decoder |
| U4 | 27C256 | 32 k × 8 CMOS EPROM |
| U5 | 72421B | real-time clock |
| U6 | Z80C00AB6 | microprocessor |
| U7 | 74HC74 | dual D latch |
| U8 | MAX 692 | power-supervisor chip |
| U9 | 74HC138 | 3-to-8 decoder |
| U10 | 82C55A | programmable interface |
| U11 | 74HC04 | CMOS hex inverter buffer |
| U12 | 82C55A | programmable interface |
| U13 | ICL 7135 | integrating analog-to-digital converter |
| U14 | ICL 7135 | integrating analog-to-digital converter |
| U15 | LM358 | dual operational amplifier |
| U16 | DG211 | quad analog switch |
| U17 | LT1014CN | quad operational amplifier |
| U18 | CD 4069 | hex inverter |
| U19 | LB1256 | octal Darlington array |
| U20 | 80C49X | character generator and printer driver |
| U21 | 74HC574 | octal tristate D latches |
| U22 | 82C55A | bidirectional parallel/serial interface |
| U23 | MAX236 | RS232C driver |
| U101 | MAX635 | −5 volt converter |
| U102 | LM393 | dual operational amplifier |
| R1 | 50 k | potentiometer |
| R5 | 10 k | (resistors except as indicated) |
| R6 | 100 k | |
| R7 | 100 k | |
| R8 | 100 k | |
| R9 | 100 k | |
| R10 | 100 k | |
| R11 | 100 k | |
| R12 | 100 k | |
| R13 | 100-ohm | potentiometer |
| R14 | 20 k | |
| R15 | 20 k | |
| R16 | 100-ohm | potentiometer |
| R17 | 100-ohm | potentiometer |
| R18 | 20 k | |
| R19 | 20 k | |
| R20 | 100-ohm | potentiometer |
| R21 | 10 k | |
| R22 | 825-ohm | |
| R23 | 10 k | |
| R24 | 825-ohm | |
| R25 | 10 k | |
| R26 | 10 k | |
| R27 | 10 k | |
| R28 | 10 k | |
| R29 | 10 k | |
| R30 | 10 k | |
| R31 | 100 k | |
| R32 | 14 k | |
| R33 | 100 k | |
| R34 | 100 k | |
| R35 | 27-ohm | |
| R36 | 100 k | |
| R37 | 100 k | |
| R38 | 100 k | |
| R39 | 27-ohm | |
| R40 | 100 k | |
| R41 | 6.8 k | |

-continued

| | | |
|---|---|---|
| R42 | 50 k | potentiometer |
| R43 | 20 k | |
| R44 | 180 k | |
| R45 | 20 k | |
| R46 | 100 k | |
| R47 | 2.2 k | |
| R101 | 10 k | |
| R102 | 10 k | |
| R103 | 47 k | |
| R104 | 47 k | |
| R105 | 2.2 k | |
| R106 | 10 k | |
| R107 | 10 k | |
| R108 | 2.2 k | |
| R109 | 100-ohm | |
| R110 | 47 k | |
| C1–C14 | 0.1 | (capacitances in microfarads unless otherwise indicated) |
| C15, C16 | 0.001 | |
| C17, C18 | 0.1 | |
| C19, C20 | 10 | |
| C21 | 0.1 | polyester |
| C22 | 1 | polyester |
| C23 | 1 | polyester |
| C24 | 0.47 | polypropylene |
| C25, C26 | 0.1 | |
| C27 | 0.1 | polyester |
| C28 | 1 | polyester |
| C29 | 1 | polyester |
| C30 | 0.47 | polypropylene |
| C31 | 10 | tantalum |
| C32, C33 | 10 | |
| C34 | 0.1 | |
| C35, C36 | 10 | |
| C37 | 0.1 | |
| C38 | 10 | |
| C39 | 100 | |
| C40 | 0.1 | |
| C41 | 220 | pF |
| C42, C43 | 0.1 | |
| C44 | 820 | pF |
| C45 | 0.1 | |
| C101 | 10 | tantalum |
| C102, C103 | 0.1 | |
| C104–C107 | 100 | |
| C108 | 0.001 | |
| C109 | 1 | |
| C110 | 0.1 | |
| CR1, CR2 | 1N4148 | |
| CR3 | 1CL8069DZL | |
| CR4, CR5 | 1N4148 | |
| CR101–CR103 | 1N4148 | |
| CR104 | TL431 | |
| CR105–CH107 | 1N4148 | |
| Q1, Q2 | 2N2222 | PNP signal transistor |
| Q101, Q102 | IRF511 | n-channel field-effect transistor |
| Q103 | 2N7000 | n-channel field-effect transistor |
| L101 | 330 | microhenry choke |
| X1 | P5C | 2.4576 MHz oscillator |
| D1 | TLC771 | 24-character by two-line dot-matrix liquid-crystal display with drivers |
| B1 | BR2325 | 3-volt lithium battery |
| B2–B9 | | eight nickel-cadmium C cells |
| S101–S103 | B3F1055 | Omron switch |
| S104–S119 | B3F4055 | Omron switch |
| PR1 | MTP201 | Seiko 24-character thermal printer |
| TX1, TX2 | 1PT 200 | Ametek pressure transducer |

It will be understood that the foregoing disclosure is intended to be merely exemplary, and not to limit the scope of the invention—which is to be determined by reference to the appended claims.

We claim:

1. A backflow-valve testing device, for testing a backflow valve that is, when in service, connected between a fluid source and a fluid-discharge port; said testing device being for use by testing personnel in determining whether the backflow valve interconnects the source to the discharge port only if pressure at a source side of the valve exceeds pressure at a discharge side of the valve by at least a specified increment; said testing device being for said use during variation of said source or discharge pressure, or both, in such a way that the source pressure sometimes exceeds the discharge pressure by the specified increment, and sometimes do not; and said testing device comprising:

first and second pressure sensors;

means for connecting the first and second sensors to monitor, respectively, two of the following three pressures: (1) pressure at such source side of such backflow valve, (2) pressure at such discharge side of such backflow valve and (3) differential pressure between such suorce and discharge sides of such backflow valve;

means, responsive to the first and second sensors, for deriving values of at least two of said three pressures, said deriving means comprising:

at least one analog-to-digital converter, but not more than two, connected to respond to analog electrical signals from the sensors and to develop digital electrical signals corresponding to the analog signals from the sensors respectively, and digital electronic processor means, including a programmed digital microprocessor and responsive to the at least one converter, for digitally processing the digital signals, including making at least one logic decision that depends upon said digital signals, to derive said values of the at least two pressures and for controlling the display means; and means, responsive to both sensors and to the deriving means, for substantially simultaneously displaying values, including said at least two derived values, of all three pressures while at least one pressure is varied in such a way that the differential pressure is sometimes less and sometimes more than such specified increment;

whereby testing personnel can follow values of all three pressures, together with concurrent operation of such backflow valve, during variation of pressure in such a way that the differential pressure is sometimes less and sometimes more than such specified increment.

2. The testing devic, of claim 1, for periodic use with a host computer, and further comprising:

a digital memory, within or interconnected with the processor means, for storing pressure values and other test parameters;

a small, hand-held portable case holding the pressure sensors, and the deriving, display, and printing means, and portions of the sensor-connecting means;

a battery housing, within the case, for holding and operatively connecting a battery to power the deriving, display and printing means, and the digital memory; and connection means, mounted to the case and functionally interconnected with the processor means, for periodically establishing electronic communication between the processor means and such a host computer to debrief the processor-means memory to such a host computer.

3. The backflow-valve testing device of claim 1, wherein:

the at least one analog-to-digital converter comprises first and second analog-to-digital converters, connected to respond to analog electrical signals from the first and second sensors respectively, and to develop digital electrical signals corresponding to the analog signals from the first and second sensors respectively; and the digital electronic processor means are responsive to both converters.

4. The backflow-valve testing device of claim 3, further comprising:

means, responsive to the digital processor means, for printing a permanent record of substantially simultaneous valves of all three pressures during pressure variation so that the differential pressure is sometimes less and sometimes more than such specified increment.

5. The device of claim 1, wherein:

the processor means comprise means for selectively choosing whether to implement or not implement a result of direct computation, depending upon said digital signals.

6. The device of claim 1, wherein:

the processor means comprise means for applying a relationship between said digital signals to control said digital combining of the signals.

7. The device of claim 1, wherein:

the processor means comprise means for applying the magnitude of at least one of said digital signals to control said digital combining of the signals.

8. The device of claim 1, wherein:

the processor means comprise means for applying a relationship between said digital signals, and the magnitude of at least one of said digital signals, to determine whether to implement or not implement a result of direct computation.

9. A backflow-valve testing device, for testing a backflow valve that is, when in service, connected between a fluid source and a fluid-discharge port; said testing device being for use by testing personnel in determining whether the backflow valve interconnects the source to the discharge port only if pressure at a source side of the valve exceeds pressure at a discharge side of the valve by at least a specified increment; said testing device being for said use during variation of said source or discharge pressure, or both, in such a way that the source pressure sometimes exceeds the discharge pressure by the specified increment, and sometimes does not; and said testing device comprising:

first and second pressure sensors;

means for connecting the first and second sensors to monitor, respectively, two of the following three pressures; (1) pressure at such source side of such backflow valve, (2) pressure at such discharge side of such backflow valve and (3) differential pressure between such source and discharge sides of such backflow valve;

means, responsive to the first and second sensors, for deriving values of at least two of said three pressures, said deriving means comprising:

at least one analog-to-digital converter, connected to respond to analog electrical signals from the sensors and to develop digital electrical signals corresponding to the analog signals from the sensors respectively, and digital electronic processor means, including a programmed digital microprocessor and responsive to the at least one converter, for digitally combining the digital signals arithmetically to derive said values of the at least two pressures and for controlling the display means;

means, responsive to both sensors and to the deriving means, for substantially simultaneously displaying values, including said at least two derived values, of all three pressures while at least one pressure is varied in such a way that the differential pressure is sometimes les sand sometimes more than such specified increment;

whereby testing personnel can follow values of all three pressures, together with concurrent operation of such backflow valve, during variation of pressure in such a way that the differential pressure is sometimes less and sometimes more than such specified increment; and means, responsive to the digital processor means, for printing a permanent record of substantially simultaneous values of all three pressures during variation of pressure so that the differential pressure is sometimes less and sometimes more than such specified increment.

10. The backflow-valve testing device of claim 9, wherein:

the printing means automatically print the substantially simultaneous values at time intervals during pressure variation so that the differential pressure is sometimes less and sometimes more than such specified increment.

11. The backflow valve testing device of claim 10, wherein:

the printing means automatically print elapsed time with the substantially simultaneous values.

12. The backflow-valve testing device of claim 10, wherein:

the printing means automatically print heading information before beginning to print said values of the three pressures; and the printing means automatically print footing information at the conclusion of each test, after printing said values of the three pressures.

13. The backflow-valve testing device of claim 12, wherein the heading and footing information, considered together, comprise these test parameters:

substantially unique identification of the testing device itself;

identification of testing personnel operating the device;

calibration status of the device;

condition of a battery in the device; and date and time of the beginning or end of the test, or of both.

14. The backflow-valve testing device of claim 12, wherein:

the heading and footing information, considered together, further comprise an entry blank of standardized format for use by testing personnel in manually recording identification of the valve being tested.

15. The backflow-valve testing device of claim 12, particularly for use in testing such a backflow valve that has associated coded indicia identifying the valve; and further comprising:

means for reading such coded identifying indicia associated with such backflow valve being tested; and wherein the heading and footing information, considered together, further comprise identification of the valve being tested.

16. A backflow-valve testing device, for testing a backflow valve that is, when in service, connected between a fluid source and a fluid-discharge port; said testing device being for use by testing personnel in determining whether the backflow valve interconnects the source to the discharge port only if pressure at a source side of the valve exceeds pressure at a discharge side of the valve by at least a specified increment; said testing device being for said use during variation of said source or discharge pressure, or both, in such a way that the source pressure sometimes exceeds the discharge pressure by the specified increment, and sometimes does not; and said testing device comprising;

first and second pressure sensors;
   means for connecting the first and second sensors to monitor, respectively, two of the following three pressures: (1) pressure at such source side of such backflow valve, (2) pressure at such discharge side of such backflow valve and (3) differential pressure between such source and discharge sides of such backflow valve;
   means, responsive to the first and second sensors, for deriving values of at least two of said three pressures, said deriving means comprising;
      at least one analog-to-digital converter, connected to respond to analog electrical signals from the sensors and to develop digital electrical signals corresponding to the analog signals from the sensors respectively, and
      digital electronic processor means, including a programmed digital microprocessor and responsive to the at least one converter, for digitally combining the digital signals arithmetically to derive said values of the at least two pressures and for controlling the display means; and
   means, responsive to both sensors and to the deriving means, for substantially simultaneously displaying values, including said at least two derived values, of all three pressures while at least one pressure is varied in such a way that the differential pressure is sometimes less and sometimes more than such specified increment;
   whereby testing personnel can follow values of all three pressures, together with concurrent operation of such backflow valve, during variation of pressure in such a way that the differential pressure is sometimes less and sometimes more than such specified increment; and
   wherein in at least one operating mode of the device, the processor means control the display means to equalize the displayed values of source- and discharge-side pressure, and to display zero as the value of the differential pressure, if the source-side pressure is within a specified threshold range of the discharge-side pressure.

17. A backflow-valve testing device, for testing a backflow valve that is, when in service, connected between a fluid source and a fluid-discharge port; said testing device being for use by testing personnel in determining whether the backflow valve interconnects the source to the discharge port only if pressure at a source side of the valve exceeds pressure at a discharge side of the valve by at least a specified increment; said testing device being for said use during variation of said source- or discharge-side pressure, or both, in such a way that the source-side pressure sometimes exceeds the discharge-side pressure by the specified increment, and sometimes does not; and said testing device comprising:

first and second pressure sensors;
   means for connecting the first and second sensors to monitor, respectively, two of the following three pressures: (1) pressure at such source side of such backflow valve, (2) pressure at such discharge side of such backflow valve and (3) differential pressure between such source and discharge sides of such backflow valve;
   means, including a programmed micrprocessor and responsive to the first and second sensors, for deriving a value of the remaining one of said three pressures;
   means, responsive to both sensors and to the deriving means, for substantially simultaneously displaying values of all three pressures while at least one pressure is varied in such a way that the differential pressure is sometimes less and sometimes more than such specified increment;
   whereby testing personnel can follow values of all three pressures, together with concurrent operation of such backflow valve, during variation of pressure in such a way that the differential pressure is sometimes less and sometimes more than such specified increment; and
   means for controlling the display means to equalize the displayed values of source- and discharge-side pressure, and to display zero as the value of the differential pressure, if the source-side pressure is within a specified threshold range of the discharge-side pressure.

18. The testing device of claim 17, wherein:
   said specified threshold range is 0.2 pound per square inch.

19. The testing device of claim 17, further comprising:
   means for substantially automatically readjusting to zero the values derived from both sensors, provided that neither sensor is actually sensing a pressure greater than a specified threshold pressure.

20. The testing device of claim 19, wherein:
   the specified threshold pressure is roughly two pounds per square inch.

21. The testing device of claim 19, wherein:
   the specified threshold pressure is roughly 0.4 pounds per square inch.

22. A backflow-valve testing device, for testing a backflow valve that is, when in service, connected between a fluid source and a fluid-discharge port; said testing device being for use by testing personnel in determining whether the backflow valve interconnects the source to the discharge port only if pressure at a source side of the valve exceeds pressure at a discharge side of th valve by at least a specified increment; said testing device being for said use during variation of said source- or discharge-side pressure, or both, in such a way that the source-side pressure sometimes exceeds the discharge-side pressure by the specified increment, and sometimes does not; and said testing device comprising:

first and second pressure sensors;
   means for connecting the first and second sensors to monitor, respectively, two of the following three pressures: (1) pressure at such source side of such backflow valve, (2) pressure at such discharge side of such backflow valve and (3) differential pressure between such source and discharge side of such backflow valve;

means, inlcuding a programmed microprocessor and responsive to the first and second sensors, for deriving a value of the remaining one of said three pressures;

means, responsive to both sensors and to the deriving means, for substantially simultaneously displaying values of all three pressures while at least one pressure is varied in such a way that the differential pressure is sometimes less and sometimes more than such specified increment;

whereby testing personnel can follow values of all three pressures, together with concurrent operation of such backflow valve, during variation of pressure in such a way that the differential pressure is sometimes less and sometimes more than such specified increment; and means for substantially automatically readjusting to zero the values derived from both sensors, provided that neither sensor is actually sensing a pressure greater than a specified threshold pressure.

23. The testing device of claim 19, wherein:

the specified threshold pressure is roughtly two pounds per square inch.

24. The testing device of claim 19, wherein:

the specified threshold pressure is roughly 0.4 pound per square inch.

* * * * *